US006604980B1

(12) United States Patent
Jurmain et al.

(10) Patent No.: US 6,604,980 B1
(45) Date of Patent: Aug. 12, 2003

(54) INFANT SIMULATOR

(75) Inventors: Richard N. Jurmain, Eau Claire, WI (US); Mary M. Jurmain, Eau Claire, WI (US); Larry P. Blackledge, Eau Claire, WI (US); Douglas B. Jones, Mojave, CA (US); Sheila Rae Oium, Alma, WI (US)

(73) Assignee: Realityworks, Inc., Eau Claire, WI (US)

( * ) Notice: Subject to any disclaimer, the term of this patent is extended or adjusted under 35 U.S.C. 154(b) by 0 days.

(21) Appl. No.: 09/555,840

(22) PCT Filed: Dec. 4, 1998

(86) PCT No.: PCT/US98/25776
§ 371 (c)(1),
(2), (4) Date: Jul. 24, 2000

(87) PCT Pub. No.: WO99/29384
PCT Pub. Date: Jun. 17, 1999

(51) Int. Cl.[7] .................................................. A63H 3/28
(52) U.S. Cl. ........................ 446/296; 446/297; 434/238; 434/266
(58) Field of Search ........................... 446/295, 296, 446/297, 298, 299, 300, 301, 304, 305; 434/169, 238, 262, 267, 266

(56) References Cited

U.S. PATENT DOCUMENTS

| | | |
|---|---|---|
| 2,781,611 A | 2/1957 | Bills et al. |
| 2,818,678 A | 1/1958 | Lemelson |
| 3,136,089 A | 6/1964 | Gardel et al. |
| 3,162,980 A | 12/1964 | Hellman |
| 3,190,038 A | 6/1965 | Kardon |
| 3,234,687 A | 2/1966 | Elwell |
| 3,461,604 A | 8/1969 | Glass et al. |
| 3,490,170 A | 1/1970 | Wolf |
| 3,514,899 A | 6/1970 | Bonanno et al. |
| 3,641,703 A | 2/1972 | Tepper et al. |
| 3,755,960 A | 9/1973 | Tepper et al. |
| 3,758,983 A | 9/1973 | Cagen |
| 3,918,199 A | 11/1975 | De Masi |
| 4,075,782 A | 2/1978 | Neuschatz |

(List continued on next page.)

FOREIGN PATENT DOCUMENTS

| | | |
|---|---|---|
| FR | 2 723 321 A1 | 2/1996 |
| GB | 2 068 245 | 8/1981 |
| GB | 2 068 753 | 8/1981 |
| GB | 2 196 545 | 5/1988 |
| WO | WO 89/01812 | 3/1989 |
| WO | WO 98/59331 | 12/1998 |

OTHER PUBLICATIONS

"Baby Be Mine," www.baby-be-mine.co.uk, Apr. 12, 2001.
Baby Think It Over Program Instructor's Handbook (Generation 4), 1997.

(List continued on next page.)

*Primary Examiner*—Jacob K. Ackun
(74) *Attorney, Agent, or Firm*—Sherrill Law Offices, PLLC

(57) ABSTRACT

An infant simulator (5) is capable of emulating the care requirements of an infant, recording the quality of care, responsiveness of a person caring for the infant simulator (5), and/or signaling the person caring for the infant simulator (5) when care is required. The infant simulator (5) is capable of sensing the unacceptable environmental conditions of abusive impact, abusive compression, improper positioning, exposure to loud noises, over-stimulation, exposure to smoke, exposure to direct sunlight, exposure to temperature extremes to which the infant simulator (5) is subjected, and periodically demanding that the student change the diaper, feed, burp the infant, rest the infant, and rock the infant.

48 Claims, 27 Drawing Sheets

U.S. PATENT DOCUMENTS

| | | | |
|---|---|---|---|
| 4,079,728 A | 3/1978 | Gatts | 128/1 B |
| 4,114,313 A | 9/1978 | Guerrero et al. | 46/264 |
| 4,115,948 A | 9/1978 | Burks | |
| 4,160,338 A | 7/1979 | Lyons et al. | |
| 4,231,184 A | 11/1980 | Corris et al. | |
| 4,249,338 A | 2/1981 | Wexler | |
| 4,257,188 A | 3/1981 | Barker | |
| 4,305,223 A | 12/1981 | Ho | |
| 4,318,245 A | 3/1982 | Stowell et al. | |
| 4,451,911 A | 5/1984 | Klose et al. | |
| 4,516,950 A | 5/1985 | Berman et al. | |
| 4,575,351 A | 3/1986 | Gonzalez | |
| 4,660,033 A | 4/1987 | Brandt | |
| 4,696,653 A | 9/1987 | McKeffery | |
| 4,710,145 A | 12/1987 | Vandis | 446/100 |
| 4,717,363 A | 1/1988 | Refabert | 446/14 |
| 4,737,131 A | 4/1988 | Sirota | 446/130 |
| 4,740,186 A | 4/1988 | Sirota | 446/14 |
| 4,775,352 A | 10/1988 | Curran et al. | 446/301 |
| 4,777,938 A | 10/1988 | Sirota | 600/27 |
| 4,820,236 A | 4/1989 | Berliner et al. | 446/369 |
| 4,840,602 A | 6/1989 | Rose | 446/175 |
| 4,846,693 A | 7/1989 | Baer | 434/308 |
| 4,904,988 A | 2/1990 | Nesbit et al. | 340/628 |
| 4,923,428 A | 5/1990 | Curran | 446/175 |
| 4,932,879 A | 6/1990 | Ingenito et al. | 434/262 |
| 5,011,449 A | 4/1991 | Handy et al. | 446/297 |
| 5,012,973 A | 5/1991 | Dick et al. | 236/46 R |
| 5,037,375 A | 8/1991 | Gatts | 600/21 |
| 5,079,538 A | 1/1992 | DeFino et al. | 340/426 |
| 5,083,962 A | 1/1992 | Pracas | 446/184 |
| 5,083,965 A | 1/1992 | Mayem | 446/305 |
| 5,092,811 A | 3/1992 | Bergenguer | 446/301 |
| 5,094,644 A | 3/1992 | Kelley | 446/305 |
| 5,096,424 A | 3/1992 | Carlberg | 434/262 |
| 5,125,866 A | 6/1992 | Arad et al. | 446/397 |
| 5,224,863 A | 7/1993 | Lauer et al. | 434/267 |
| 5,281,180 A | 1/1994 | Lam et al. | 446/175 |
| 5,290,198 A | 3/1994 | Nakayama | 446/297 |
| 5,308,277 A * | 5/1994 | Nielsen | 446/320 |
| 5,314,336 A | 5/1994 | Diamond et al. | 434/169 |
| RE34,800 E | 11/1994 | Hutchins | 128/898 |
| 5,415,579 A | 5/1995 | Pracas | 446/295 |
| 5,443,388 A | 8/1995 | Jurmain et al. | 434/238 |
| 5,509,810 A | 4/1996 | Shertz et al. | 434/262 |
| 5,648,753 A | 7/1997 | Martin | 240/324.1 |
| 5,738,561 A * | 4/1998 | Pracas | 446/297 |
| 5,746,602 A | 5/1998 | Kikinis | 434/169 |
| 5,752,880 A | 5/1998 | Gabai et al. | 463/1 |
| 6,000,987 A | 12/1999 | Belin et al. | 446/175 |
| 6,042,450 A | 3/2000 | Leversedge et al. | 446/304 |
| 6,048,209 A | 4/2000 | Bailey | 434/267 |
| 6,050,826 A | 4/2000 | Christianson et al. | 434/262 |
| RE36,776 E | 7/2000 | Jurmain et al. | 434/238 |

OTHER PUBLICATIONS

Baby Think It Over Program Operating Instructions (Generation 4), 1996.
Baby Think It Over Program Student's Handbook (Generation 4), 1996.
Baby Think It Over Program Teacher's Handbook (Generation 4), 1996.
Important Safety and Use Information About Your New Baby Think It Over Infant Simulator, undated.
Moran, "A chip off the ol' block: High–tech toys offer more," *The Hartford Courant*, Aug. 2, 1998.
NASCO's Family & Consumer Sciences information printed from http://www.nascofa.com, Jul. 7, 1997.
NASCO's Ready–or–Not Tot Brochure, Jun. 1997.
NASCO's Ready–or–Not Tot Instruction Manual, 1997.

* cited by examiner

INFANT SIMULATOR

This patent claims priority as a national-phase application of PCT Patent Application No. PCT/US98/25776 (Int'l Filing Date Dec. 4, 1998; WIPO Int'l Publ. Date Jun. 17, 1999 (in English)), which, in turn, claims priority to U.S. Non-provisional Patent Application Ser. No. 08/986,835 (filed Dec. 8, 1997).

FIELD OF THE INVENTION

This invention broadly relates to the field of simulated parenting. More specifically, the invention relates to infant simulators used in educational programs for educating prospective parents about the realities of parenthood and assisting in the education and training of personnel in the child-care field.

BACKGROUND

Teen-age pregnancy is an ever increasing problem. Teen-age parents, surveyed as to why they elected to have a baby, gave such reasons as "babies are so cute," "I wanted attention," and "I needed someone to love and love me back." Such romantic feelings toward having a baby almost never include an understanding of the responsibilities imposed by a baby, including loss of sleep, loss of freedom, the need for constant attention, etc. Attempts to educate teen-agers about the trials and tribulations of caring for an infant and raising a child, using the traditional educational methods of lectures and readings, are rarely successful.

Some resourceful educators, realizing that traditional educational methods are inadequate, have attempted to demonstrate the care requirements of an infant by requiring students to carry a sack of flour, an egg or a plant for several days. While somewhat exemplary of the care requirements of an infant, such programs do not fairly represent the care requirements of an actual infant and have proven to be of limited success.

U.S. Pat. No. 3,190,038 issued to Kardon, U.S. Pat. No. 3,490,170 issued to Wolf, U.S. Pat. No. 3,514,899 issued to Bonanno et al., U.S. Pat. No. 4,115,948 issued to Burks and U.S. Pat. No. 5,094,644 issued to Kelley describe dolls that will wet a diaper after being fed from a bottle. The dolls described in Kardon and Wolf each include electrical circuitry capable of initiating crying when a diaper on the doll is sufficiently wetted after being fed from a bottle, and terminating such crying upon removal of the wetted diaper. Similarly, the doll described in Bonanno et al. further includes electrical circuitry capable of initiating crying when the doll is diapered and a bottle is removed from the mouth of the doll, and terminating such crying by removing the diaper from the doll. Such dolls are not useful for educating students about the trials and tribulations of caring for an infant as the feeding and wetting cycle, with or without crying, is under control of the user. The student, unless under constant supervision by an educator, can feed and change the doll on a schedule selected by the student.

U.S. Pat. No. 4,249,338 issued to Wexler discloses a doll which emits a crying sound when a manually operated switch is actuated. The user must then determine which of several switches, labeled with such actions as feeding, diaper changing or back patting, will turn off the crying sound. While interesting as a plaything, this doll suffers from the same drawback as the "feed and wet" dolls in that activation of crying is under control of the user. The student, unless under constant supervision by an educator, can activate crying on a schedule selected by the student.

U.S. Pat. No. 4,451,911 issued to Klose et al. discloses a doll which can operate in two different modes. In a first mode, the doll emits different sounds based upon which of several switches, located at various positions on the body of the doll, is actuated (e.g., actuation of the mouth switch produces "yum-yum," while actuation of the back switch produces "aahh"). In a second mode the doll emits a sound and the user must then determine which of the switches will turn off the crying sound and produce a satisfaction signal, such as "mommy." The user can deactivate the doll by pressing a specified switch on the doll or simply failing to activate the proper switch within a given time period. Again, while interesting as a plaything, this doll suffers from the same drawback as the "feed and wet" dolls in that activation and deactivation of the doll is under control of the user. The student, unless under constant supervision by an educator, can activate and deactivate the doll on a schedule selected by the student.

A particularly useful infant simulator system for use in educating students about the care requirements of an infant is described in U.S. Pat. No. 5,443,388 issued to Jurmain et al. and assigned to the assignee of this application. The patent discloses an infant simulator capable of crying at intervals, with the crying continuing until a care key is inserted into the infant simulator and continuously held in position against a biasing means for a defined time period. The crying schedule may be changed to simulate a healthy, sick or ideal infant. A tremblor may be included to cause the infant to shake at intervals for purposes of simulating a drug-affected infant. The infant simulator can also include indicators showing rough handling, improper positioning and the detection of a loud sound. The care key may include a means for securing the key to an assigned individual.

While the infant simulator described in U.S. Pat. No. 5,443,388 and sold under the trademark BABY THINK IT OVER® has proven extremely useful as an educational tool, a continuing need exists for an improved infant simulator capable of realistically demonstrating the variety of needs and care requirements of an infant, as well as the positive aspects of caring for and loving an infant.

SUMMARY OF THE INVENTION

The infant simulator includes a variety of features designed to emulate the care requirements of an infant. The infant simulator can be designed and programmed with any combination of the described features, including the ability to selectively activate and deactivate individual features for each assignment period. The infant simulator is equipped to record and report the quality of care and responsiveness of a person caring for the infant simulator and/or signal the person caring for the infant simulator when care is required.

The features can be conveniently grouped into the categories of (i) environmental events, (ii) demand events, and (iii) ancillary features.

Environmental Events
Indirectly Induced
  Temperature Sensor
  Infants should not be exposed to temperature extremes. The infant simulator can be equipped with a temperature sensor capable of sensing the environmental temperatures to which the infant simulator is exposed.

In a first embodiment, the infant simulator is further equipped with a system for recording and reporting the sensed temperature. In a second embodiment, the infant simulator is further equipped with a system for generating a perceptible thermal exposure signal when the sensed temperature falls above or below a defined acceptable temperature range. A preferred embodiment combines both the recording/reporting and signaling systems so that the person caring for the infant simulator is advised when the environmental temperature has reached an unacceptable level, and the recorded information can be reviewed by a program administrator upon completion of the assignment.

Smoke Detector

Infants should not be exposed to smoke. The infant simulator can be equipped with a smoke detector capable of sensing environmental smoke from such sources as a bonfire, fireplace, cigarette, cigar, or pipe.

In a first embodiment, the infant simulator is equipped with a system for recording and reporting instances of detected exposures to smoke. In a second embodiment, the infant simulator is equipped with a system for generating a perceptible smoke exposure signal when smoke is detected. A preferred embodiment combines both the recording/reporting and signaling systems so that the student caring for the infant simulator is advised when smoke is detected and the recorded information can be reviewed by a program administrator upon completion of the assignment.

Sunlight Sensor

Infants should not be exposed to direct sunlight. The eyes of an infant cannot accommodate the intensity of direct sunlight, nor can the skin of an infant withstand any significant exposure to the sun without irritating the skin. The infant simulator can be equipped with a light sensor capable of sensing direct exposure to sunlight.

In a first embodiment, the infant simulator is equipped with a system for recording and reporting instances when the simulator is exposed to direct sunlight (i.e., light having an illuminance exceeding a defined threshold value such as 2,000 foot-candles.). In a second embodiment, the infant simulator is equipped with a system for generating a perceptible sunlight exposure signal when the simulator is exposed to direct sunlight. A preferred embodiment combines both the recording/reporting and signaling systems so that the student caring for the infant simulator is advised when the infant is being exposed to direct sunlight and the recorded information can be reviewed by a program administrator upon completion of the assignment.

Loud Noise Sensor

Infants should not be exposed to loud noises. The ears of an infant cannot accommodate loud noises such as experienced when proximately exposed to airplane engines during takeoff, firecrackers, firetruck sirens, loud rock music, shouting, screaming, etc. The infant simulator can be equipped with a sound sensor capable of sensing loud noises.

In a first embodiment, the infant simulator is equipped with a system for recording and reporting instances when the simulator is exposed to loud noises (i.e., noise exceeding a defined threshold value such as about 80 decibels.). In a second embodiment, the infant simulator is equipped with a system for generating a perceptible loud sound exposure signal when the simulator is exposed to an excessively loud sound. A preferred embodiment combines both the recording/reporting and signaling systems so that the student caring for the infant simulator is advised when the infant is being exposed to excessive levels of noise and the recorded information can be reviewed by a program administrator upon completion of the assignment.

Overstimulation

Infants can be overstimulated by prolonged periods of auditory and/or visual stimulation and/or movement. The infant simulator can be equipped with a sound and/or motion detector for sensing prolonged exposure to noise and/or prolonged periods of movement.

In a first embodiment, the infant simulator is equipped with a system for recording and reporting instances of overstimulation. In a second embodiment, the infant simulator is equipped with a system for generating a perceptible overstimulation signal when overstimulation is sensed. A preferred embodiment combines both the recording/reporting and signaling systems so that the student caring for the infant simulator is advised when overstimulation has occurred and the recorded information can be reviewed by a program administrator upon completion of the assignment.

Directly Induced

Infants must be handled with care at all times and should never be intentionally or unintentionally dropped, shaken, squeezed, struck or otherwise physically harmed. Two of the more prevalent abuses are the result of a frustrated care provider shaking and/or squeezing the infant; usually shaking the body while allowing the appendages to flop back-and-forth, and/or squeezing the infant's arm, leg or head. The infant simulator can be equipped with (i) an impact sensor capable of sensing a potentially injurious impact upon the infant simulator indicative of being dropped, shaken or struck, and/or (ii) a compression sensor capable of sensing potentially injurious compression of the infant simulator.

Impact Sensor

In a first embodiment, the infant simulator is equipped with a system for recording and reporting an abusive impact. In a second embodiment, the infant simulator is equipped with a system for generating a perceptible impact distress signal when abusive impact is sensed. A preferred embodiment combines both the recording/reporting and signaling systems so that the student caring for the infant simulator is immediately notified that they have injured the infant simulator, and the recorded information can be reviewed by a program administrator upon completion of the assignment.

The infant simulator is preferably equipped with multiple impact sensors and/or provided with appropriate programming so as to allow the infant simulator to differentiate between (i) a single impact indicative of a single intentional or unintentional strike or fall, and (ii) rapid multiple impacts indicative of intentional striking or shaking of the infant simulator.

Compression Sensor

In a first embodiment, the infant simulator is equipped with a compression sensor and a system for recording and reporting the sensed compression. In a second embodiment, the infant simulator is further equipped with a system for generating a perceptible distress signal when compression is sensed. A preferred embodiment combines both the recording/reporting and signaling systems so that the student caring for the infant simulator is immediately notified that they have injured the infant simulator, and the recorded information can be reviewed by a program administrator upon completion of the assignment.

Position Sensor

An infant should sleep and rest while lying on its back or side. An infant should rarely lie face down or be hung upside down. The infant simulator can be equipped with a position sensor capable of sensing the vertical and horizontal positioning of the infant simulator.

In a first embodiment, the infant simulator is further equipped with a system for recording and reporting the sensed positioning. In a second embodiment, the infant simulator is further equipped with a system for generating a perceptible positioning distress signal when the infant simulator is improperly positioned. A preferred embodiment combines both the recording/reporting and signaling systems so that the student caring for the infant simulator is advised when the infant is improperly positioned, and the recorded information can be reviewed by a program administrator upon completion of the assignment.

Diaper Sensor

Infants should usually be diapered during most of the day, with the exception of certain limited activities such as bathing. Hence, a realistic simulation should require that the infant simulator remain diapered throughout the assignment period.

In a first embodiment, the infant simulator is equipped with a system for recording and reporting the sensed absence of a diaper on the infant simulator. In a second embodiment, the infant simulator is further equipped with a system for generating a perceptible missing-diaper signal when the infant simulator is not diapered. A preferred embodiment combines both the recording/reporting and signaling systems so that the student caring for the infant simulator is advised when the infant is not diapered, and the recorded information can be reviewed by a program administrator upon completion of the assignment.

More specifically, the infant simulator can be equipped with (i) a sensor for detecting the presence and absence of a diaper on the infant simulator, (ii) a system in communication with the diaper sensor for generating a perceptible missing diaper signal when the diaper sensor detects a prolonged (e.g., greater than twenty minutes) absence of a diaper on the infant simulator, (iii) a system in communication with the missing diaper signal generating system for arresting the diaper-missing signal in response to receipt of a diaper-present satisfaction signal, and (iv) a diaper configured and arranged to be fitted over the lower torso of the infant simulator as a diaper, with the diaper having a means effective for being detected by the diaper sensor and transmitting the diaper-present satisfaction signal to the diaper-missing signal arresting system when the diaper is fitted on the infant simulator.

Demand Events

Diaper Change

Infants require periodic diaper changes. A realistic simulation of a diaper change should include the actual changing of a diaper. By requiring a first "soiled" diaper to be removed and a new "clean" diaper placed upon the infant simulator, the person caring for the infant simulator learns that you must carry an extra diaper at all times, and gains a more complete understanding of the requirements of an actual diaper change (e.g., a person carrying the infant simulator into a restaurant would, assuming some level of modesty and etiquette, take the infant simulator to the rest room to change the diaper).

The infant simulator can be equipped with (i) a system for generating a perceptible diaper-change signal, (ii) a system in communication with the diaper-change signal generating system for arresting the diaper-change signal in response to receipt of a diaper-change satisfaction signal, and (iii) a diaper configured and arranged to be fitted over the lower torso of the infant simulator as a diaper, with the diaper having a means effective for transmitting the diaper-change satisfaction signal to the diaper-change signal arresting system when the diaper is fitted on the infant simulator.

The infant simulator can further be equipped with a system for measuring, recording and reporting the number and duration of each diaper-change episode (i.e., the number of times the perceptible diaper-change signal is generated and the time periods between initiation of the perceptible diaper-change signal and completion of a diaper change effective for transmitting the diaper-change satisfaction signal.).

Rocking

Infants often like to be gently rocked. Parents and other care providers will often rock an infant when the infant is fidgety or fussy, or when the person simply wants to comfort the infant. A realistic simulation of rocking should require actual rocking of the infant simulator.

The infant simulator can be equipped with (i) a system for generating a perceptible rocking-request signal, and (ii) a system in communication with the rocking-request signal generating system for detecting rocking of the infant simulator and arresting the rocking-request signal when rocking is detected.

The infant simulator can further be equipped with a system for measuring, recording and reporting the number and/or duration of rocking-request episodes (i.e., the number of times the perceptible rocking-request signal is generated and the time periods between initiation of the perceptible rocking-request signal and the commencement of rocking.).

Feeding with Burp

Infants must be regularly fed. A realistic simulation of a feeding should require both feeding and burping of the infant simulator. In order to accurately emulate a feeding, the infant simulator can be equipped with both a feeding-request module and a burping-request module, with the burping-request module requiring actual patting of the infant simulator.

The feeding module can include (i) a system for generating a perceptible feeding-request signal, (ii) a system in communication with the feeding-request signal generating system for arresting the feeding-request signal in response to receipt of a feeding signal, and (iii) a device for transmitting the feeding signal to the feeding-request signal arresting system when placed in communicative proximity to the infant simulator whereby the feeding-request signal is arrested.

The burping module can include (i) a system for generating a perceptible burping-request signal, (ii) a system for initiating generation of the burping-request signal in communication with both the feeding-request module and the burping-request signal generating system for initiating generation of the burping-request signal after the feeding signal is received by the feeding-request module, and (iii) a system in communication with the burping-request signal generating system for detecting patting of the infant simulator and arresting the burping-request signal when patting is detected.

The infant simulator can further be equipped with a means for individually or separately measuring, recording and reporting the number and/or duration of each feeding-request episode (i.e., the number of times the perceptible feeding-request signal is generated and the time periods between initiation of the perceptible feeding-request signal and the commencement of feeding) and each burping-request episode (i.e., the number of times the perceptible burping-request signal is generated and the time periods between initiation of the perceptible burping-request signal and the commencement of patting.).

Fussy and Demand Events

Infants will occasionally fuss for one reason or another and, despite every effort by the parent or other care-provider, cannot be comforted. In such situations, the infant tends to continue fussing until the unknown cause of the fussing dissipates of its own accord. In order to accurately emulate the frustration encountered by parents and other care-providers in such situations, the infant simulator can be equipped with a demand event module (e.g., a diaper-change module, a rocking module, a feeding module, etc.) and a fussing module, wherein only the demand event module is capable of being satisfied.

The demand event module can include (i) a system for generating a perceptible demand signal, (ii) a system in communication with the demand signal generating system for arresting the demand signal in response to receipt of a satisfaction signal, and (iii) a device for transmitting the satisfaction signal to the demand signal arresting system when placed in communicative proximity to the infant simulator whereby the demand signal is arrested.

The fussing module can include (i) a system for generating a perceptible fussing signal, (ii) a fussing interval timer in communication with the fussing signal generating system for initiating generation of the fussing signal at intervals; and (iii) a fussing duration timer in communication with the fussing signal generating system for terminating generation of the fussing signal at the end of a fussing period.

Since the fussing module does not include a system capable of arresting the fussing signal, the fussing signal will necessarily continue until the end of the fussing period regardless of the actions of the student.

Rest

Infants need frequent rest periods and naps during which the infant should not be stimulated (e.g., limited movement of the infant and limited noise levels reaching the infant). A realistic simulation of caring for an infant should include rest periods during which interaction with the infant simulator must be minimized (e.g., no movement above a threshold force and no sounds above a threshold decibel level).

The infant simulator can be equipped with (i) a system for generating a perceptible rest-request signal, and (ii) a system in communication with the rest-request signal generating system for detecting resting of the infant simulator (i.e., limited movement and sounds) and arresting the rest-request signal when resting is detected.

The infant simulator can further be equipped with a system for measuring, recording and reporting the number and/or duration of each rest-request episode (i.e., the number of times the perceptible rest-request signal is generated and the time periods between initiation of the perceptible rest-request signal and the commencement of resting.).

Ancillary Features

The features described below are labeled as ancillary features because they function to enhance performance of an infant simulator exhibiting at least one type of an environmental or demand event. For practical purposes, the disclosed ancillary features are operable in combination with the modules disclosed herein as well as any other modules requiring the student to interact with the infant simulator (i.e., remove the infant simulator from the unacceptable environment or provide the infant simulator with the appropriate satisfaction signal.).

Multiple Behavior Modes Feature

Infants have different care requirements, dependent upon several factors such as the age of the infant, the disposition of the infant, the level of care historically provided the infant, whether it is daytime or night time, whether the child is sick or healthy, etc. For example, some infants will sleep continuously for several hours at night, while others will wake almost every hour and require some type of attention. In order to emulate the different care requirements of infants, the infant simulator can be equipped to (i) permit a program administrator to select between several programming options which require different types and/or levels of care, and/or (ii) change the behavior of the infant simulator during the course of an assignment period due to such factors as time of day, sickness, or level of care provided by the student.

Selected at the Beginning of an Assignment Period

Age

The care requirements of an infant change as they age. For example, newborn infants generally require more frequent care than a six month old infant. In order to emulate the different care requirements of infants as they age, the infant simulator can be equipped to permit a program administrator to select between several programs which require different age appropriate types of care. In a preferred embodiment, the types of care can be set to represent the care requirements of a newborn infant, a three month old infant and a six month old infant, thereby allowing the program administrator to change the simulation for each student.

This feature can also enhance a student's sense of participation and involvement in the program by allowing the student to select the age of the infant.

Feeding Method

The care requirements of a breast fed infant are generally different than those of a bottle fed infant. For example, breast fed infants tend to require more frequent feedings and diaper changes, while bottle feeding requires preparation time before and clean-up time after each feeding. In order to emulate the different care requirements of breast fed and bottle fed infants, the infant simulator can be equipped to permit a program administrator to select between a breast fed program and a bottle fed program. In a preferred embodiment, the breast fed program would provide a greater frequency of feeding and diaper change periods, while the bottle fed program would provide for longer feeding and diaper change periods. In addition, the breast fed program could require that feeding occur in a private location (e.g., feeding can only be provided with limited noise levels), while the bottle fed program could require morning and/or evening attendance periods, designed to simulate the time required to prepare the bottles, and/or the insertion of an actual bottle in order to feed the infant.

This feature can also enhance a student's sense of participation and involvement in the program by allowing the student to select whether to breast feed or bottle feed the infant.

Disposition

Different infants have different care requirements due to the disposition of the infant. These different levels of care can be produced by altering the time interval between demand events (i.e., increase or decrease the number of events occurring within an assignment period) and/or altering the duration of each demand period (i.e., increase or decrease the length of each period). The different levels of care can be set to represent the care requirements of an easy, an average and a difficult infant, thereby allowing the program administrator to change the simulation for each student.

Occurring During an Assignment Period

Daytime/Night Time Feature

Infants tend to have different care requirements during the daytime (e.g., between the hours of about 8:00 a.m. and 8:00 p.m., more preferably between the core hours of about 9:00 a.m. and 6:00 p.m.) and the night time (e.g., between the hours of about 8:00 p.m. and 8:00 a.m., more preferably between the core hours of about 10:00 p.m. and 6:00 a.m.). As a general matter, night time care requirements are less than daytime requirements, with longer intervals between demand events and shorter demand periods during the night time hours.

In order to emulate the different care requirements of an infant during night time hours, the infant simulator can be equipped with an internal clock, set to the actual time of day, and the microcontroller unit programmed to decrease the duration of demand periods and/or increase the time intervals between demand events occurring during night time hours.

Historical Level of Care

The infant simulator can be programmed to increase or decrease the level of care required by the infant simulator based upon the level of care provided by the student during an assignment period. For example, failure to provide a satisfaction signal within a defined time limit (e.g., two minutes) for a defined number of consecutive demand events (e.g., three demand events), failure to respond to a single demand event within a demand period, or subjecting the infant simulator to physical abuse, can cause the infant simulator to increase the level of care required from easy to average (e.g., decreasing the time interval between events and/or increasing the duration of each period).

Sick Period Feature

Infants tend to require additional care when they are sick. In order to emulate the increased care requirements of a sick infant, the infant simulator can be programmed to initiate a sick period, during which the duration of demand periods occurring within the sick period are increased and/or the time interval between demand periods occurring within the sick period are decreased.

The infant simulator can further be equipped with (i) a system for generating a perceptible sick signal, and (ii) a system for recording and reporting the occurrence of a sick period.

Comatose Feature

The infant simulator can include a sensor and/or programming to detect severe abuse or neglect rising to the level of a pernicious event (e.g., extreme thermal exposure, abusive compression, an abusive impact, or prolonged failure to feed), measured in terms of the duration and/or force of the abuse and/or neglect, and causing the infant simulator to enter into a coma (e.g., recording and reporting of severe abuse/neglect and cessation of all program functions). The infant simulator can also optionally (i) signal the student to seek immediate medical attention for the comatose infant (e.g., a password or medical care key possessed by a "medical representative" such as the program administrator) to prevent the infant from dying, and/or (ii) measure, record and report the occurrence and/or duration of the medical request episode (i.e., the occurrence of such an incident and the time period between initiation of the perceptible medical attention-request signal and receipt of the medical attention-received signal.).

Contented Signal Feature

The responsibility of caring for an infant can engender the contrasting emotions of fulfillment and frustration. A realistic simulation of caring for an infant should include environmental events, demand events and ancillary features emulating both the positive and negative aspects of caring for an infant.

The infant simulator can be equipped with a contented condition submodule for providing positive feedback to the student when proper care is provided. The contented submodule can include (i) a system for generating a perceptible contented signal, and (ii) a system in communication with a demand event module and the perceptible contented signal generating system for initiating generation of the contented signal after a satisfaction signal has been timely received by the demand event module.

Grace Period Feature

Those caring for an infant cannot be expected to remain within arms reach of the infant at all times, but are expected to remain close enough to promptly respond to the infant. Hence, in order to provide meaningful and realistic information to the program administrator as to the level of care provided by a student caring for the infant simulator, the simulator can be programmed to provide a grace period (e.g., about 1 to 3 minutes, preferably 2 minutes) after the initiation of a demand signal, within which the student can provide the appropriate satisfaction signal and the duration of the demand episode is recorded as zero. The recorded and reported duration of those demand episodes having a duration longer than the grace period can include or exclude the grace period as desired, with the program administrator advised as to the option selected so that they may accurately interpret the recorded and reported data and provide appropriate feedback to the student.

A grace period can also be usefully implemented in connection with certain environmental events (e.g., exposure to unacceptable environmental conditions of temperature, smoke, sunlight or position) where a limited period of exposure (e.g., exposure to cool conditions of between 05–15° C. for less than 30 seconds) is generally not harmful to the infant. However, a grace period should not be implemented for those unacceptable environmental conditions capable of immediately resulting in injury to an infant, such as an abusive impact or abusive compression.

In a preferred embodiment, the infant simulator provides the student with a positive signal whenever the student has responded to the demand signal within the grace period, thereby immediately advising the student that they have provided prompt care and the report provided to the program administrator at the end of the assignment period will reflect that the duration of the demand episode was zero.

Identification System Feature

In order for a student to fully appreciate the responsibility of caring for an infant, and for a teacher to provide meaningful feedback to the student, it is important that the student to whom the infant simulator is assigned tend to the comfort, safety and demands of the infant simulator. In other words, it is important that the infant simulator be equipped with some type of system which requires the assigned student to care for the infant simulator, or at least be present when the duties are discharged.

For purposes of ensuring that the assigned student is at least present when the demands of the infant simulator are being satisfied as required by the demand event module, the infant simulator can be equipped with an identification feature including at least, (i) a system for receiving an identification signal personal to the assigned student, and (ii) a system in communication with the identification-signal receiving system and the demand event module effective for preventing arresting of the demand signal until the identification signal is received by the identification-signal receiving system.

Escalating Distress/Demand Signal Feature

Infants can provide a variety of perceptible signals to parents and other care-providers indicating that an environmental condition is making the infant uncomfortable, or requesting that a need be satisfied. While the most common signal is crying, other signals include fidgeting, fussing, gasping, repeated side-to-side shaking of the head, rubbing of the eyes and face, and whining. In addition, infants will usually escalate the signal over time when the condition continues or the need remains unsatisfied. Hence, a realistic simulation of caring for an infant should provide for an escalation in the strength, intensity and/or severity of a discomfort, distress or demand signal as the condition/need remains unsatisfied over time.

An infant simulator having an environmental event module or a demand event module can be further equipped with a system in communication with the module for escalating the perceptible discomfort, distress or demand signal generated by the discomfort, distress or demand signal generating system as the duration of the environmental discomfort period or demand period increases.

In addition, an infant simulator having an environmental event module or a demand event module can also be equipped with a system in communication with the module for de-escalating an escalated perceptible discomfort, distress or demand signal generated by the discomfort, distress or demand signal generating system once the appropriate satisfaction signal has been transmitted to the infant simulator.

Self-Directed Expression

Infants will occasionally generate a sound and/or action on their own initiative even though they are not seeking any type of interaction with a parent or other care-provider. A myriad of different self-directed expressions are possible, including specifically, but not exclusively, babbling, blinking of the eyes, flailing of the arms and/or legs, giggling, gurgling, hiccuping, laughing, screaming with joy, sighing, smiling, sneezing, spitting, squinting, sucking fingers and/or toes, wrinkling-up of the nose, etc.

In order to emulate these self-directed expressions, and enhance the reality of the simulation, the infant simulator can be equipped with a module (hereinafter "expression module") capable of periodically generating a self-directed expression without regard to any effort on the part of the student to elicit such an expression.

The expression module comprises a system for periodically generating a perceptible self-directed expression. Since the self-directed expressions will generally be of the type which occurs briefly and is not typically perceived by a parent as requiring satisfaction, the self-directed expression module need not include a system capable of arresting the sound and/or action. Hence, the self-directed expression will necessarily continue until completed, regardless of the actions of the student.

Sound Recording

The infant simulator may optionally be equipped with a sound recorder (e.g., a standard tape recorder or a solid state sound recording device) for purposes of recording the verbal reaction of a student and others near the infant simulator to the various requirements of the infant simulator, for later review by the student and/or the program administrator. In order to provide a recording of useful duration, the sound recorder should be configured and arranged to record only when (i) a verbal reaction can be expected from the student (e.g., a three minute period after commencement of a demand event or during a pernicious event), and/or (ii) loud sounds are detected (e.g., yelling, screaming or shouting). The infant simulator can also include a voice recognition system in communication with the sound recorder for activating the sound recorder whenever the assigned student's voice is detected.

DETAILED DESCRIPTION OF THE INVENTION INCLUDING A BEST MODE

Definitions

Figure 1:
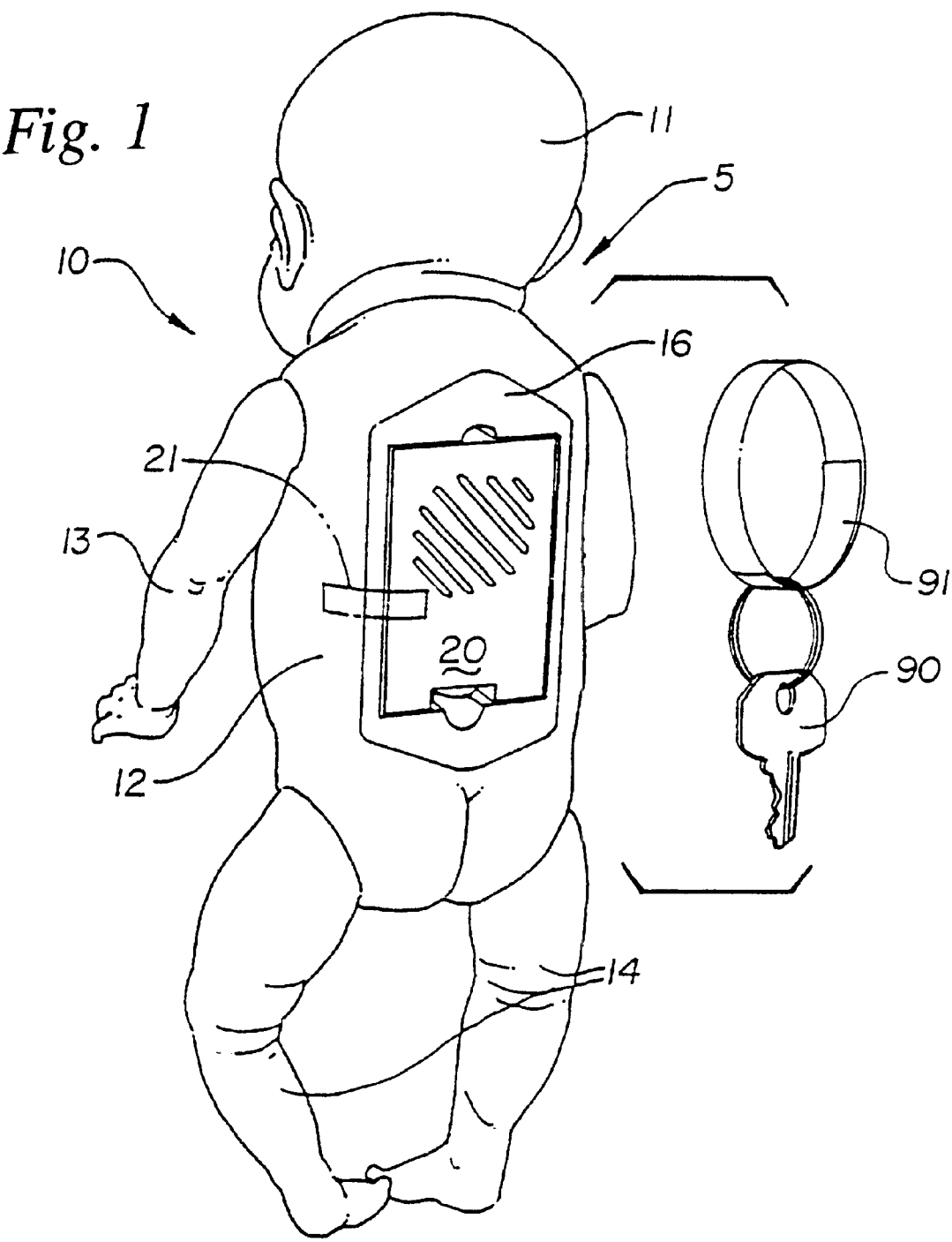
FIG. 1 is a perspective view of one embodiment of the infant simulator including one embodiment of an identification key and tamper indicating wristband.

As utilized herein, including the claims, the phrase "abusive impact," means an impact of a magnitude such that discomfort or injury would normally be inflicted upon an actual infant. An impact having a magnitude insufficient to be classified as an "abusive impact" includes specifically, but not exclusively, an impact resulting from such routine activities as bathing, patting to elicit a burp, ordinary handling, rocking, etc.

As utilized herein, including the claims, the term "activated," when used to describe the condition of an infant simulator, means that (i) at least one of the environmental sensors and associated means for recording the sensed environmental variable are sensing and recording (e.g., environmental temperature or compression), and/or (ii) at least one of the demand events is capable of occurring at any time or the time interval to such occurrence is being timed (e.g., diaper-change, feeding, or fussy event).

As utilized herein, including the claims, the term "arrested," when used to describe the condition of a perceptible signal generating means, means that the perceptible signal is no longer expressed, optionally after a wind-down period of diminishing intensity, and includes both termination of the signal (i.e., the perceptible signal will not be generated until reinitiated by the occurrence of a defined environmental condition or demand event), and inhibition of the signal (i.e., the perceptible signal will be expressed upon the removal or cessation of a specific condition or generation of a satisfaction signal).

As utilized herein, including the claims, the phrase "assignment period," means the period of time during which the infant simulator is activated and the assigned person or team is given custody of the infant simulator (e.g., overnight, 48 hours, one week, etc.).

As utilized herein, including the claims, the terms "brief" and "prolonged" are used as complementary relative terms wherein neither is specifically limited in duration, but brief is always of a shorter duration than prolonged.

As utilized herein, including the claims, the phrase "burping-request episode," refers to that portion of a burping-request event beginning when a perceptible burping-request signal is initiated and ending when patting of the infant simulator is commenced. It is noted for purposes of clarity that this definition is not intended to mandate the specific signal received by the burping-request episode duration measuring means for initiating the timing of a burping-request episode (e.g., timing of a burping-request episode can be initiated by a signal emanating from the burping-request interval timer or a signal generated by the perceptible burping-request signal generating means), nor specify the particular sequence by which an electrical signal must travel through the burping-request module (e.g., the burping-request module may be configured and arranged so that the burping-request episode duration measuring means receives a signal to start timing a burping-request episode before, after or simultaneously with the receipt of a corresponding signal by the perceptible burping-request signal generating means).

As utilized herein, including the claims, the phrase "burping-request event," means generation of a burping-request signal capable of being arrested upon receipt of a burping-request satisfaction signal (e.g., rocking of the infant simulator), and optionally followed by the measuring and recording of data effective for reporting the occurrence of a burping-request event and the level of care provided by a student in response to the burping-request signal.

As utilized herein, including the claims, the phrase "burping-request period," means the period of time during which the burping-request signal will be generated and expressed by the infant simulator unless a burping-request satisfaction signal is being continuously received by the infant simulator.

As utilized herein, including the claims, the phrase "abusive compression," means compression of a magnitude such that discomfort or injury would normally be inflicted upon an actual infant. A compression having a magnitude insufficient to be classified as an "abusive compression" include specifically, but not exclusively, a compression resulting from such routine activities as bathing, patting to elicit a burp, ordinary handling, hugging, lying on a carpeted floor, rubbing of the stomach, light tickling, etc.

As utilized herein, including the claims, the term "continuous," when used in connection with the activity of feeding the infant simulator, means that the feeding signal transmitting means (e.g., a bottle) is held in communicative position relative to the infant simulator by a student so as to transmit the feeding signal to the feeding-request system (e.g., the bottle is inserted into the mouth of the infant simulator) without release of the feeding signal transmitting means by the student for any appreciable time period (i.e., from a fraction of a second up to as long as about five seconds).

As utilized herein, including the claims, the term "continuous," when used in connection with the activities of rocking the infant simulator and burping the infant simulator for purposes of responding to a rocking-request signal or a burping-request signal, means that the infant simulator is subjected to appropriate levels of accelerative motion without stop, or accelerative motion separated only by stationary periods of modest duration (i.e., from a fraction of a second up to as long as about five seconds).

As utilized herein, including the claims, the term "continuous," when used in connection with the recording of temperature values, means that the temperature is recorded on a predetermine schedule (e.g., every nanosecond, every second, every ten seconds, every two minutes, etc.) without interruption.

As utilized herein, including the claims, the phrase "demand episode," refers to that portion of a demand event beginning when a perceptible demand signal is generated and ending when an appropriate satisfaction signal is provided. Exemplary, demand episodes include specifically, but not exclusively, diaper-change episodes, feeding-request episodes, burping-request episodes, rest-request episodes and rocking-request episodes.

As utilized herein, including the claims, the phrase "demand event," means generation of a demand signal capable of being arrested upon receipt of an appropriate satisfaction signal, and optionally followed by the measuring and recording of data effective for reporting the occurrence of a demand event and the level of care provided by a student in response to the demand signal.

As utilized herein, including the claims, the phrase "unsatisfied demand event," refers to a demand event of timed duration which reaches the end of the demand event (i.e., the end of the demand period) without receipt of the appropriate satisfaction signal. In other words, the student did not transmit the satisfaction signal in a timely fashion.

As utilized herein, including the claims the phrase "demand event module" references a module which includes at least (i) a means for generating a perceptible demand signal, and (ii) a means in communication with the demand signal generating means for arresting the demand signal in response to receipt of a satisfaction signal. As a general matter, a "demand event module" signals a student that some type of interaction is required between the student and the infant, and arrests the signal when the required interaction is provided.

As utilized herein, including the claims, the phrase "demand period," means the period of time during which the demand signal will be generated and expressed by the infant simulator unless a satisfaction signal is being received by the infant simulator. Exemplary, demand periods include specifically, but not exclusively, diaper-change periods, feeding-periods, burping periods, resting periods and rocking periods.

As utilized herein, including the claims, the phrase "diaper-change episode," refers to that portion of a diaper-change event beginning when a perceptible diaper-change signal is initiated and ending when a diaper-change satisfaction signal is transmitted. It is noted for purposes of clarity that this definition is not intended to mandate the specific signal received by the diaper-change module for initiating or terminating the timing of a diaper-change episode (e.g., timing of a diaper-change episode can be initiated by a signal emanating from the diaper-change interval timer or a signal generated by the perceptible diaper-change signal generating means), nor specify the particular sequence by which an electrical signal must travel through the diaper-change module (e.g., the diaper-change module may be configured and arranged so that the diaper-change duration timer receives a signal to start timing a diaper-change episode before, after or simultaneously with the receipt of a corresponding signal by the perceptible diaper-change signal generating means).

As utilized herein, including the claims, the phrase "diaper-change event," means generation of a diaper-change signal capable of being arrested upon receipt of a diaper-change satisfaction signal (e.g., changing of the diaper on the infant simulator), and optionally followed by the measuring and recording of data effective for reporting the occurrence of a diaper-change event and the level of care provided by a student in responding to the diaper-change signal.

As utilized herein, including the claims, the phrase "diaper-change period," means the period of time during which the diaper-change signal will be generated and expressed by the infant simulator unless a diaper-change satisfaction signal is received by the infant simulator.

As utilized herein, including the claims, the phrase "missing-diaper period," means the time period beginning when the absence of a diaper is detected (i.e., the presence of a diaper fitted onto the torso of the infant simulator as a diaper is not detected) and ending when a diaper is fitted onto the torso of the infant simulator as a diaper and the presence of the diaper is detected.

As utilized herein, including the claims, the phrase "distress period," when used in connection with the generation of a distress signal, means a time period beginning immediately or shortly after sensing of an abusive compression or abusive impact, and ending after a time period of predetermined or bounded random duration measured from either commencement or termination of the abuse. When the end of a distress period is measured from commencement of the abuse, the distress period should be selected so as to have a longer duration than any anticipated abusive compression or abusive impact (e.g., a minimum distress period of 15 seconds when the typical duration of an abusive compression is about 5 to 10 seconds) in order to avoid an anomalous situation in which the distress period (i.e., the distress signal) ends before the abuse stops. Alternatively, when the end of a distress period is measured from termination of abuse, the distress period may have any desired duration since the distress period, by definition, cannot end before the abuse ends.

As utilized herein, including the claims, the term "mannequin" means a figure representative of a human being and including at least a portion representing a head and a portion representing a torso. A device providing an electronic representation of a human being (e.g., an LCD screen displaying a human figure), and a device displaying a printed image of a human (e.g., an egg shaped base with a picture of a human infant laminated to a flattened surface of the base) are specifically included within the definition of a "mannequin." The figure is preferably shaped as an infant and includes arms and legs. Other physical features can be represented as desired, including specifically, but not exclusively, hair, eyes, eye lashes, eyebrows, ears, nose, mouth, hands, fingers, fingernails, aureole, bellybutton, genitalia, feet, toes, toenails, skin pigmentation, and physical deformities.

As utilized herein, including the claims, the phrase "environmental condition," means an external condition imposed upon the infant simulator. Exemplary environmental conditions include specifically, but not exclusively, (i) horizontal and vertical positioning of the infant simulator, (ii) the temperature to which the infant simulator is exposed, (iii) compression of the infant simulator, (iv) exposure of the infant simulator to smoke, (v) physical abuse of the infant simulator, (vi) verbal abuse of the infant simulator, (vii) exposure of the infant simulator to bright light, (viii) overstimulation of the infant simulator, (ix) complete submersion of the infant simulator in water, (x) exposure of the infant simulator to loud noises, (xi) maintaining a diaper on the infant simulator, etc.

As utilized herein, including the claims, the phrase "unacceptable environmental condition," means an environmental condition to which an actual human infant should not be subjected due to the discomfort and/or possibility of injury imposed by such exposure. Exemplary unacceptable environmental conditions include specifically, but not exclusively, (i) positioning of the infant simulator on its stomach during a rest period, (ii) exposing the infant simulator to temperatures in excess of 40° C., (iii) abusive compression of the infant simulator, (iv) exposing the infant simulator to cigarette smoke, (v) striking or dropping of the infant simulator, (vi) screaming at the infant simulator, (vii) exposing the infant simulator to direct sunlight, (viii) completely submersing the infant simulator in water, etc.

As utilized herein, including the claims, the phrase "environmental discomfort period," means the time period beginning when an unacceptable environmental condition is sensed (e.g., temperature outside acceptable temperature range or abusive impacts sensed), and ending when the environmental condition returns to an acceptable level (e.g., temperature within acceptable temperature range or absence of abusive impacts).

As utilized herein, including the claims, the phrase "environmental event," means the sensing of an unacceptable environmental condition followed by the generation of a distress or discomfort signal and/or the measuring and recording of data effective for reporting the sensing of an unacceptable environmental condition and/or evaluating the extent of the distress or discomfort created by the unacceptable environmental condition.

As utilized herein, including the claims, the phrase "feeding-request episode," refers to that portion of a feeding-request event beginning when a perceptible feeding-request signal is initiated and ending upon transmission of a feeding satisfaction signal. It is noted for purposes of clarity that this definition is not intended to mandate the specific signal received by the feeding-request module for initiating or arresting the timing of a feeding-request episode (e.g., timing of a feeding-request episode can be initiated by a signal emanating from the feeding-request interval timer or a signal generated by the perceptible feeding-request signal generating means), nor specify the particular sequence by which an electrical signal must travel through the feeding-request module (e.g., the feeding-request module may be configured and arranged so that the feeding-request duration timer receives a signal to start timing a feeding-request episode before, after or simultaneously with the receipt of a corresponding signal by the perceptible feeding-request signal generating means).

As utilized herein, including the claims, the phrase "feeding-request event," means generation of a feeding-request signal capable of being arrested upon receipt of a feeding-request satisfaction signal (e.g., placement of a bottle into the mouth of the infant simulator), and optionally followed by the measuring and recording of data effective for reporting the occurrence of a feeding-request event and the level of care provided by a student in response to the feeding-request signal.

As utilized herein, including the claims, the phrase "feeding-request period," means the period of time during which the feeding-request signal will be generated and expressed by the infant simulator unless the appropriate satisfaction signal (i.e., a feeding signal) is being continuously received by the infant simulator.

As utilized herein, including the claims, the term "infant" refers to a young human ranging in age from a newborn, including a premature newborn, to an approximately one year old child.

As utilized herein, including the claims, the term "key" refers to any device configured and arranged to fit within and communicate with a complementary keyhole, including specifically, but not exclusively a passkey of specified configuration, a card having holes in a specified pattern, a card bearing information on a magnetic strip, a magnet of specified strength and configuration, etc.

As utilized herein, including the claims, the phrase "medical attention signal" means a perceptible signal effective for conveying notice to a student that the infant simulator is in need of professional medical attention. Exemplary medical attention signals including specifically, but not exclusively audible signals (e.g., prolonged intense screaming), olfactory signals (e.g., continuous emission of odorous stench), tactile signals (e.g., bumps on the skin), visual signals (e.g., rubbing the stomach or LCD display), and multimedia signals (e.g., screaming and rubbing the stomach).

As utilized herein, including the claims, the phrase "medical attention episode," refers to that portion of a medical attention event beginning when a perceptible medical attention-request signal is initiated by the infant simulator and ending when a medical attention-received signal is transmitted to the infant simulator.

As utilized herein, including the claims, the phrase "medical attention event," means generation of a medical attention-request signal capable of being arrested upon receipt of a medical attention received signal (e.g, insertion of a key marked "doctor"), and optionally followed by the measuring and recording of data effective for reporting the occurrence of a medical attention event and the level of care provided by a student in response to the medical attention-request signal.

As utilized herein, including the claims, the phrase "unsatisfied medical attention event," refers to a medical attention event of timed duration which reaches the end of the medical attention event (i.e., the end of the medical attention period) without receipt of the medical attention-received signal. In other words, the student did not transmit the medical attention-received signal in a timely fashion).

As utilized herein, including the claims, the phrase "medical attention-period," means the period of time available for a student to transmit a medical-attention-received signal to the infant simulator in response to a medical attention-request signal in order to prevent death of the infant simulator.

As utilized herein, including the claims, the term "overstimulated," means to be exposed to elevated but generally accepted types and levels of noise and/or motion for such an extended continuous duration and/or prolonged periodicity that an actual infant could become irritable. Examples include specifically, but not exclusively, sitting through an amplified concert, continuous passing of the infant from person to person at a family reunion, watching a long parade, etc.

As utilized herein, including the claims, the phrase "overstimulation period," means the time period beginning when the extent of recent stimulatory actions become overstimulation, and ending when the extent of recent stimulatory actions is reduced below a defined extent of stimulation.

As utilized herein, including the claims, the phrase "pernicious event" means an event of such a nature (e.g., thermal exposure, abusive compression of the head, shaking, etc.) and magnitude (e.g., extreme force and/or prolonged duration) that an actual infant experiencing such an event would be expected to experience severe injuries. Pernicious events include pernicious thermal exposure, pernicious compression, pernicious impact, pernicious exposure to smoke, etc.

As utilized herein, including the claims, the phrase "predetermined value" means a specific value (e.g., 10 minutes) and includes both permanently assigned values (e.g., a duration period which is always 10 minutes) and values assigned for an assignment period and capable of being reassigned for subsequent assignment periods (e.g., a time interval predetermined at the start of an assignment period as 2, 5 or 7 minutes).

As utilized herein, including the claims, the phrase "random variable" is used in accordance with the dictionary definition of random variable (i.e., a variable that is a function of the result of a statistical experiment in which each outcome has a definite probability of occurrence, such as the number of spots showing if two dice are thrown). The phrase "bounded random variable" means that the random variable must fall within defined minimum and maximum values (i.e., the variable must be greater than 0 and less than 13).

As utilized herein, including the claims, the phrase "rest period," means the period of time during which a rest-request signal will be generated and expressed should the infant simulator detect movement of the infant simulator and/or sounds above a defined threshold value.

As utilized herein, including the claims, the term "restricted" means limited access, with access generally achievable only upon the exercise of intentional and deliberate actions directed toward the objective of achieving such access (e.g., removing a machine screw, cutting a closure band, entering an access code, removing a tamper indicating label, etc.).

As utilized herein, including the claims, the phrase "rocking-request episode," refers to that portion of a rocking-request event beginning when a perceptible rocking-request signal is initiated and ending upon transmission of a rocking-request satisfaction signal (i.e., commencement of rocking). It is noted for purposes of clarity that this definition is not intended to mandate the specific signal received by the rocking-request module for initiating or arresting the timing of a rocking-request episode (e.g., timing of a rocking-request episode can be initiated by a signal emanating from the rocking-request interval timer or a signal generated by the perceptible rocking-request signal generating means), nor specify the particular sequence by which an electrical signal must travel through the rocking-request module (e.g., the rocking-request module may be configured and arranged so that the rocking-request duration timer receives a signal to start timing a rocking-request episode before, after or simultaneously with the receipt of a corresponding signal by the perceptible rocking-request signal generating means).

As utilized herein, including the claims, the phrase "rocking-request event," means generation of a rocking-request signal capable of being arrested upon receipt of a rocking-request satisfaction signal (e.g., rocking of the infant simulator), and optionally followed by the measuring and recording of data effective for reporting the occurrence of a rocking-request event and the level of care provided by a student in response to the rocking-request signal.

As utilized herein, including the claims, the phrase "rocking period," means the period of time during which the rocking-request signal will be generated and expressed by the infant simulator unless the appropriate satisfaction signal (i.e., a rocking motion) is being continuously received by the infant simulator.

As utilized herein, including the claims, the phrase "normal room lighting" refers to the interior lighting of a dwelling typically provided by incandescent, fluorescent and/or halogen light fixtures. As a general matter, such interior lighting is less than 1,000 foot-candles, typically less than 500 foot-candles, and frequently less than 100 foot-candles.

As utilized herein, including the claims, the phrases "adjusting the potential duration of a period," and "adjusting the potential duration of a time interval" means changing the probability of occurrence such that a longer or shorter duration is more likely to occur. Such adjustment can occur by (i) changing one or both of the endpoints of the time range from which the duration of the period or interval can be selected (e.g., a change from a 10 to 20 minute time range to a 10 to 50 minute time range or a change from a 10 to 20 minute time range to a 40 to 50 minute time range), and/or (ii) changing the statistical preference for a time value within a defined time range (e.g., a change from a 10 to 20 minute time range with a 40% chance of selecting a duration of 15 to 20 minutes to a 10 to 20 minute time range with an 80% chance of selecting a duration of 15 to 20 minutes).

As utilized herein, including the claims, the phrase "selected periods" means a portion of the total number of periods, chosen at random or according to predetermined selection criteria (e.g., every third period, only fussy and diaper change periods, only periods occurring between 10:00 p.m. and 6:00 a.m., etc.).

As utilized herein, including the claims, the phrase "perceptible signal" means any and all means of communication capable of conveying notice or warning to a student, including specifically, but not exclusively audible signals (e.g., crying), olfactory signals (e.g., emission of odorous gas), tactile signals (e.g., wet diaper), visual signals (e.g., gesture), and multimedia signals (e.g., crying and tears).

As utilized herein, including the claims, the phrase "sick period," means the period of time during which the care requirements of the infant simulator are altered to reflect the additional care required by a sick infant (i.e., time interval between sequential demand events is decreased and/or duration of demand periods is increased).

As utilized herein, including the claims, the phrase "stimulation sensor" refers to sensors effective for sensing stimulation of an infant (i.e., an environmental condition effective for stimulating the senses of an infant). Exemplary stimulations include specifically, but not exclusively contact with water, noise, movement, touching the infant, etc.

As utilized herein, including the claims, the phrase "discomfort signal" means a perceptible signal effective for conveying notice to a student that the infant simulator is being subjected to an unacceptable environmental condition. Exemplary discomfort signals including specifically, but not exclusively, audible signals (e.g., crying), tactile signals (e.g. bumps on the skin), visual signals (e.g., an LCD display), and multimedia signals (e.g., screaming and an LCD display).

As utilized herein, including the claims, the phrase "substantially identical signals," refers to signals perceived by the same sense (e.g., audible signals) and of the same general type (e.g., crying sound, shaking body, floral smell, etc.) with some aspect of the signals perceptibly different (e.g., different pitch, different rate, different intervals between repetitions, different volumes, etc.).

As utilized herein, including the claims, the phrase "self-directed expression," means an action, gesture, sound or other perceptible sign capable of being generated by an actual human infant and of a nature which a reasonable care-provider would not typically perceive as either requiring an interactive response from the care-provider or signaling a need or demand of the infant. Exemplary self-directed expressions include babbling, blinking of the eyes, flailing of the arms and/or legs, giggling, gurgling, hiccuping, laughing, screaming with joy, sighing, smiling, sneezing, spitting, squinting, sucking fingers and/or toes, wrinkling-up of the nose.

As utilized herein, including the claims, the phrase "smoke exposure period," means the time period beginning when smoke is detected and ending when smoke is no longer detected.

As utilized herein, including the claims, the term "student," means a person participating in a parenting or child-care educational program including traditional school age children and adults.

As utilized herein, including the claims, the phrase "sunlight exposure period," means the time period beginning when exposure to direct sunlight (i.e., light having a luminance exceeding a defined threshold value) is detected and ending when direct exposure to sunlight is no longer detected.

As utilized herein, including the claims, the phrase "thermal exposure period," means the time period beginning when a sensed temperature falls outside a defined acceptable temperature range and ending when a subsequently sensed temperature falls within the defined acceptable temperature range.

As utilized herein, including the claims, the phrase "cold temperature thermal exposure period," means the time period beginning when a sensed temperature falls below a defined acceptable minimum temperature and ending when a subsequently sensed temperature falls above the defined acceptable minimum temperature.

| NOMENCLATURE | |
|---|---|
| 05 | Infant Simulator |
| 10 | Mannequin |
| 11 | Head |
| 12 | Torso |
| 13 | Arms |
| 14 | Legs |
| 16 | Back of Mannequin |
| 20 | Central Microcontroller Unit |
| 21 | Tamper Indicating Label |
| 30 | Position Sensor |
| 40 | Temperature Sensor |
| 50 | Compression Sensing System |
| 51 | Electrical Circuit |
| 51a | First Contact |
| 51b | Second Contact |
| 60 | Diaper |
| 60a | First Diaper |
| 60b | Second Diaper |
| 61 | Magnet Attached to Diaper |
| 62 | Diaper-Change Switches |
| 62a | First Diaper-Change Switch |
| 62b | Second Diaper-Change Switch |
| 70 | Motion Sensor (Rocking, Burping, Overstimulation and Abuse) |
| 70' | Motion/Position Sensor |
| 71 | Housing |
| 72 | Chamber |
| 73 | Reflective Sphere |
| 74 | Infrared light source |
| 75 | Infrared phototransistor |
| 80 | Bottle |
| 80n | Nipple of Bottle |
| 81 | Magnet Attached to Bottle |
| 82 | Feed Switch |
| 90 | Identification Key |
| 91 | Tamper Indication Wristband |
| 100 | Initiation Module |
| 110 | Position Sensing Module |
| 120 | Temperature Sensing Module |
| 130 | Compression Sensing Module |
| 140 | Diaper-Change Module |
| 150 | Rocking Module |
| 160 | Feeding Module |
| 170 | Burping Module |
| 180 | Fussy Module |
| 190 | Assignment Period Module |
| 210 | Demand Signal Generating Feature |
| 220 | Recording Feature |
| 225 | Sound Recording Feature |
| 230 | Contented Signal Feature |
| 240 | Escalating Demand Signal Feature |
| 250 | Identification System Feature |
| 260 | Multiple Time Interval Duration Feature |
| 270 | Multiple Period Duration Feature |
| 280 | Comatose Feature |

-continued

NOMENCLATURE

| | |
|---|---|
| 320 | Smoke Detector |
| 330 | Impact Sensing System |
| 340 | Sound Sensor (Overstimulation, Rest) |
| 350 | Light Sensor |
| 360 | Sound Recorder |
| 370 | Missing Diaper Sensor |
| 410 | Expression Module |
| 420 | Smoke Detector Module |
| 430 | Impact Sensing Module |
| 431 | Dropped Infant Submodule |
| 432 | Shaken Infant Submodule |
| 440 | Overstimulation Module |
| 450 | Rest Module |
| 460 | Sick Infant Module |
| 470 | Sun Exposure Module |
| 480 | Loud Sound Sensing System |
| 490 | Missing Diaper Module |
| $S_1$ | Repositioning-Request Signal Generated by the Infant Simulator |
| $S_2$ | Thermal Exposure Signal Generated by the Infant Simulator |
| $S_3$ | Compression Distress Signal Generated by the Infant Simulator |
| $S_4$ | Diaper-Change Signal Generated by the Infant Simulator |
| $St_4$ | Diaper-Change Satisfaction Signal Provided by Student |
| $St_4^+$ | First Diaper-Change Satisfaction Signal |
| $St_4^-$ | Second Diaper-Change Satisfaction Signal |
| $S_5$ | Rocking-Request Signal Generated by the Infant Simulator |
| $St_5$ | Rocking-Request Satisfaction Signal Provided by Student |
| $S_6$ | Feeding-Request Signal Generated by the Infant Simulator |
| $St_6$ | Feeding-Request Satisfaction Signal Provided by Student |
| $S_7$ | Burping-Request Signal Generated by the Infant Simulator |
| $St_7$ | Burping-Request Satisfaction Signal Provided by Student |
| $S_8$ | Fussy Signal Generated by the Infant Simulator |
| $S_9$ | Smoke Exposure Signal Generated by the Infant Simulator |
| $S_{10}$ | Impact Distress Signal Generated by the Infant Simulator |
| $S_{11}$ | Comatose Signal Generated by the Infant Simulator |
| $St_{11}$ | Medical Attention Signal Provided by Student |
| $S_{12}$ | Overstimulation Signal Generated by the Infant Simulator |
| $S_{13}$ | Rest Request Signal Generated by the Infant Simulator |
| $S_{14}$ | Sick Signal Generated by the Infant Simulator |
| $S_{15}$ | Sun Exposure Signal Generated by the Infant Simulator |
| $S_{16}$ | Loud Sound Exposure Signal Generated by the Infant Simulator |
| $S_{17}$ | Missing Diaper Signal Generated by the Infant Simulator |
| $S_{DAY}$ | Daytime/Night Time Signal Generated by the Infant Simulator |
| $E_1$ | Self-Directed Expression Generated by the Infant Simulator |
| + | Positive ("Contented") Signal Generated by Infant Simulator |
| $S^{ID}$ | Identification Signal |
| $Sw^{ID}$ | Identification Switch |
| $Sw^+$ | Positive Signal Switch |
| ↪ | Bypass |

Construction

As shown in FIG. 1, the infant simulator 05 comprises a mannequin 10 having a recess (unnumbered) within the back 16 of the mannequin 10 capable of retaining a central microcontroller unit 20 and a battery pack 25 for powering the central microcontroller unit 20.

A lock-and-key system (not shown) or tamper indicating device, such as a tamper indicating label 21, can be provided for purposes of signaling and/or recording/reporting efforts to remove or otherwise access the central microcontroller unit 20 and/or battery pack 25 from the mannequin 10. Alternatively, the central microcontroller unit 20 can be programmed to record and report the duration of the assignment period, with timing of the assignment period stopped when the microcontroller unit 20 and/or the battery pack 25 is removed from the mannequin 10.

The mannequin 10 preferably has the appearance of a young infant (e.g., approximately 40 to 80 cm in length and approximately 3 to 5 kg in weight) with a head 11, torso 12, arms 13, and legs 14. The mannequin 10 can be sculpted to depict the skin color and facial features of various ethnic groups including specifically, but not exclusively, African American, Asian, Caucasian, Hispanic, and American Indian.

The infant simulator 05 can include a variety of modules designed to emulate the care requirements of an infant. These modules include (i) a position sensing module 110, (ii) a temperature sensing module 120, (iii) a compression sensing module 130, (iv) a diaper-change module 140, (v) a rocking module 150, (vi) a feeding module 160 with or without an associated burping module 170, (vii) a fussy module 180, (viii) an expression module 410, (ix) a smoke detector module 420, (x) an impact sensing module 430, (xi) an overstimulation module 440, (xii) a rest module 450, (xiii) a sickness module 460, and (xiv) a sunlight exposure module 470. The infant simulator 05 can be designed and programmed with any combination of the described modules, including the ability for a program administrator to selectively activate and deactivate individual modules for each assignment period.

The infant simulator 05 is equipped to record and report the quality of care and responsiveness of a person caring for the infant simulator 05 (e.g., recording and reporting the duration of the assignment period and the total duration of all events and episodes) and/or signal the person caring for the infant simulator 05 when care is required.

The modules can be conveniently grouped into the categories of (i) environmental events and (ii) demand events. In addition, the specifics of each event can be adjusted by the use of one or more ancillary features which can be programmed into the central microcontroller unit 20.

Environmental Events

The environmental conditions of physical abuse (i.e., compression and impact), verbal abuse, improper positioning, overstimulation, exposure to smoke, exposure to direct sunlight, and exposure to temperature extremes can be sensed, signaled, recorded and reported.

Physical Abuse Sensing Systems

Compression

The infant simulator 05 can be equipped with a compression sensing system 50 capable of sensing compression of the mannequin 10, such as squeezing of the mannequin's head 11, arms 13 and/or legs 14, and communicating any sensed compression to the central microcontroller unit 20.

Figure 3:
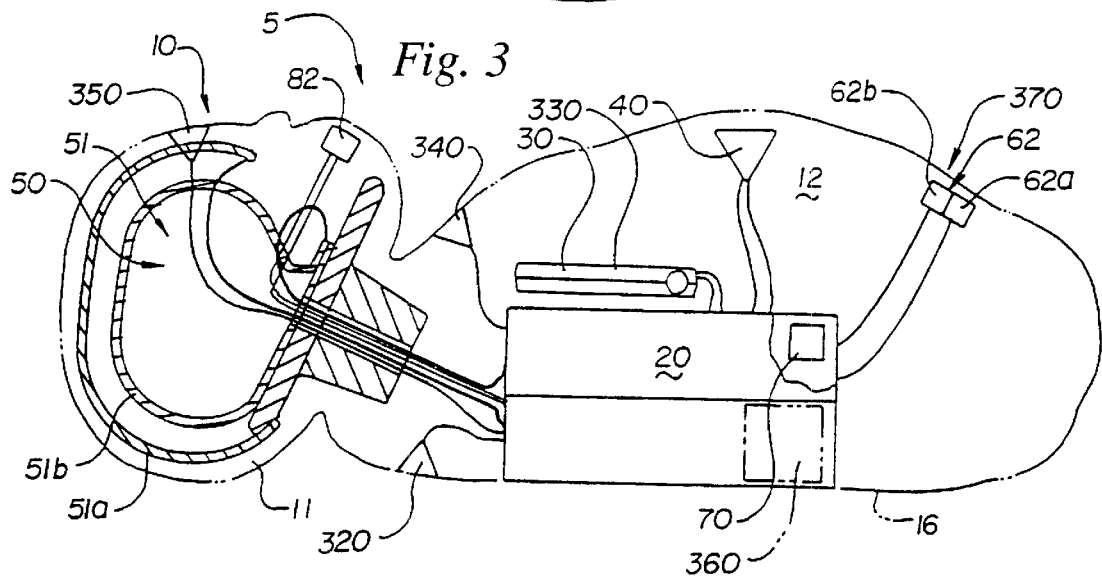
FIG. 3 is a cross-sectional side view of the infant simulator shown in FIG. 1, showing one embodiment of the internal electronic components of the infant simulator.

Referring to FIG. 3, a compression sensing system 50 is provided in the head 11 of the mannequin 10 for sensing squeezing or striking of the head 11. The head 11 is constructed of a pliant material, such as a soft vinyl material, with a normally open electrical circuit 51 provided within the head 11. The first contact 51a of the electrical circuit 51 is a thin layer of conductive material laminated to the inside surface (unnumbered) of the head 11 such that the conductive material moves in concert with the head 11 when the head 11 is deformed The second contact 51b of the electrical circuit 51 is a cage of conductive material inwardly spaced from the first contact 51a of the electrical circuit 51. The spacing between the first 51a and second 51b contacts of the normally open electrical circuit 51 is selected so that the contacts 51a and 51b will engage one another and close the electrical circuit 51 when the head 11 is subjected to a compressive force or an impact force reflective of abusive squeezing or striking of the head 11. Spacing between the first 51a and second 51b contacts should be selected so that the compression sensing system 50 will consistently sense compressive and impact forces reflective of physical abuse without sensing compressive and impact forces reflective of normal handling. The spacing necessary to achieve these desired sensing parameters is dependent upon a number of factors, including the type of material used to construct the head 11, the thickness of the material forming the head 11, the size and shape of the head 11, the flexibility of the material laminated to the inside surface of the head 11 to form the first contact 51a, etc. By way of illustration, when the head 11 is molded from approximately ¼ inch thick plasticized polyvinyl chloride, and the first contact 51a is a 3 to 4 mil thick aluminum foil, a spacing of approximately ½ to 1 inch should generally provide the desired sensing parameters (i.e., consistently sensing compressive and impact forces reflective of abuse without sensing compressive and impact forces reflective of normal handling).

Optionally, a flexible second cage (not shown) comprising a third contact (not shown) could be positioned intermediate the first 51a and second 51b contacts to form a secondary electrical circuit (not shown) with the first contact 51a in electrical communication with the central microcontroller unit 20. The third contact (not shown) would be constructed of a material sufficiently flexible to permit the first 51a and third (not shown) contacts to engage the second contact 51b when the head 11 experienced an abusive level of compressive or impact force. When such a secondary electrical circuit (not shown) is employed, the compression sensing system 50 is capable of sensing different levels of compressive or impact force (e.g., the secondary circuit is closed when a "mild" or "low" compressive or impact force is experienced, while the primary circuit 51 is closed when an "abusive" or "high" compressive or impact force is experienced).

In a first embodiment, a recording function within the central microcontroller unit 20 records sensed compression events for later review by the program administrator. The specific information recorded and reported by the central microcontroller unit 20 can range from the relatively simple to the complex. For example, the central microcontroller unit 20 can be programmed to simply record and report the occurrence of at least one sensed abusive compression event during the assignment period. Alternatively, the central microcontroller unit 20 can record and report the number of sensed abusive compression events occurring during an assignment period and the duration of each sensed abusive compression period. A nonexhaustive list of options for recording and reporting abusive compression event data is set forth in Table One, provided below.

TABLE ONE (OPTIONS FOR RECORDING AND REPORTING ABUSIVE COMPRESSION EVENT DATA)

| OPTION | DESCRIPTION | DATA RECORDED | SAMPLE REPORT |
|---|---|---|---|
| 1 | Records and reports occurrence of first abusive compression event only. | YES/NO | Light ON/OFF |
| 2 | Records and reports number of separate abusive compression events. | Number | "3." |
| 3 | Records and reports highest relative strength of abusive compressive force sensed during an assignment period. | Force Level (Low/High) | High |
| 5 | Records and reports the number of abusive compression events sensed during an assignment period and the highest relative strength of the compressive force sensed for each abusive compression event. | # Force Level (Low/High) | 1: Low 2: Low 3: High 4: Low |
| 6 | Records and reports the number of abusive compression events of each type (i.e., high and low) sensed during an assignment period. | # Low # High | 3 Low 1 High |

TABLE ONE-continued (OPTIONS FOR RECORDING AND REPORTING ABUSIVE COMPRESSION EVENT DATA)

| OPTION | DESCRIPTION | DATA RECORDED | SAMPLE REPORT |
|---|---|---|---|
| 7 | Records and reports the number and duration of each abusive compression event sensed during an assignment period | #/Seconds | 1: 01 2: 01 3: 08 4: 02 |

In a second embodiment, the central microcontroller unit 20 is connected to a system (not shown) capable of generating a perceptible compression distress signal $S_3$, such as an audible cry or scream. The central microcontroller unit 20 is programmed to generate the perceptible compression distress signal $S_3$ when abusive compression is sensed. Generation of the perceptible compression distress signal $S_3$ warns the student caring for the infant simulator 05 that the infant simulator 05 is being subjected to an abusive compression. The compression distress signal $S_3$ can be terminated, optionally after an appropriate delay, and timing of the abusive compression period ended, by removing the external event responsible for the abusive compression (e.g., removing the hand of a young sibling squeezing the head 11 of the infant simulator 05), thereby reopening the compression sensing electrical circuit 51 and terminating transmission of an electrical signal from the electrical circuit 51 to the central microcontroller unit 20.

The central microcontroller unit 20 may optionally be programmed to initiate a rocking-request event immediately after termination of the compression distress signal $S_3$ for purposes of simulating a need for comforting of the infant simulator 05 after the infliction of such an abusive event.

The central microcontroller unit 20 can be programmed to generate the perceptible compression distress signal $S_3$ only at the beginning of an abusive compression event (i.e., generate a three second signal as soon as abusive compression is sensed), continuously throughout an abusive compression period, or continuously throughout an abusive compression period and for an additional time period after abusive compression of the infant simulator 05 has ceased, for purposes of simulating injury to the infant simulator 05.

A preferred embodiment of the compression sensing system 50 combines both the recording/reporting and signaling systems.

The compression distress signal $S_3$ may be intensified, in accordance with the ancillary feature of providing an escalating demand signal 240, based upon (i) an increase in the maximum sensed compressive force, and/or (ii) an increase in the duration of the abusive compression period. An example of each is set forth in Table Two, provided below.

TABLE TWO (ESCALATING DISTRESS SIGNAL)

| STRENGTH OF PERCEPTIBLE SIGNAL (AUDIBLE) | ABUSIVE COMPRESSION DURATION (SECONDS) | COMPRESSIVE FORCE (° C.) |
|---|---|---|
| 1st Intensity (cry) | <5 | Low |
| 2nd Intensity (scream) | >5 | High |

The compression sensing module 130 may optionally communicate with a sound recorder 360 for initiating operation of the sound recorder 360 upon detection of abusive compression, and recording any verbal comments or statements made near the infant simulator 05 during an abusive compression period.

The compression sensing module 130 may also include an ancillary comatose feature 280 based upon(i) the sensing of a compressive force in excess of a defined threshold (e.g., 100 N), and/or (ii) a duration of an abusive compression period in excess of a defined threshold (e.g., 10 seconds).

Impact

The infant simulator 05 can be equipped with a motion sensor 70 capable of detecting physical abuse of the mannequin 10 such as by shaking, striking or throwing of the infant simulator 05. Such an abuse sensing system is described in U.S. Pat. No. 5,443,388 issued to Jurmain et al.

A number of different types and styles of motion sensors 70 may be effectively used to sense and report physical abuse. One such sensor, capable of providing variable output dependent upon the force of the motion to which the infant simulator 05 is subjected, is a magnetic field induced shock sensor manufactured by Directed Electronics, Inc. under Part No. 504IC, wherein movement of a magnet, resulting from a corresponding movement of the mannequin 10, generates an electrical current in an induction coil, with the strength of the electrical current proportional to the speed and distance traveled by the magnet.

Figure 6:
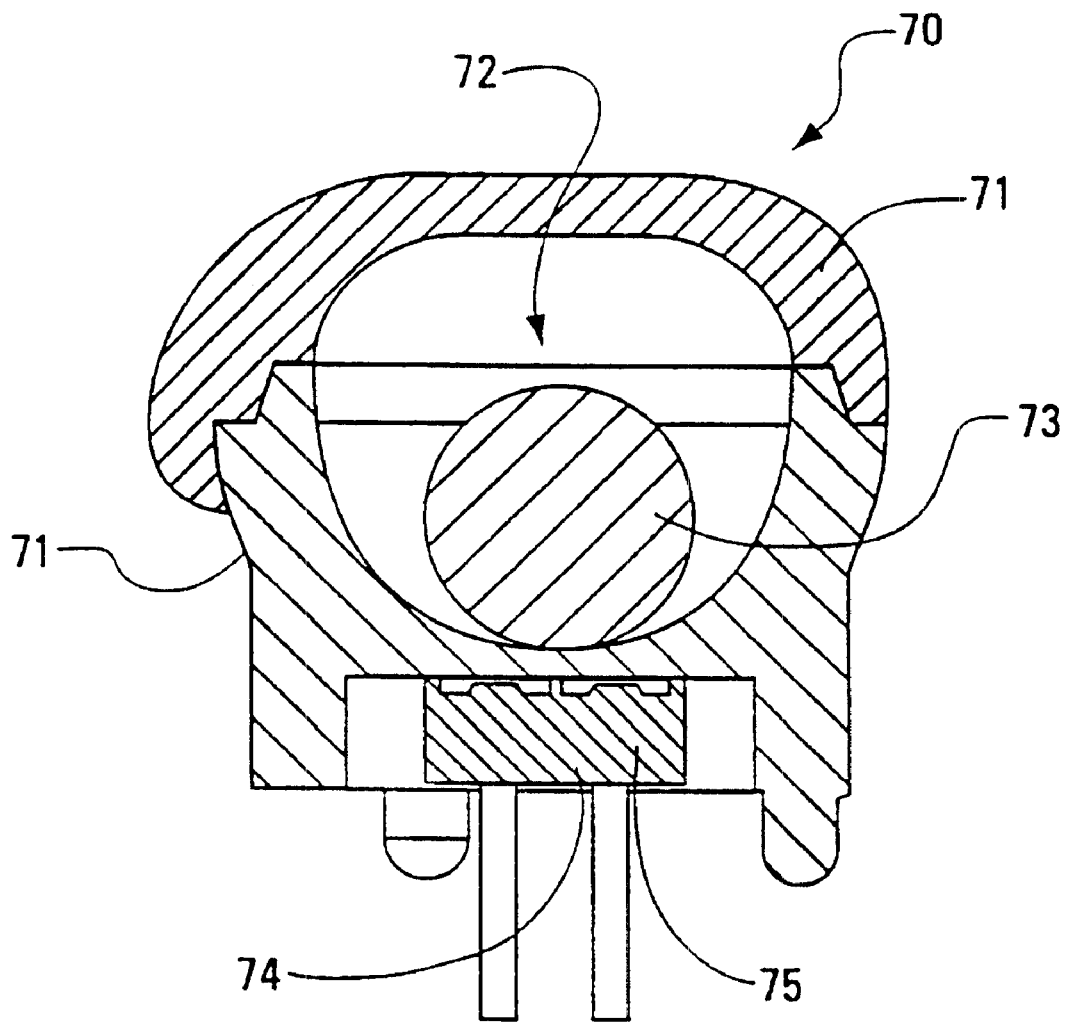
FIG. 6 is a cross-sectional side view of one embodiment of a motion and position sensor.

An alternative motion sensor 70', effective for sensing gentle motions (e.g., rocking and patting), rough handling (e.g. accidental abuse and intentional abuse), as well as position (e.g., right side up or down) is shown in FIG. 6. Briefly, the alternative motion sensor 70' comprises a plastic housing 71 defining a generally spherical chamber 72 and containing a metal sphere 73 which is free to move within the chamber 72 at the slightest accelerative movement of the housing 71. The housing 71 is constructed from a material transparent to infrared (IR) light. An element combining an IR light source 74 and IR phototransistor 75, such as a QRD1113 element available from QT Optoelectronics or an EE-SY124 element available from Omron, are mounted directly under the housing 71. The IR light source 74 shines IR light into the chamber 72 through the transparent plastic housing 71, where the light is reflected by the metal sphere 73 and the reflected IR light received by the phototransistor 75. Movement of the sphere 73 within the chamber 72 changes the amount of IR light reflected to the phototransistor 75, causing the electrical current flowing through the phototransistor 75 to fluctuate. If the sphere 73 is motionless, the reflected light is constant, and the current through the phototransistor 75 remains constant. Furthermore, when the sphere 73 is stationary, the sphere 73 will reflect more light towards the phototransistor 75 the closer the sphere 73 is to the IR light source 74, thereby causing a higher current to flow through the phototransistor 75. Hence, motion can be sensed by measuring and evaluating fluctuations in the electrical current flowing through the phototransistor 75, and position can be sensed by measuring and evaluating the amount of current flowing through the phototransistor 75 when the current is not fluctuating.

The central microcontroller unit 20 can be programmed to look for five characteristic patterns of current flow through the phototransistor 75 and equate such patterns with a particular condition as set forth below in Table Three.

TABLE THREE (CONDITIONS EQUATED WITH CURRENT PATTERN)

| CURRENT PATTERN | CONDITION |
| --- | --- |
| Constant Current | Infant Simulator is Motionless. |
| Slow and Small Changes in Current | Rocking or Patting of Infant Simulator |
| Rapid and Large Changes in Current | Rough Handling of Infant |
| High Current Levels | Infant simulator Resting in First Position (e.g., Face Up) |
| Low Current Levels | Infant simulator Resting in Second Position (e.g., Face Down) |

Figure 7:
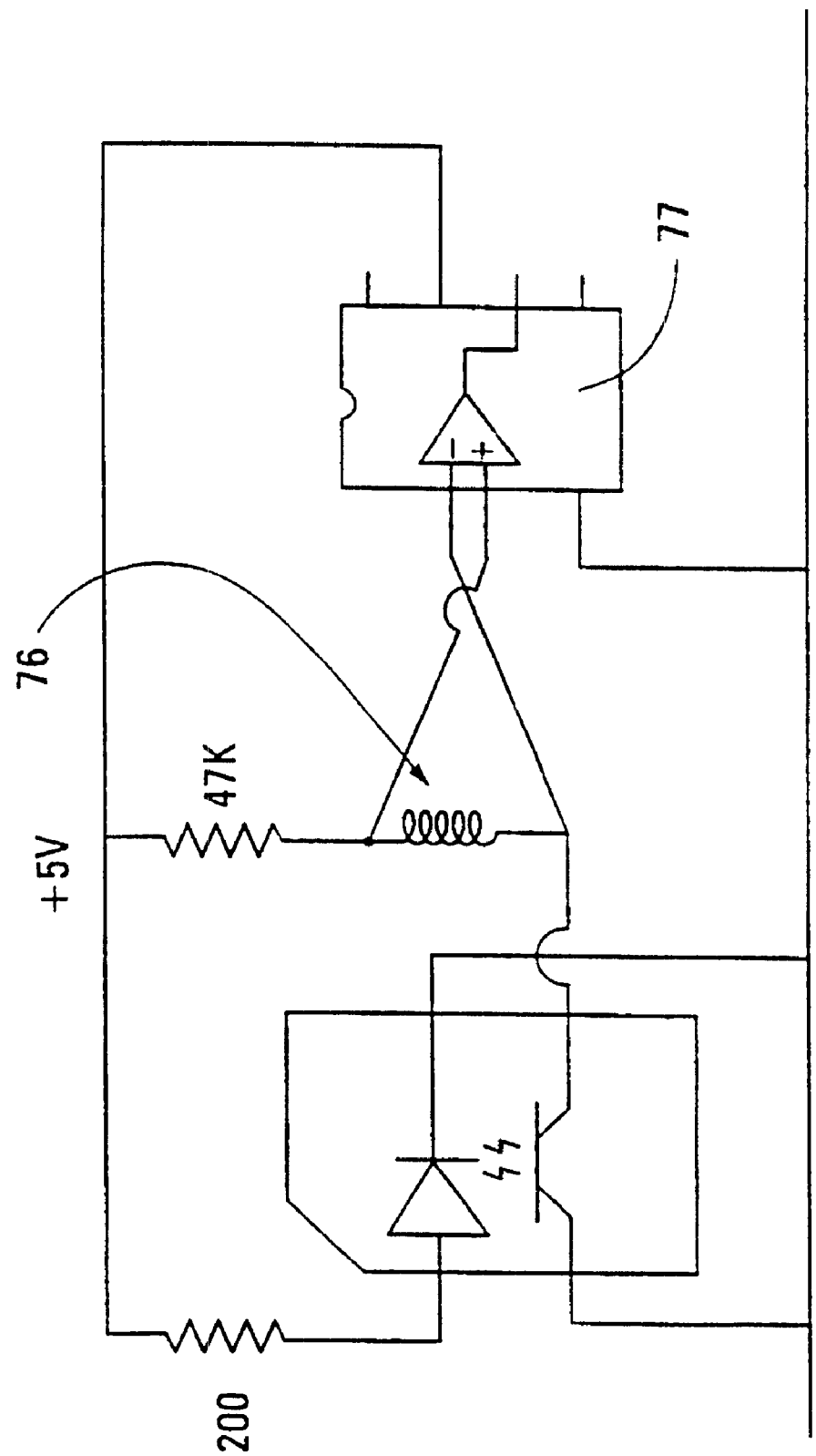
FIG. 7 is an electronic circuit diagram for an alternative embodiment of a motion and position sensor.

Referring generally to FIG. 7, the microcontroller unit 20 can generally receive and evaluate current changes and high current levels directly from the EE-SY124 element. An inductor 76 and operational amplifier 77 (op amp), such as a CA3130AE element available from DigiKey, tuned to amplify the slightest change in current flow into a full-scale square wave at the output of the op amp 77, is provided where constant current and low current levels need to be received and evaluated by the central microcontroller unit 20.

The motion sensor 70 is electrically connected to the central microcontroller unit 20 wherein the strength of the electrical signal generated by the motion sensor 70 can be checked against predefined threshold limitations for producing different signals. This permits a single motion sensor 70 to differentiate between a modest force, such as produced by normal handling, rocking and burping of the infant simulator 05, and excessive force, such as experienced when the infant simulator 05 is thrown, shaken or otherwise abused. This allows use of the same motion sensor 70 to sense rocking, patting and abuse. When motion exceeding a defined amplitude is sensed, an electrical physical injury signal is sent to the central microcontroller unit 20 and an injury event reported.

As a general matter, intentional abuse can, with certain exception, be differentiated from accidental or unintentional abuse based upon the duration of the motion. A singular brief impact (e.g., lasting less than about 2 seconds) is usually indicative of an accidentally or unintentionally imposed injury. Exemplary of such accidental brief abuses are dropping an infant onto the floor or banging an infant's head when entering an automobile. In contrast, multiple impacts over a prolonged period (e.g., more than about 3 seconds) are usually the result of intentional abuse. Exemplary of such intentional prolonged abuses are striking and/or shaking an infant. While certain exceptions apply to these general statements, as exemplified by throwing an infant against a wall (a brief but intentional abuse) and falling down a flight of stairs while holding an infant (a prolonged but accidental event), separately reporting each of these types of abuse would assist program administrators in providing meaningful feedback to the student and appropriate follow-up training and/or counseling. An exemplary dual abuse detection and reporting system is shown in connection with the impact sensing module 430 shown in FIG. 2n.

Figures 2, 2A:
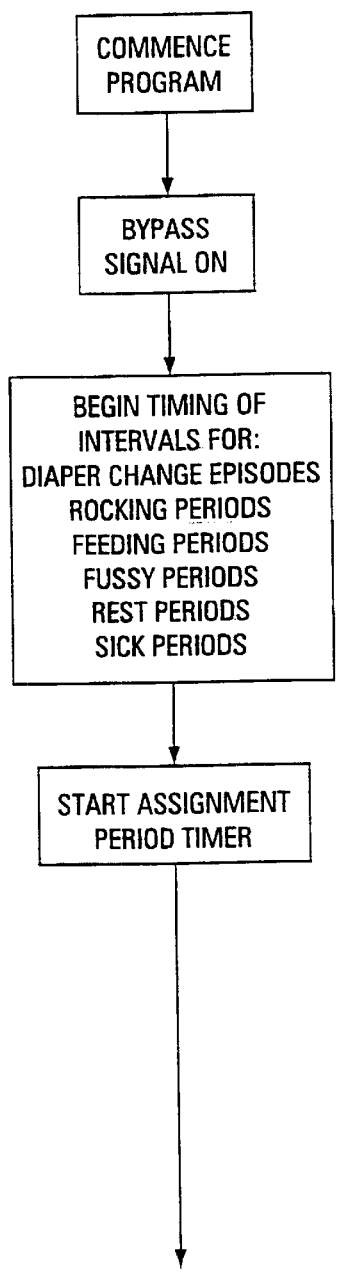
FIGS. 2a–2t (excluding a FIG. 2l) are a flowchart of one embodiment of the infant simulator.
Figure 2B:
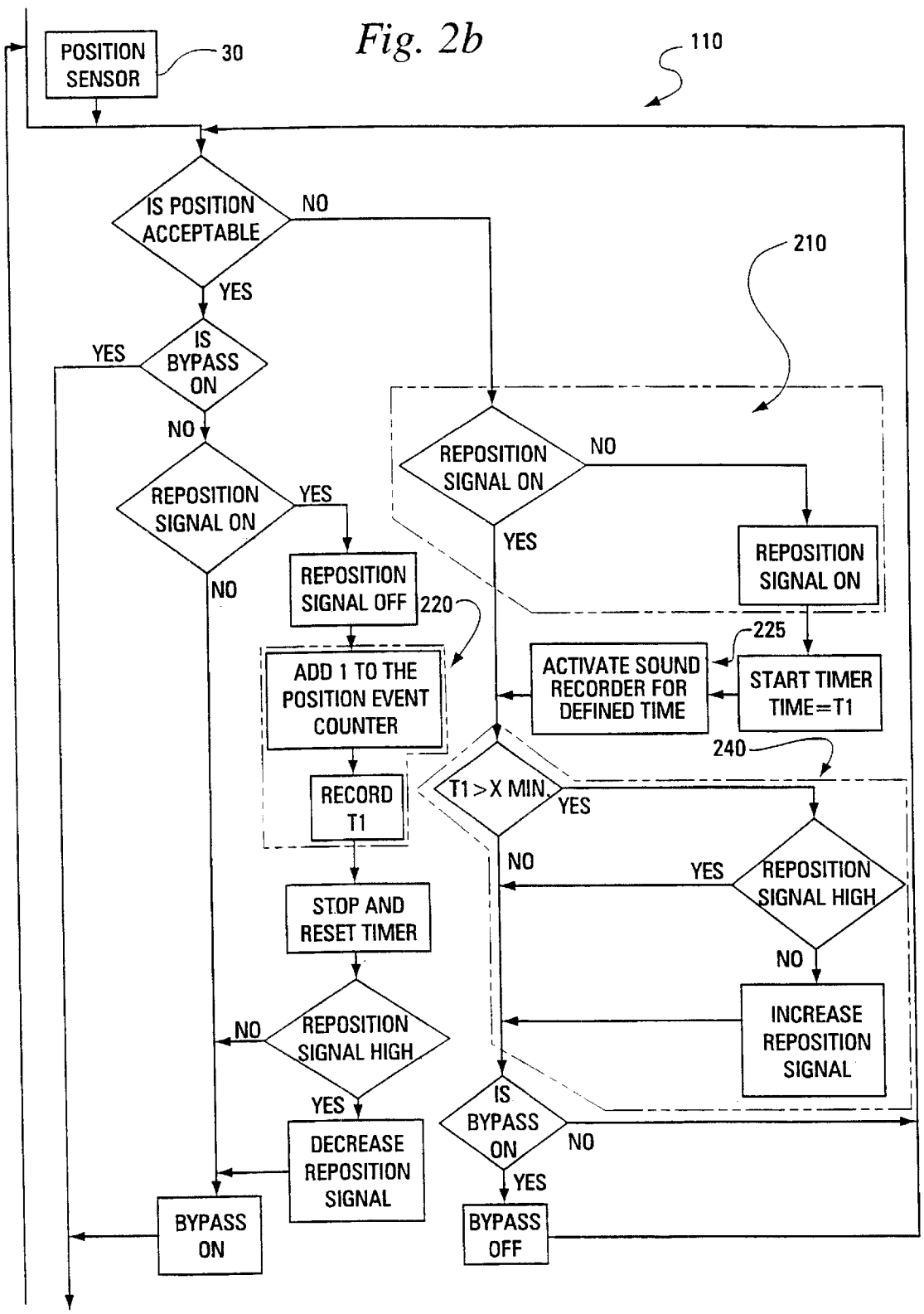
Figure 2C:
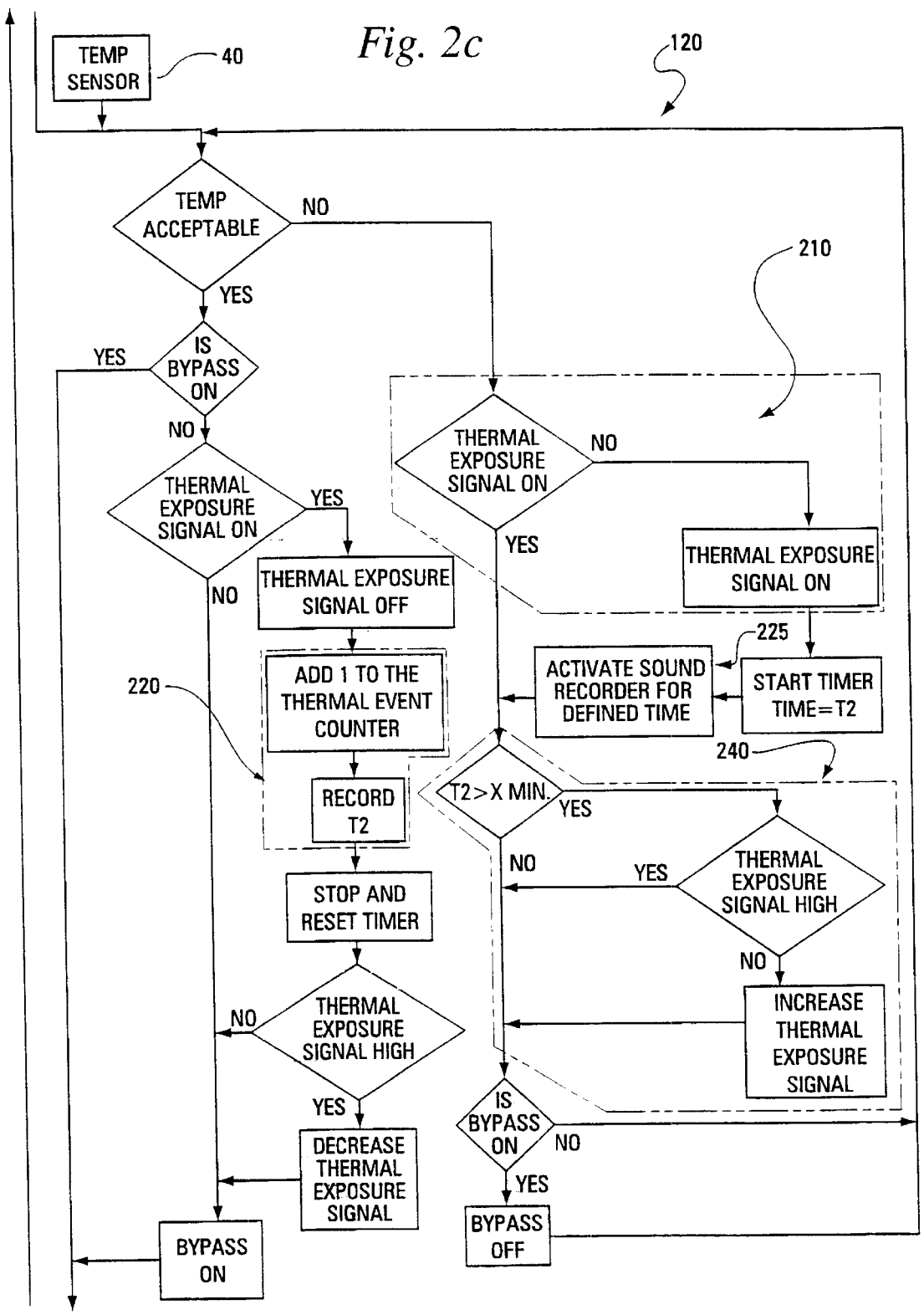
Figure 2D:
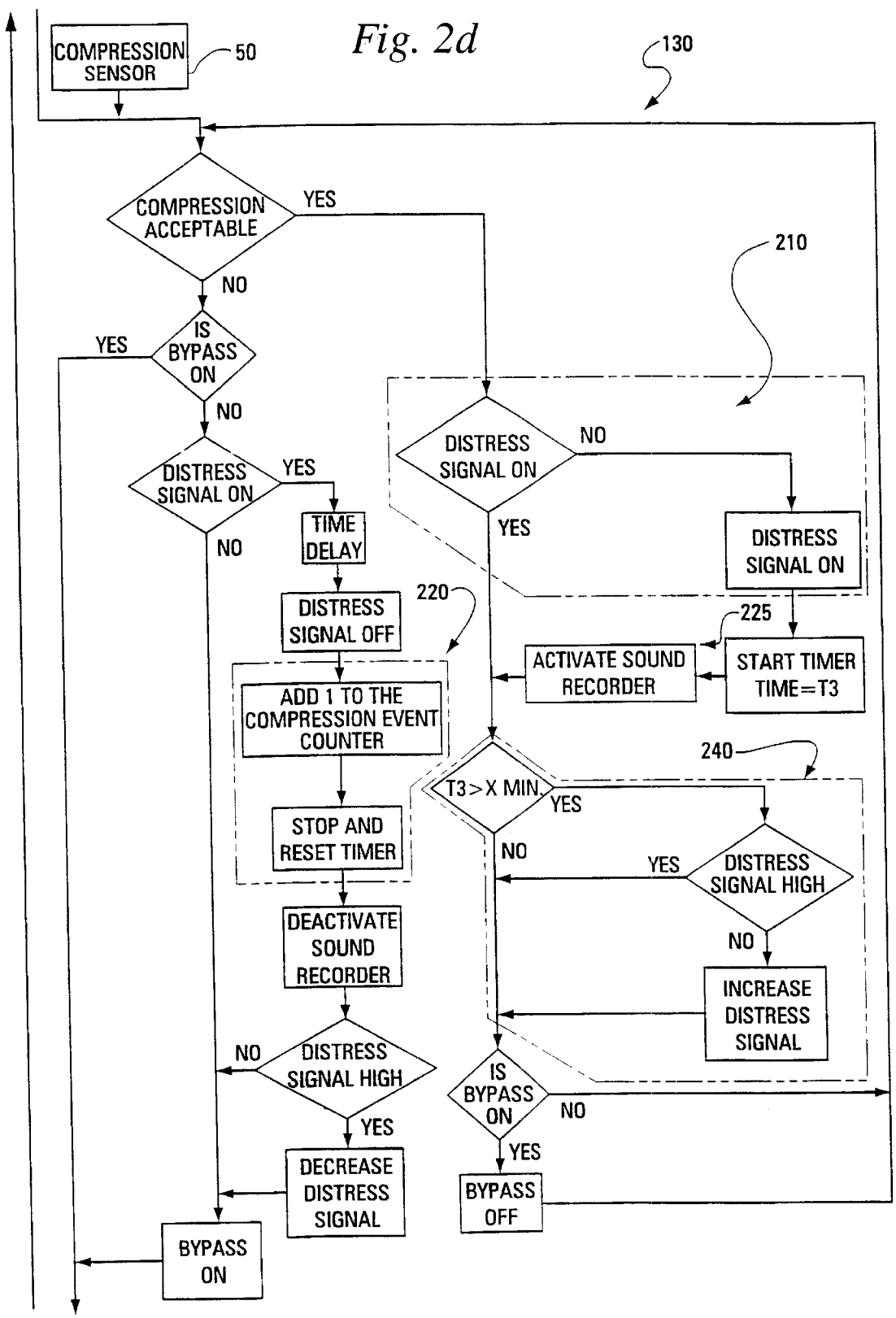
Figure 2E:
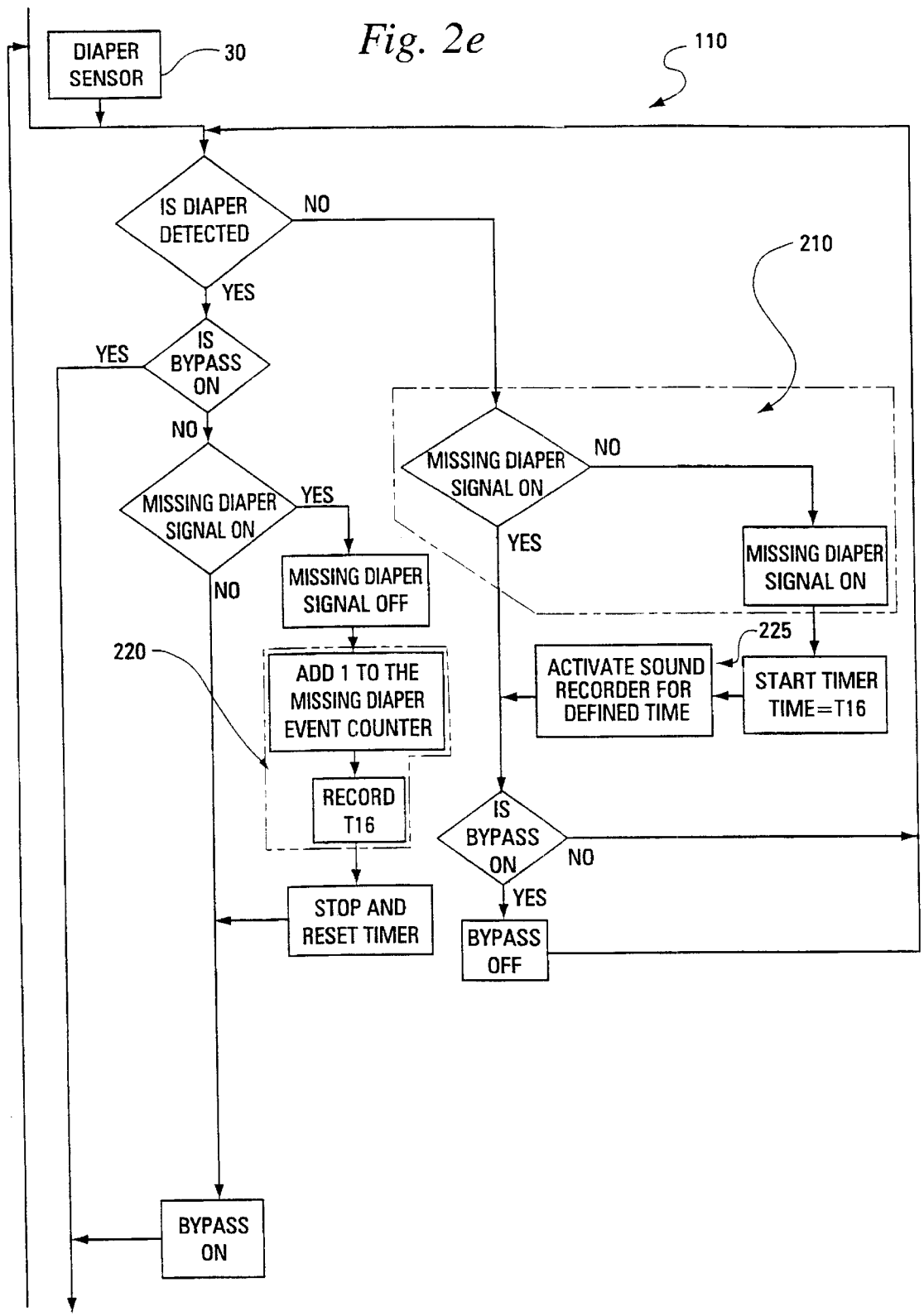
Figure 2F:
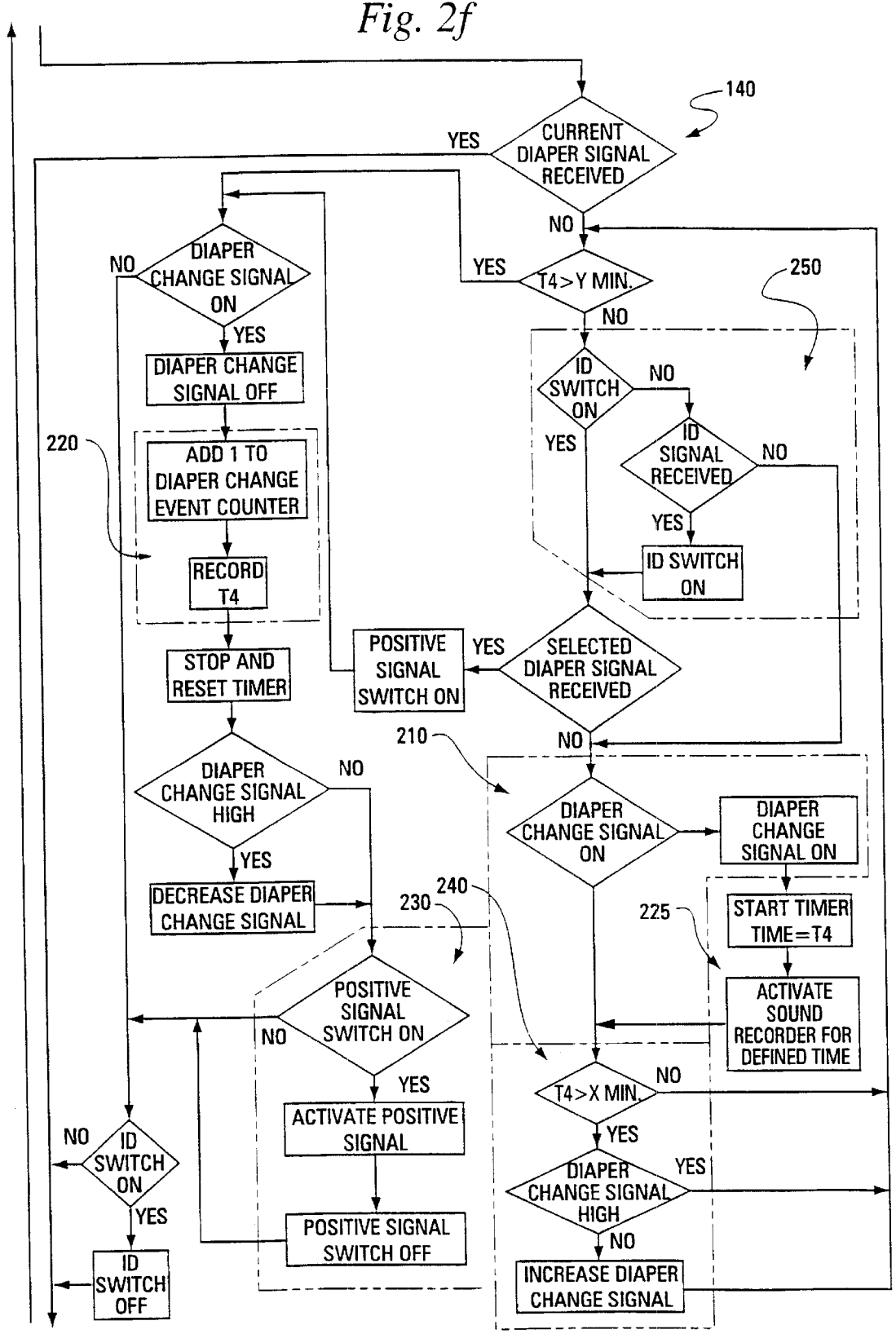
Figure 2G:
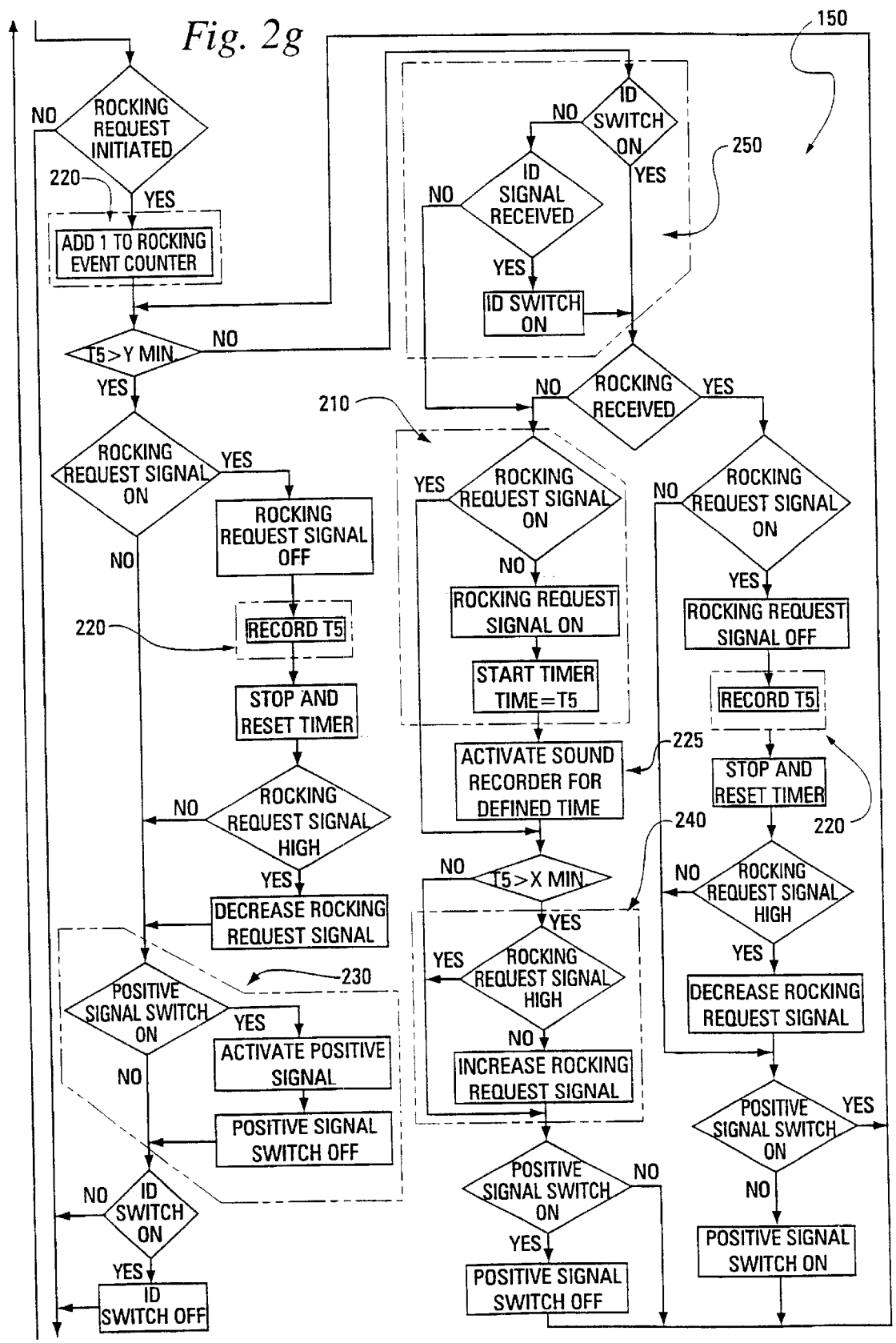
Figure 2H:
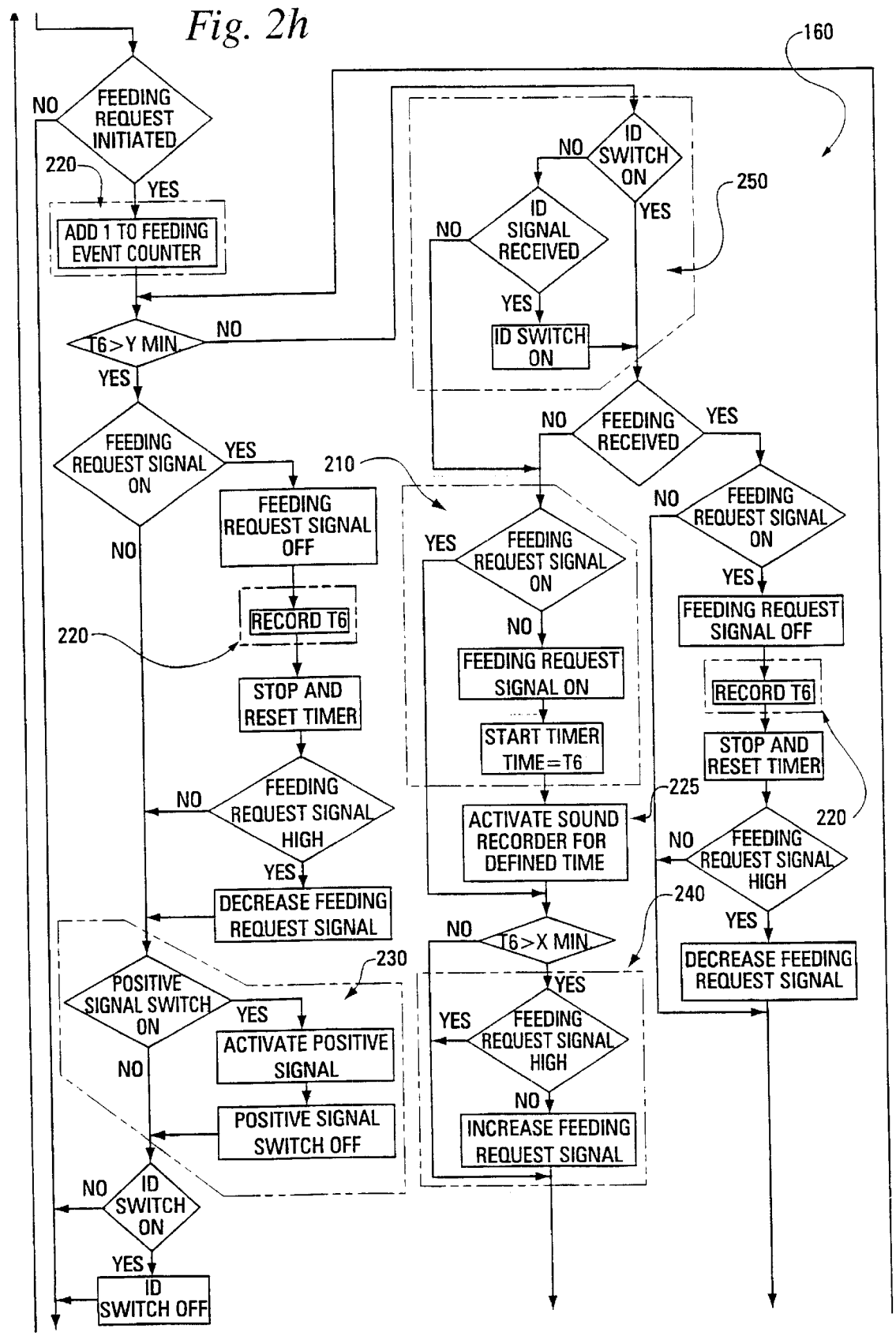
Figure 2H:
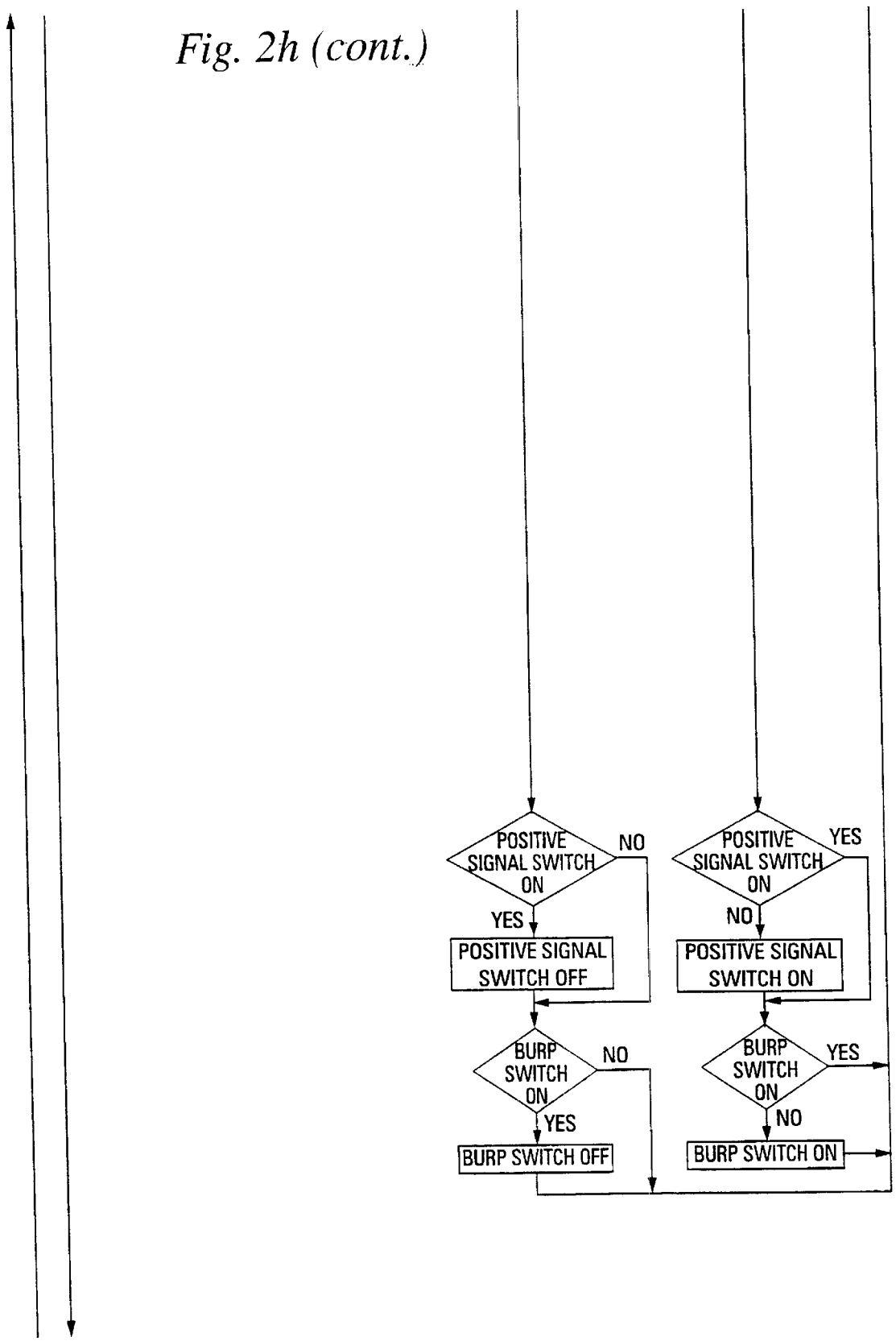
Figure 2I:
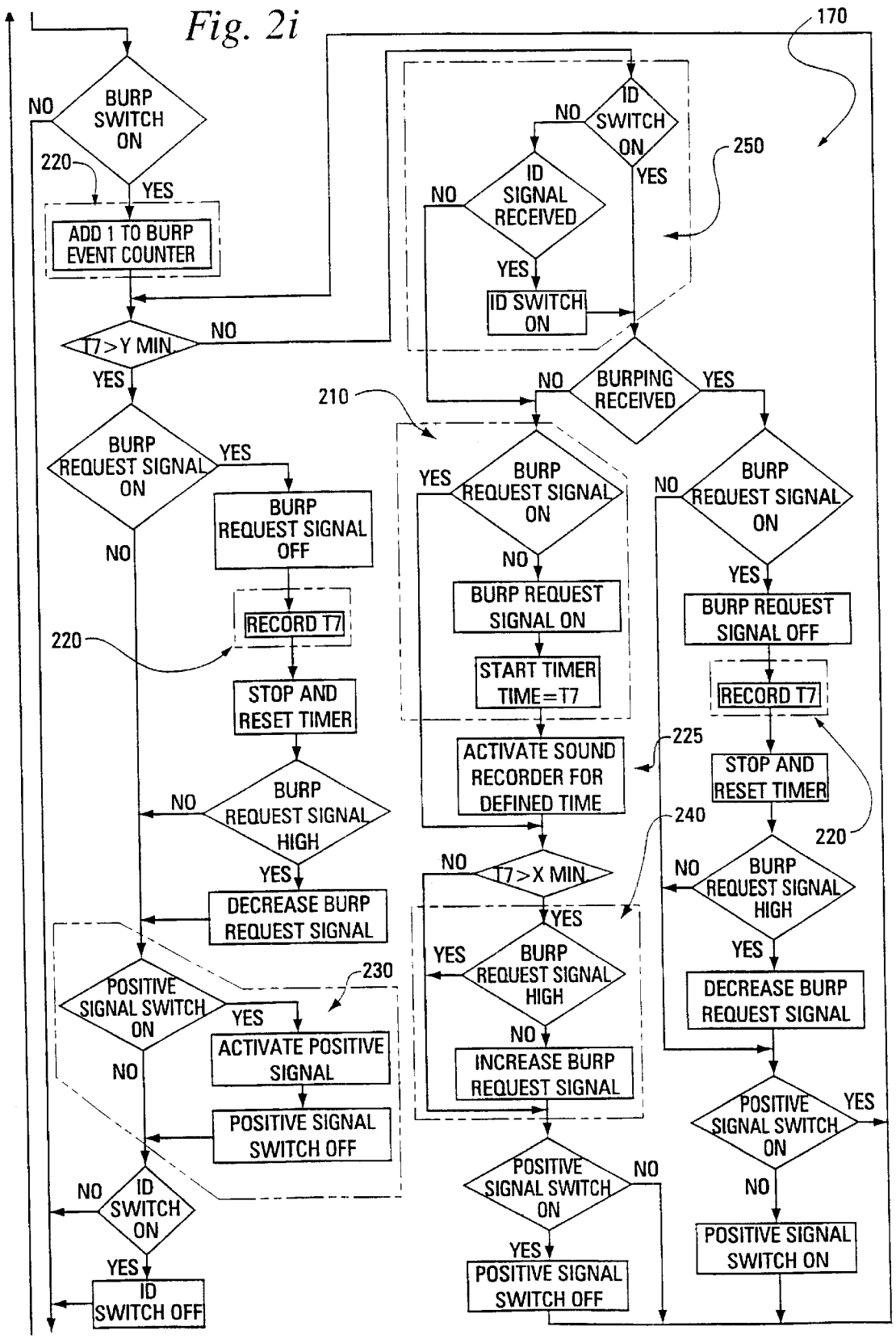
Figure 2J:
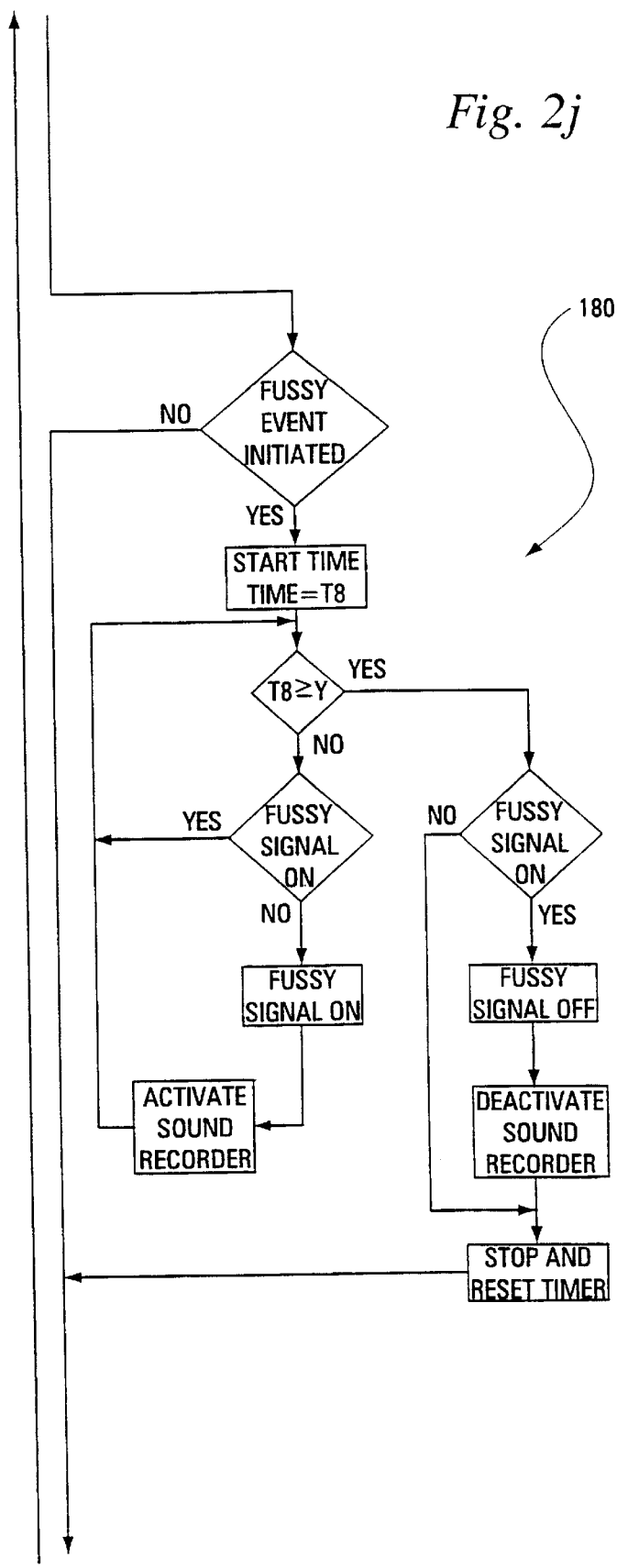
Figure 2K:
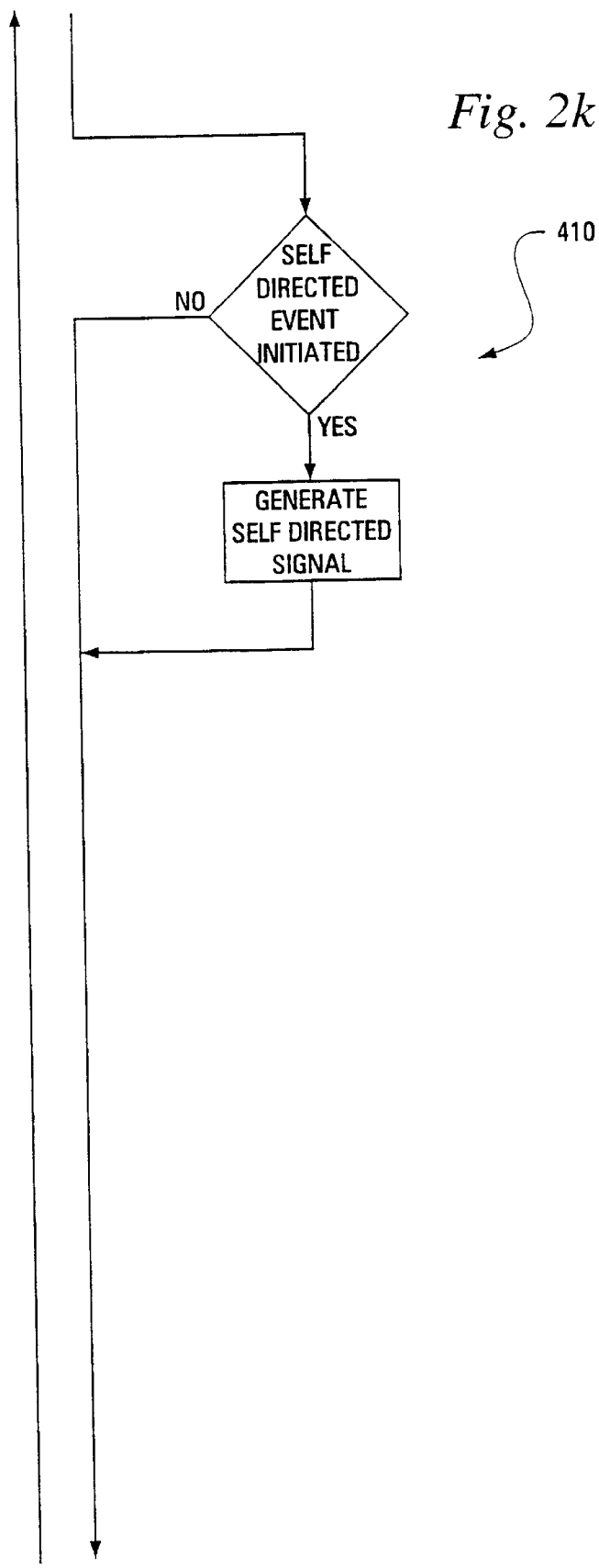
Figure 2M:
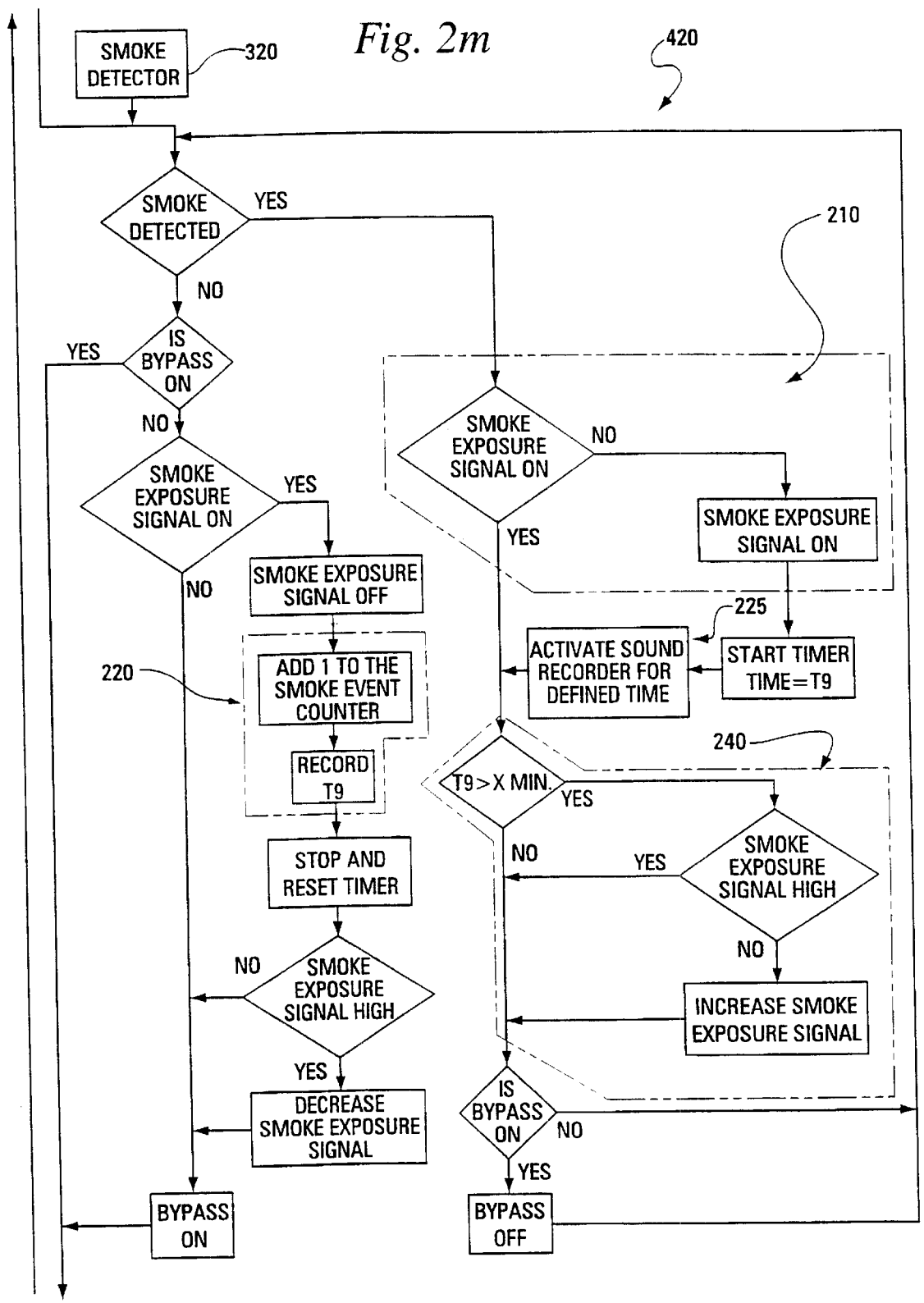
Figure 2N:
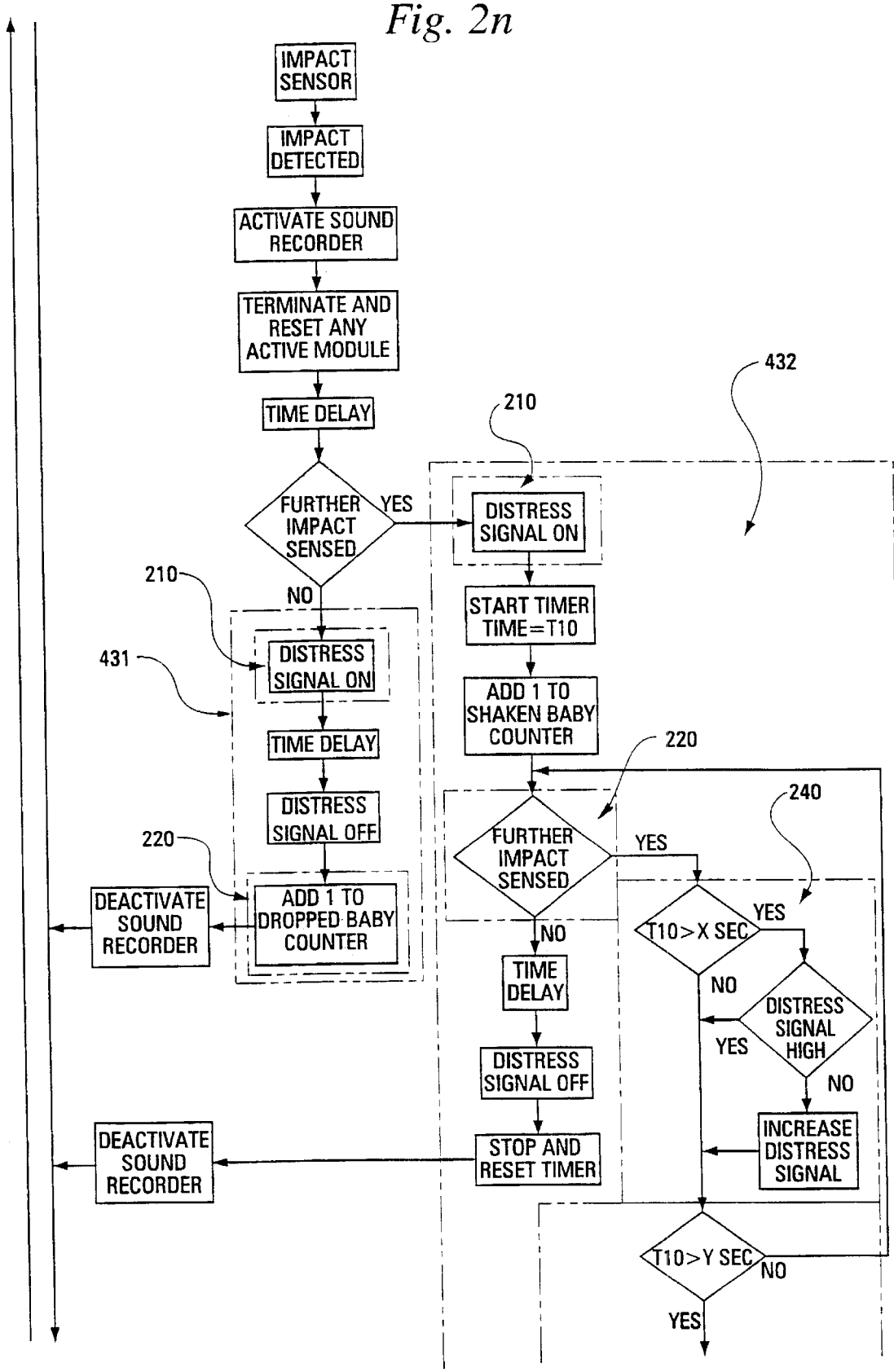
Figure 2N:
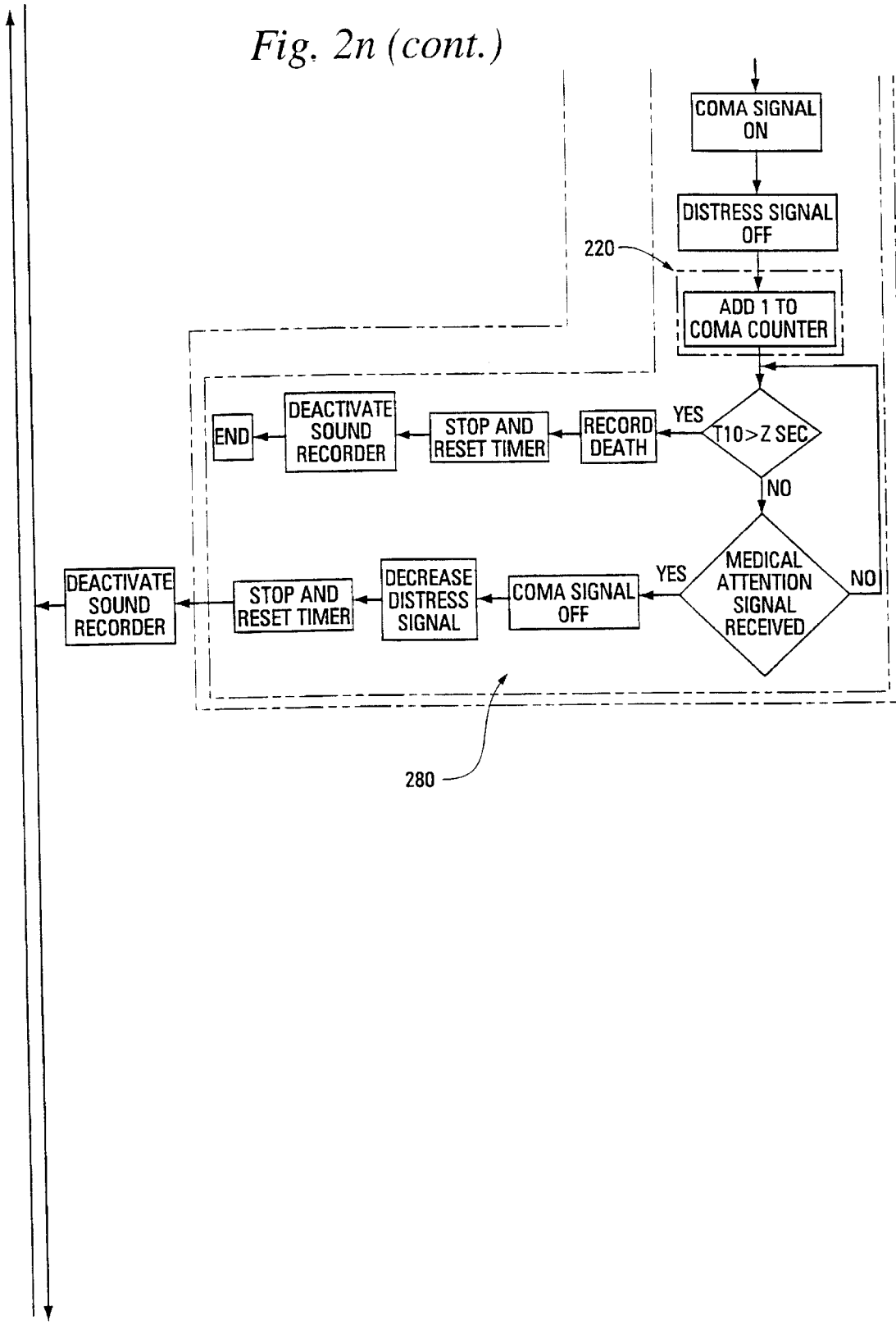

As generally represented in FIG. 2n, when a single impact of sufficient force is detected by the motion sensor 70, the impact sensing module 430 is activated and, after a short delay of a second or two, the module 430 checks for any subsequent abusive impacts. In the event that no subsequent abusive impacts are detected (i.e., a single brief impact is detected) the impact sensing module 430 enters the dropped infant submodule 431. In the event that subsequent abusive impacts are detected (i.e., prolonged abuse is detected) the impact sensor module 430 enters the shaken infant submodule 432.

In a first embodiment, a recording function within the central microcontroller unit 20 records the occurrence of an accidental abuse event whenever the dropped infant submodule 431 is entered, and the occurrence of an intentional abuse event whenever the shaken infant submodule 432 is entered, for later review by the program administrator. The specific information recorded and reported by the central microcontroller unit 20 can range from the relatively simple to the complex. For example, the central microcontroller unit 20 can be programmed to simply record and report the occurrence of each type of event during the assignment period. Alternatively, the central microcontroller unit 20 can record and report the number of each type of event sensed during an assignment period and the duration of each sensed event. A nonexhaustive list of options for recording and reporting accidental and intentional abuse event data is set forth in Table Four, provided below.

TABLE FOUR (OPTIONS FOR RECORDING AND REPORTING ACCIDENTAL AND INTENTIONAL ABUSE EVENT DATA)

| OPTIONS | DESCRIPTION | DATA RECORDED | SAMPLE REPORT |
|---|---|---|---|
| 1 | Records and reports occurrence of first event of each type only. | YES/NO | ACCIDENTAL ABUSE: Light ON/OFF INTENTIONAL ABUSE: Light ON/OFF |
| 2 | Records and reports number of separate events of each type. | Number | ACCIDENTAL 2 INTENTIONAL 1 |
| 3 | Records and reports the number and duration of each event of each type sensed during an assignment period. | #/Seconds | ACCIDENTAL 1: 02 ACCIDENTAL 2: 01 INTENTIONAL 1: 18 ACCIDENTAL 3: 02 |

In a second embodiment, the central microcontroller unit 20 is connected to a system (not shown) capable of generating a perceptible impact distress signal $S_{10}$, such as an audible cry or scream. The central microcontroller unit 20 is programmed to generate the perceptible impact distress signal $S_{10}$ when abuse is sensed. Generation of the perceptible impact distress signal $S_{10}$ informs the student caring for the infant simulator 05 that the infant simulator 05 is being abused. The impact distress signal $S_{10}$ can be terminated, optionally after an appropriate delay, and any timing of the abuse period under the shaken infant submodule 432 ended, by removing the external event responsible for the impact(s) (e.g., stop shaking the infant simulator 05) thereby ending movement of the magnet within the motion sensor 70 and terminating transmission of an electrical signal from the motion sensor 70 to the central microcontroller unit 20.

The central microcontroller unit 20 may optionally be programmed to initiate a rocking-request event immediately after termination of the impact distress signal $S_{10}$ for purposes of simulating a need for comforting of the infant simulator 05 after the infliction of such an abusive event.

The central microcontroller unit 20 can be programmed to generate the perceptible impact distress signal $S_{10}$ only at the beginning of an abuse period (i.e., generate a three second signal as soon as an impact is sensed), continuously throughout an abuse period, or continuously throughout an abuse period and for an additional time period after abuse of the infant simulator 05 has ceased for purposes of simulating injury to the infant simulator 05.

A preferred embodiment of the physical abuse sensing system 50 combines both the recording/reporting and signaling systems for each of the dropped infant submodule 431 and shaken infant submodule 432.

The impact distress signal $S_{10}$ may be intensified, in accordance with the ancillary feature of providing an escalating demand signal 240, based upon (i) an increase in the maximum sensed impact, and/or (ii) an increase in the duration of the abuse period. An example of each is set forth in Table Five, provided below.

TABLE FIVE (ESCALATING DISTRESS SIGNAL)

| STRENGTH OF PERCEPTIBLE SIGNAL (AUDIBLE) | ABUSE PERIOD DURATION (SECONDS) | ABUSIVE FORCE |
|---|---|---|
| $1^{st}$ Intensity (cry) | <5 | Low |
| $2^{nd}$ Intensity (scream) | >5 | High |

The motion sensor 70 and/or the central microcontroller unit 20 may optionally communicate with a sound recorder 360 for initiating operation of the sound recorder 360 upon detection of physical abuse and thereby recording any verbal comments or statements made near the infant simulator 05 during a physical abuse period.

The shaken infant submodule 432 may also include an ancillary comatose feature 280 based upon (i) an impact of a force in excess of a defined threshold (e.g, 100 N), and/or (ii) an abuse period lasting in excess of a defined threshold (e.g., 10 seconds).

Position Sensing System 30

The infant simulator 05 can be equipped with a position sensor 30, such as a mercury switch or roller ball switch, capable of sensing the vertical and horizontal positioning of the infant simulator 05 and communicating the sensed position as between an acceptable position (switch open) and an unacceptable position (switch closed) to the central microcontroller unit 20. Acceptable positioning includes laying on its back or side, while unacceptable positioning includes laying face down or upside down. Suitable positioning sensors are available from a number of manufacturers. One suitable position sensing switch is an SPST SMT normally open switch manufactured by ITT Canon under Part No. KSC421JD. An alternative position sensing switch is the sensor 70' shown in FIGS. 6 and 7 and described in connection with the impact physical abuse sensing system.

In order to avoid the sensing of routine handling as an unacceptable positioning of the infant simulator 05, the central microcontroller unit 20 is preferably programmed with a threshold time value, such as 3 to 10 seconds, which must be exceeded before a sensed unacceptable positioning is recorded/reported and/or signaled as an unacceptable positioning of the infant simulator 05.

In a first embodiment, a recording function within the central microcontroller unit 20 records occurrences of unacceptable positioning for later review by the program administrator. The specific information recorded and reported by the central microcontroller unit 20 can range from the relatively simple to the complex. For example, the central microcontroller unit 20 can be programmed to simply record and report that the infant simulator 05 was unacceptably positioned at least once during the assignment period. Alternatively, the central microcontroller unit 20 can record and report the number of times the infant simulator 05 was unacceptably positioned and the duration of each occurrence. A nonexhaustive list of options for recording and reporting positioning data is set forth in Table Six, provided below.

TABLE SIX (OPTIONS FOR RECORDING AND REPORTING UNACCEPTABLE POSITIONING DATA)

| OPTION | DESCRIPTION | DATA RECORDED | SAMPLE REPORT |
|---|---|---|---|
| 1 | Records and reports that the infant simulator was unacceptably positioned at least once during the assignment period. | YES/NO | Light ON/OFF |
| 2 | Records and reports the number of times the infant simulator was unacceptably positioned. | Number | "5." |
| 3 | Records and reports total amount of time the infant simulator was unacceptably positioned during an assignment period. | Minutes | 45 |
| 4 | Records and reports the number of times the infant simulator was unacceptably positioned and the total amount of time the infant simulator was unacceptably positioned. | #/Minutes | 5:45 |
| 5 | Records and reports the number of times the infant simulator was unacceptably positioned, the total amount of time the infant simulator was unacceptably positioned, and the mean duration of each occurrence. | #/Minutes Minutes | 5:45 03 |
| 6 | Separately records and reports the amount of time the infant simulator remained in an unacceptable position for each occurrence during an assignment period. | #/Minutes | 1: 03 2: 18 3: 20 4: 02 5: 02 |
| 7 | Records and reports the number of times the infant simulator was unacceptably positioned, the total amount of time the infant simulator was unacceptably positioned, and the amount of time the infant simulator remained in an unacceptable position for each occurrence during an assignment | #/Minutes Minutes | 5: 45 03:18:20:02:02 |

In a second embodiment, the central microcontroller unit 20 is connected to a system (not shown) capable of generating a repositioning-request signal $S_1$, such as an audible cry or scream. The central microcontroller unit 20 is programmed to generate the repositioning-request signal $S_1$ whenever the infant simulator 05 is placed in an unacceptable position (e.g., laying face down or upside down) and left in that position beyond a minimum threshold time period (e.g., ten seconds). Generation of the repositioning-request signal $S_1$ warns the person caring for the infant simulator 05 that the infant simulator 05 is in an improper position and corrective action is required. The repositioning-request signal $S_1$ and timing of the positioning-request episode can be terminated by simply repositioning the infant simulator 05 into an acceptable position, thereby opening the position sensor 30 and terminating transmission of an electrical signal from the position sensor 30 to the central microcontroller unit 20.

The central microcontroller unit 20 can be programmed to generate the repositioning-request signal $S_1$ only at the beginning of each occurrence of improper positioning (i.e., generate a three second signal once the infant simulator 05 is sensed in an unacceptable position for longer than the minimum threshold time period), periodically throughout an improper positioning occurrence, or continuously throughout an improper positioning occurrence.

A preferred embodiment of the position sensing system 30 combines both the recording/reporting and signaling systems.

The repositioning-request signal $S_1$ may be intensified, in accordance with the ancillary feature of providing an escalated demand signal 240, based upon an increase in the length of time the infant simulator 05 is unacceptably positioned. An example is set forth in Table Seven below.

TABLE SEVEN (ESCALATING REPOSITIONING-REQUEST SIGNAL)

| STRENGTH OF PERCEPTIBLE SIGNAL (AUDIBLE) | LENGTH OF TIME INFANT SIMULATOR REMAINS IN AN UNACCEPTABLE POSITION (MINUTES) |
|---|---|
| $1^{st}$ Intensity (soft cry) | <10 |
| $2^{nd}$ Intensity (loud cry) | >10 |

The position sensing system 30 may optionally communicate with a sound recorder 360 for initiating operation of the sound recorder 360 upon detection of improper positioning, and thereby recording any verbal comments or statements made near the infant simulator 05 for a defined time period (e.g., 3–5 minutes) after the repositioning-request signal $S_1$ has been generated.

Loud Sound Sensing System 480

The infant simulator 05 can be equipped with a sound sensor 340, such as the sound-activated relay or the sound-level meter diagrammed in Radio Shack Notebook #276-5011A, capable of sensing the decibel level of sounds to which the infant simulator 05 is exposed and communicating any sensed sounds exceeding a threshold value (e.g., 80 decibels) to the central microcontroller unit 20.

In order to avoid detection of the infant simulator's 05 own crying and/or screaming as a loud sound exposure event, the loud sound sensing system 480 can either (i) establish the threshold decibel level above the loudest decibel level generated by the infant simulator 05, or (ii) arresting the sensing and/or recording of sounds whenever the infant simulator 05 is generating a demand or distress signal. When option (ii) is elected, it is generally preferred to have the demand or distress signal generated periodically throughout the period so as to limit the time periods during which the sound sensing system 480 is inoperable.

In a first embodiment, a recording function within the central microcontroller unit 20 records any instances of sensed sounds exceeding the threshold value for later review by the program administrator. The specific information recorded and reported by the central microcontroller unit 20 can range from the relatively simple to the complex. For example, the central microcontroller unit 20 can be programmed to simply record and report whether a sound exceeding the threshold value was sensed at least once during the assignment period. Alternatively, the central microcontroller unit 20 can activate a sound recorder 360 and record the actual sounds to which the simulator 05 is being exposed. A nonexhaustive list of options for recording and reporting loud sound exposure data is set forth in Table Eight below.

TABLE EIGHT (OPTIONS FOR RECORDING AND REPORTING LOUD SOUND EXPOSURE DATA)

| OPTION | DESCRIPTION | DATA RECORDED | SAMPLE REPORT |
|---|---|---|---|
| 1 | Records and reports only fact that loud sound sensed at least once during assignment period (i.e., occurrence of a loud sound exposure event). | YES/NO | Light ON/OFF |
| 2 | Records and reports number of loud sound exposure events. | Number | "3." |
| 3 | Records and reports highest decibel level sensed during assignment period. | dB | "96 dB" |
| 5 | Records and reports the number and highest decibel level for each loud sound exposure period. | #/dB | 1: 92<br>2: 96<br>3: 80<br>4: 88 |
| 6 | Records and reports the number and duration of each loud sound exposure period. | #/Minutes | 1:06<br>2: 18<br>3: 02<br>4: 02 |
| 7 | Records and reports the number of loud sound exposure periods and continuously records and reports the dB level throughout a loud sound exposure period. | #/dB | 1:86, 92, 90<br>2:96, 96, 96, 96, 96, 96, 96, 96 96.<br>3:80<br>4:88 |
| 8 | Records actual sounds during loud sound exposure periods on a sound recorder for playback. | Actual Sounds | Jet Engine. Loud Rock Music. Student Screaming. Student Screaming. |

In a second embodiment, the central microcontroller unit 20 is programmed with defined upper threshold decibel level (e.g., 80 dB) and connected to a system (not shown) capable of generating a perceptible loud sound exposure signal $S_{16}$. The central microcontroller unit 20 is programmed to generate the perceptible loud sound exposure signal $S_{16}$ when the sensed sounds exceed the threshold decibel level. Generation of the perceptible loud sound exposure signal $S_{16}$ warns the student caring for the infant simulator 05 that the surrounding noise has reached an unacceptable decibel level and corrective action is required. The loud sound exposure signal $S_{16}$ and timing of the loud sound exposure period can be terminated by removing the infant simulator 05 from the environment generating the loud sounds (e.g., carrying the infant simulator 05 out of the room) or locating the source of the loud sounds and reducing the volume (e.g., turning down the stereo or quieting a screaming toddler), thereby returning the decibel level below the threshold value and ceasing transmission of an electrical signal from the sound sensor 340 to the central microcontroller unit 20.

The central microcontroller unit 20 may optionally be programmed to initiate a rocking-request event immediately after termination of the loud sound exposure signal $S_{16}$ for purposes of simulating a need for comforting of the infant simulator 05 after the occurrence of such a startling event.

A preferred embodiment of the loud sound sensing system 480 combines both the recording/reporting and signaling systems.

The central microcontroller unit 20 can be programmed to generate the perceptible loud sound exposure signal $S_{16}$ only at the beginning of a loud sound exposure period (i.e., generate a ten second signal as soon as a sensed sound exceeds the threshold decibel level), periodically throughout a loud sound exposure period (e.g., generate a two second signal every minute once the sensed sounds exceed the threshold decibel level until the sensed sounds fall below the threshold decibel level), or continuously throughout a loud sound exposure period.

The loud sound exposure signal $S_{16}$ may be intensified, in accordance with the ancillary feature of providing an escalated demand signal 240, based upon (i) an increase in the difference between the sensed decibel level and the threshold value, and/or (ii) an increase in the duration of the loud sound exposure period. An example of each is set forth in Table Nine, provided below.

TABLE NINE (ESCALATING LOUD SOUND EXPOSURE SIGNAL)

| STRENGTH OF PERCEPTIBLE SIGNAL (AUDIBLE) | LOUD SOUND EXPOSURE DURATION (MINUTES) | DB LEVEL BEYOND ACCEPTABLE LIMIT (DB) |
|---|---|---|
| 1st Intensity (whimper) | <5 | <10 |
| 2nd Intensity (scream) | 5 to 10 | 10 to 20 |
| 3rd Intensity (shriek) | >10 | >20 |

The loud sound sensing system 480 may optionally communicate with a sound recorder 360 for initiating operation of the sound recorder 360 upon detection of sounds exceeding the threshold value, and recording the sounds responsible for initiating the loud sound exposure period. Such recording may continue for a defined time period (e.g., 3 to 5 minutes) or for the entire duration of a loud sound exposure period.

The sound sensor 340, as with the central microcontroller unit 20 and battery pack 25, is preferably equipped with a tamper indicating device (not shown) for purposes of signaling and/or recording and reporting efforts to remove or otherwise access the sound sensor 340.

Overstimulation Sensing System 340

The infant simulator 05 can be equipped with a motion sensor 70 and/or a sound sensor 340 for sensing movement and/or environmental sounds to which the infant simulator 05 is exposed and communicating sensed movement and/or sounds to the central microcontroller unit 20.

A number of different types and styles of motion sensors 70 may be effectively used to sense and report physical stimulation of the infant simulator 05. One such sensor, capable of providing variable output dependent upon the force of the motion to which the infant simulator 05 is subjected, is a magnetic field induced shock sensor manufactured by Directed Electronics, Inc. under Part No. 504IC, wherein movement of a magnet, resulting from a corresponding movement of the mannequin 10, generates an electrical current in an induction coil, with the strength of the electrical current proportional to the speed and distance traveled by the magnet. An alternative motion sensor is sensor 70' shown in FIGS. 6 and 7 and described in connection with the impact physical abuse sensing system.

Similarly, a number of different types and styles of sound sensors 340 may be effectively used to sense and report sounds reaching the infant simulator 05. One such sensor, capable of providing variable output dependent upon the decibel level of the sound reaching the infant simulator 05, is the sound-level meter diagrammed in Radio Shack Notebook #276-5011A referenced previously.

The motion sensor 70 and/or sound sensor 340 is electrically connected to the central microcontroller unit 20 wherein the duration and/or periodicity of the electrical signal generated by the motion sensor 70 and/or sound sensor 340 can be checked against predefined threshold limitations for transmitting an electrical overstimulation signal to the central microcontroller unit 20 when the threshold limit is exceeded. Upon receiving the electrical overstimulation signal, the central microcontroller unit 20 can generate an overstimulation signal and/or record and report an overstimulation event.

The types of motions and sounds sensed for purposes of detecting overstimulation are those having a strength/volume which are generally encountered and accepted by infants (i.e., they are not abusive, injurious or pernicious). Exemplary motions and sounds factored into determining the occurrence of an overestimation event include specifically, but not exclusively motions associated with bathing, patting to elicit a burp, routine conversation, diapering, dressing, feeding, hugging, rocking, rubbing of the stomach, light tickling, twirling, sounds typically emanating from a radio or television, etc.

In order to avoid the sensing of routine periods of handling as an overstimulation event, the central microcontroller unit 20 is preferably programmed to require the occurrence of at least one detectable motion/sound in each of several consecutive sampling periods with the total duration of the combined sampling periods lasting significantly longer than the longest demand period (e.g., 120 consecutive sampling periods of 30 seconds for a total of 60 minutes when the longest possible demand period is 30 minutes).

In a first embodiment, a recording function within the central microcontroller unit 20 records occurrences of overstimulation for later review by the program administrator. The specific information recorded and reported by the central microcontroller unit 20 can range from the relatively simple to the complex. For example, the central microcontroller unit 20 can be programmed to simply record and report that the infant simulator 05 was subjected to overstimulation at least once during the assignment period. Alternatively, the central microcontroller unit 20 can record and report the number of times the infant simulator 05 was overstimulated and the duration of each overstimulation event. A nonexhaustive list of options for recording and reporting overstimulation data is set forth in Table Ten, provided below.

TABLE TEN (OPTIONS FOR RECORDING AND REPORTING OVERSTIMULATION DATA)

| OPTION | DESCRIPTION | DATA RECORDED | SAMPLE REPORT |
|---|---|---|---|
| 1 | Records and reports that the infant simulator was overstimulated at least once during the assignment period. | YES/NO | Light ON/OFF |
| 2 | Records and reports the number of times the infant simulator was overstimulated. | Number | "3" |
| 3 | Records and reports total amount of time the infant simulator remained overstimulated during an assignment period. | Minutes | 45 |
| 4 | Records and reports the number of times the infant simulator was overstimulated and the total amount of time the infant simulator remained overstimulated. | #/Minutes | 3:45 |
| 5 | Records and reports the number of times the infant simulator was overstimulated, the total amount of time the infant simulator remained overstimulated, and the mean duration of the overstimulation periods. | #/Minutes Minutes | 3:45 03 |
| 6 | Records and reports the amount of time the infant simulator remained overstimulated for each occurrence during an assignment period. | #/Minutes | 1: 41 2: 01 3: 03 |
| 7 | Records and reports the number of times the infant simulator was overstimulated, the total amount of time the infant simulator was overstimulated, and the amount of time the infant simulator remained overstimulated for each overstimulation event occurring during an assignment period. | #/Minutes Minutes | 3: 45 41:01:03 |

In a second embodiment, the central microcontroller unit 20 is connected to a system (not shown) capable of generating an overstimulation signal $S_{12}$, such as an audible cry or scream. The central microcontroller unit 20 is programmed to generate the overstimulation signal $S_{12}$ whenever overstimulation is detected. Generation of the overstimulation signal $S_{12}$ warns the person caring for the infant simulator 05 that the infant simulator 05 has been overstimulated and corrective action (i.e., quiet time) is required. The overstimulation signal $S_{12}$ and timing of the overstimulation event can be terminated by suspending handling of the infant simulator 05 and/or removing the infant simulator 05 from the noisy environment so as to terminate transmission of an electrical signal from the motion sensor 70 and/or sound sensor 340 to the central microcontroller unit 20 for an appropriate period (i.e., 5 to 20 minutes).

The central microcontroller unit 20 may optionally be programmed to initiate a rocking-request event immediately after termination of the overstimulation signal $S_{12}$ for purposes of simulating a need for comforting of the infant simulator 05 in order to calm the infant simulator 05.

The central microcontroller unit 20 can be programmed to generate the overstimulation signal $S_{12}$ only at the beginning of each overstimulation event (i.e., generate a three second signal once an overstimulation event is detected), periodically throughout an overstimulation event (i.e., generate a three second signal once every thirty seconds after an overstimulation event is detected), or continuously throughout an overstimulation event.

A preferred embodiment of the overstimulation sensing system 440 combines both the recording/reporting and signaling systems.

The overstimulation signal $S_{12}$ may be intensified, in accordance with the ancillary feature of providing an escalated demand signal 240, based upon an increase in the length of time the infant simulator 05 remains overstimulated. An example is set forth in Table Eleven, provided below.

TABLE ELEVEN (ESCALATING OVERSTIMULATION SIGNAL)

| STRENGTH OF OVERSTIMULATION SIGNAL (AUDIBLE) | LENGTH OF TIME INFANT STIMULATOR REMAINS OVER SIMULATED (MINUTES) |
|---|---|
| 1st Intensity (soft cry) | <10 |
| 2nd Intensity (loud cry) | >10 |

The overstimulation module 440 may optionally communicate with a sound recorder 360 for initiating operation of the sound recorder 360 upon detection of overstimulation, and thereby recording any verbal comments or statements made near the infant simulator 05 for a defined time period (e.g., 3–5 minutes) after the overstimulation signal $S_{12}$ has been generated.

Smoking Detector System 320

The infant simulator 05 can be equipped with a smoke detector 320 capable of detecting environmental smoke and communicating an instance of detected smoke to the central microcontroller unit 20.

In a first embodiment, a recording function within the central microcontroller unit 20 records the occurrence of a smoke exposure event for later review by the program administrator. The specific information recorded and reported by the central microcontroller unit 20 can range from the relatively simple to the complex. For example, the central microcontroller unit 20 can be programmed to simply record and report whether the infant simulator 05 was exposed to detectable levels of smoke at least once during the assignment period. Alternatively, the central microcontroller unit 20 can record and report the number and individual duration of smoke exposures periods occurring within the assignment period. A nonexhaustive list of options for recording and reporting smoke exposure data is set forth in Table Twelve, provided below.

TABLE TWELVE (OPTIONS FOR RECORDING AND REPORTING SMOKE EXPOSURE DATA)

| OPTION | DESCRIPTION | DATA RECORDED | SAMPLE REPORT |
|---|---|---|---|
| 1 | Records and reports that smoke was detected at least once during the assignment period (i.e., a smoke exposure period occurred). | YES/NO | Light ON/OFF |
| 2 | Records and reports number of smoke exposure periods occurring during assignment period. | Number | "3." |
| 3 | Records and reports the number and duration of each smoke exposure period occurring during assignment period. | #/Minutes | 1:02<br>2:05<br>3:03 |

In a second embodiment, the central microcontroller unit 20 is electrically connected to a system (not shown) capable of generating a perceptible smoke exposure signal $S_9$. The central microcontroller unit 20 is programmed to generate the perceptible smoke exposure signal $S_9$ when smoke is detected. Generation of the perceptible smoke exposure signal $S_9$ warns the student caring for the infant simulator 05 that the infant simulator 05 is being exposed to unacceptable levels of smoke. The smoke exposure signal $S_9$ and timing of the smoke exposure period can be terminated by removing the infant simulator 05 from the unacceptably smoky environment (e.g., removing the infant simulator 05 from the room), thereby terminating detection of a smoky environment and ceasing transmission of an electrical signal from the smoke detector 320 to the central microcontroller unit 20.

The central microcontroller unit 20 may optionally be programmed to initiate a rocking-request event immediately after termination of the smoke exposure signal $S_9$ for purposes of simulating a need for comforting of the infant simulator 05 after such an exposure to a smoky environment.

A preferred embodiment of the smoke detector module 420 combines both the recording/reporting and signaling systems.

The central microcontroller unit 20 can be programmed to generate the perceptible smoke exposure signal $S_9$ only at the beginning of a smoke exposure period (i.e., generate a ten second signal as soon as smoke is detected), periodically throughout a smoke exposure period (e.g., generate a two second signal every minute once smoke is detected until smoke is no longer detected), or continuously throughout a smoke exposure period.

The smoke exposure signal $S_9$ may be intensified, in accordance with the ancillary feature of providing an escalated demand signal 240, based upon a prolonged exposure to smoke. An example of is set forth in Table Thirteen, provided below.

TABLE THIRTEEN (ESCALATING SMOKE EXPOSURE SIGNAL)

| STRENGTH OF SIGNAL (AUDIBLE) | SMOKE EXPOSURE DURATION (MINUTES) |
|---|---|
| 1st Intensity (whimper) | <2 |
| 2nd Intensity (cough) | 2 to 5 |
| 3rd Intensity (cough and scream) | >5 |

The smoke detector system 320 may optionally communicate with a sound recorder 360 for initiating operation of the sound recorder 360 upon detection of smoke, and thereby recording any verbal comments or statements made near the infant simulator 05 for a defined time period (e.g., 3–5 minutes) after the smoke exposure signal $S_9$ has been generated.

The smoke detector 320, as with the central microcontroller unit 20 and battery pack 25, is preferably equipped with a tamper indicating device (not shown) for purposes of signaling and/or recording and reporting efforts to remove or otherwise access the smoke detector 320.

Sun Exposure Sensing System

The infant simulator 05 can be equipped with a light sensor 350, such as a CDS Photo Cell, Mouser stock number 524-61 1-J4-805 available from Mouser Electronics, for sensing the quantity of light striking the infant simulator 05 and communicating the sensed illuminance to the central microcontroller unit 20.

In a first embodiment, a recording function within the central microcontroller unit 20 records instances where the sensed illuminance exceeds a defined threshold value, wherein the threshold value is established at a level effective for differentiating between acceptable exposure to artificial lighting or indirect sunlight, and unacceptable exposure to direct sunlight (e.g., 2,000 foot-candles). Such recorded sun exposure data is then available for later review by a program administrator. The specific sun exposure information recorded and reported by the central microcontroller unit 20 can range from the relatively simple to the complex. For example, the central microcontroller unit 20 can be programmed to simply record and report whether the sensed illuminance exceeded the threshold value at least once during the assignment period. Alternatively, the central microcontroller unit 20 can record illuminance values every two minutes throughout an entire assignment period and graphically report the recorded illuminance at the end of the assignment period. A nonexhaustive list of options for recording and reporting sun exposure data is set forth in Table Fourteen, provided below.

TABLE FOURTEEN (OPTIONS FOR RECORDING AND REPORTING SUN EXPOSURE DATA)

| OPTION | DESCRIPTION | DATA RECORDED | SAMPLE REPORT |
|---|---|---|---|
| 1 | Records and reports that sensed illuminance exceeded threshold value at least once during an assignment period (i.e., a sun exposure event occurred). | YES/NO | Light ON/OFF |
| 2 | Records and reports number of sun exposure events. | Number | "3" |
| 3 | Records and reports highest illuminance experienced during all sun exposure periods occurring during the assignment period. | Foot-candles | 6,200 |
| 4 | Records and reports the number of sun exposure events and highest illuminance for each sun exposure period. | #/Foot-candles | 1: 6000<br>2: 6200<br>3: 5350 |
| 5 | Records and reports the number of sun exposure events and duration of each sun exposure period. | #/Minutes | 1: 06<br>2: 18<br>3: 02 |
| 6 | Records and reports the number of sun exposure events and continuously records and reports illuminance throughout each sun exposure period. | #/Foot-candles | 1:6000, 6000, 6000, 6000.<br>2:5500, 5500, 5600, 5800, 5800, 5800, 5900, 6200, 6200, 6200.<br>3:5350, 5000 |
| 7 | Continuously records and reports illuminance throughout an assignment period. | Minutes/Foot-candles | 02: 1200<br>04: 1400<br>06: 1200<br>08: 1200<br>10: 1200<br>. . . |

In a second embodiment, the central microcontroller unit 20 is connected to a system (not shown) capable of generating a perceptible sun exposure signal $S_{15}$. The central microcontroller unit 20 is programmed to generate the perceptible sun exposure signal $S_{15}$ when the sensed illuminance exceeds the defined threshold value. Generation of the perceptible sun exposure signal $S_{15}$ warns the student caring for the infant simulator 05 that the infant simulator 05 is being exposed to direct sunlight and must be protected.

The sun exposure signal $S_{15}$ and timing of the sun exposure period can be terminated by removing the infant simulator 05 from direct sunlight (e.g., shading the infant with an umbrella or moving the infant to a shaded area).

The central microcontroller unit 20 may optionally be programmed to initiate a rocking-request event immediately after termination of the sun exposure signal $S_{15}$ for purposes of simulating a need for comforting of the infant simulator 05 after such a startling exposure to sunlight.

A preferred embodiment of the sun exposure module 470 combines both the recording/reporting and signaling systems.

The central microcontroller unit 20 can be programmed to generate the perceptible sun exposure signal $S_{15}$ only at the beginning of a sun exposure period (i.e., generate a ten second signal as soon as a sensed illuminance exceeds the threshold value), periodically throughout a sun exposure period (e.g., generate a two second signal every minute once the sensed illuminance exceeds the threshold value until the sensed illuminance falls below the threshold value), or continuously throughout a sun exposure period.

The sun exposure signal $S_{15}$ may be intensified, in accordance with the ancillary feature of providing an escalated demand signal 240, based upon (i) an increase in the difference between the sensed illuminance and the threshold value, and/or (ii) an increase in the duration of the sun exposure period. An example of each is set forth in Table Fifteen, provided below.

TABLE FIFTEEN (ESCALATING SUN EXPOSURE SIGNAL)

| STRENGTH OF PERCEPTIBLE SIGNAL (AUDIBLE) | SUN EXPOSURE DURATION (MINUTES) | ILLUMINANCE OVER THRESHOLD VALUE (FOOT-CANDLES) |
|---|---|---|
| 1st Intensity (whimper) | <5 | <500 |
| 2nd Intensity (cry) | 5 to 20 | 500 to 2000 |
| 3rd Intensity (shriek) | >20 | >2000 |

The sun exposure module 470 may optionally communicate with a sound recorder 360 for initiating operation of the sound recorder 360 upon generation of the sun exposure signal $S_{15}$, and thereby recording any verbal comments or statements made near the infant simulator 05 for a defined time period (e.g., 3–5 minutes) after the sun exposure signal $S_{15}$ has been generated.

The sun exposure module 470 may also include the ancillary feature of entry into a comatose state 280 based upon (i) the sensing of an illuminance far in excess of a defined threshold (e.g., 5,000 foot-candles over a threshold value of 2,000 foot-candles), and/or (ii) the duration of a sun exposure period in excess of a defined threshold (e.g., 60 minutes).

The light sensor 350, as with the central microcontroller unit 20 and battery pack 25, is preferably equipped with a tamper indicating device (not shown) for purposes of signaling and/or recording and reporting efforts to remove or otherwise access the light sensor 350.

Temperature Sensing System 40

The infant simulator 05 can be equipped with a temperature sensor 40, such as a simple thermister, capable of sensing the environmental temperatures to which the infant simulator 05 is exposed and communicating the sensed temperatures to the central microcontroller unit 20.

In a first embodiment, a recording function within the central microcontroller unit 20 records the sensed temperatures for later review by the program administrator. The specific information recorded and reported by the central microcontroller unit 20 can range from the relatively simple to the complex. For example, the central microcontroller unit 20 can be programmed to simply record and report whether the sensed environmental temperature fell outside a defined acceptable temperature range (e.g., 10° C. and 40° C., preferably 15° C. and 35° C.) at least once during the assignment period. Alternatively, the central microcontroller unit 20 can record temperature values every two minutes throughout an entire assignment period and graphically report the recorded temperatures at the end of the assignment period. A nonexhaustive list of options for recording and reporting thermal exposure data is set forth in Table Sixteen, provided below.

TABLE SIXTEEN (OPTIONS FOR RECORDING AND REPORTING THERMAL EXPOSURE DATA)

| OPTION | DESCRIPTION | DATA RECORDED | SAMPLE REPORT |
|---|---|---|---|
| 1 | Records and reports that sensed temperature fell outside of acceptable temperature range at least once during the assignment period (i.e., a thermal exposure period occurred). | YES/NO | Light ON/OFF |
| 2 | Records and reports number of thermal exposure events occurring within the assignment period. | Number | "3." |
| 3 | Records and reports high and low temperature extremes sensed during the assignment period. | ° C. | 22° C.:49° C. |
| 4 | Records and reports the number of thermal exposure events and the temperature extreme for each thermal exposure period. | ° C. | 1: 42° C. 2: 49° C. 3: 45° C. |
| 5 | Records and reports the number of thermal exposure events and the duration of each thermal exposure period. | #/Minutes | 1: 06 2: 18 3: 02 |
| 6 | Records and reports the number of thermal exposure events and continuously records and reports the temperature throughout a thermal exposure period. | #/° C. | 1:42, 42, 42, 42 2:41, 43, 45, 46, 47, 47, 47, 49, 45, 42, 41 3:43, 45 |
| 7 | Continuously records and reports the temperature throughout an assignment period. | Minutes/° C. | 02: 27 04: 27 06: 28 08: 29 10: 28 . . . |

In a second embodiment, the central microcontroller unit 20 is programmed with defined upper and lower temperature limits (e.g., 10° C. and 40° C., preferably 15° C. and 35° C.) and connected to a system (not shown) capable of generating a perceptible thermal exposure signal $S_2$. The central microcontroller unit 20 is programmed to generate the perceptible thermal exposure signal $S_2$ when the sensed temperature falls outside the acceptable temperature range. Generation of the perceptible thermal exposure signal $S_2$ warns the student caring for the infant simulator 05 that the environmental temperature has reached an unacceptable level and corrective action is required. A preferred perceptible thermal exposure signal $S_2$ when the infant is cold is shivering of the infant simulator 05 generated by activation of an electronic motor spinning an out-of-balance weight. The thermal exposure signal $S_2$ and timing of the thermal exposure period can be terminated by removing the infant simulator 05 from the unacceptably warm or cold environment (e.g., removing the infant simulator 05 from the car or turning on the air conditioner), thereby returning the body temperature of the infant simulator 05 to an acceptable temperature and ceasing transmission of an electrical signal from the temperature sensor 40 to the central microcontroller unit 20.

The central microcontroller unit 20 may optionally be programmed to initiate a rocking-request event immediately after termination of the thermal exposure signal $S_2$ for purposes of simulating a need for comforting of the infant simulator 05 after such a discomforting exposure to extreme temperatures.

A preferred embodiment of the temperature sensor module 120 combines both the recording/reporting and signaling systems.

The central microcontroller unit 20 can be programmed to generate the perceptible thermal exposure signal $S_2$ only at the beginning of a thermal exposure period (i.e., generate a ten second signal as soon as a sensed temperature falls outside the acceptable temperature range), periodically throughout a thermal exposure period (e.g., generate a two second signal every minute once the sensed temperature falls outside the acceptable temperature range until the sensed temperature returns to the acceptable temperature range), or continuously throughout a thermal exposure period.

The thermal exposure signal $S_2$ may be intensified, in accordance with the ancillary feature of providing an escalated demand signal 240, based upon (i) an increase in the difference between the sensed temperature and the temperature limit, and/or (ii) an increase in the duration of the thermal exposure period. An example of each is set forth in Table Seventeen, provided below.

TABLE SEVENTEEN (ESCALATING THERMAL-DISCOMFORT SIGNAL)

| STRENGTH OF PERCEPTIBLE SIGNAL (AUDIBLE) | THERMAL EXPOSURE DURATION (MINUTES) | TEMPERATURE BEYOND ACCEPTABLE LIMIT (° C.) |
|---|---|---|
| 1st Intensity (whimper) | <5 | <5 |
| 2nd Intensity (cry) | 5 to 10 | 5 to 10 |
| 3rd Intensity (shriek) | >10 | >10 |

The temperature module 120 may optionally communicate with a sound recorder 360 for initiating operation of the sound recorder 360 upon commencing generation of a thermal-exposure signal $S_2$, and thereby recording any verbal comments or statements made near the infant simulator 05 for a defined time period (e.g., 3–5 minutes) after the thermal-exposure signal $S_2$ has been generated.

The temperature sensing module 120 may also include the ancillary feature of entry into a comatose state 280 based upon (i) the sensing of a difference between the sensed temperature and the temperature limit in excess of a defined threshold (e.g., 20° C.), and/or (ii) a duration of a thermal exposure period in excess of a defined threshold (e.g., 20 minutes).

The temperature sensor 40, as with the central microcontroller unit 20 and battery pack 25, is preferably equipped with a tamper indicating device (not shown) for purposes of signaling and/or recording and reporting efforts to remove or otherwise access the temperature sensor 40.

Missing Diaper Module 490

The infant simulator 05 can be equipped with a diaper sensor 370, such as a normally open Hall Effect switch 62 as described in detail in connection with the diaper-change event, capable of sensing whether the infant simulator 05 is wearing a diaper, such as one of the diapers 60 described in detail in connection with the diaper-change event, and communicating the sensing of a missing-diaper 60 to the central microcontroller unit 20.

In order to prevent the initiation of a missing-diaper event when the diaper 60 is only missing for a short period of time, such as during a diaper change, the central microcontroller unit 20 can be programmed to periodically check the status of any signal generated by the missing diaper sensor 370 (e.g., every 5 to 30 minutes) and generate a missing-diaper signal $S_{17}$ only when at least two consecutive checks of the missing diaper sensor 370 indicate that the diaper 60 is missing.

In a first embodiment, a recording function within the central microcontroller unit 20 records any instances of a sensed missing-diaper for later review by the program administrator. The specific information recorded and reported by the central microcontroller unit 20 can range from the relatively simple to the complex. For example, the central microcontroller unit 20 can be programmed to simply record and report whether a missing-diaper was sensed at least once during the assignment period. Alternatively, the central microcontroller unit 20 can record and report the number and individual duration of missing-diaper periods occurring within the assignment period. A nonexhaustive list of options for recording and reporting missing-diaper data is set forth in Table Eighteen below.

TABLE EIGHTEEN (OPTIONS FOR RECORDING AND REPORTING MISSING-DIAPER DATA)

| OPTION | DESCRIPTION | DATA RECORDED | SAMPLE REPORT |
|---|---|---|---|
| 1 | Records and reports only fact that diaper was detected as missing at least once during assignment period (i.e., occurrence of a missing-diaper event). | YES/NO | Light ON/OFF |
| 2 | Records and reports number of missing-diaper events. | Number | "4." |
| 3 | Records and reports the number and duration of each missing-diaper period. | #/Minutes | 1: 02<br>2: 08<br>3: 02<br>4: 02 |

In a second embodiment, the central microcontroller unit 20 is connected to a system (not shown) capable of generating a perceptible missing-diaper signal $S_{17}$. The central microcontroller unit 20 is programmed to generate the perceptible missing diaper signal $S_{17}$ when the diaper sensor 370 detects that the infant simulator 05 is not wearing a diaper 60. Generation of the perceptible missing-diaper signal $S_{17}$ warns the student caring for the infant simulator 05 that the infant simulator 05 is not wearing a diaper 60 and should be fitted with a diaper 60. The missing-diaper signal $S_{17}$ and timing of the missing-diaper period can be terminated by fitting a diaper 60 upon infant simulator 05, thereby ceasing transmission of an electrical signal from the diaper sensor 370 to the central microcontroller unit 20.

A preferred embodiment of the missing-diaper module 490 combines both the recording/reporting and signaling systems.

The central microcontroller unit 20 can be programmed to generate the perceptible missing-diaper signal $S_{17}$ only at the beginning of a missing-diaper period (i.e., generate a ten second signal as soon as the diaper 60 is detected as missing), periodically throughout a missing-diaper period (e.g., generate a two second signal every minute once the diaper 60 is detected as missing until the diaper 60 is fitted upon the infant simulator 05), or continuously throughout a missing-diaper period.

Since an actual infant would not normally be expected to become increasingly uncomfortable as the duration of a missing-diaper event increases, the missing-diaper sensing module 490 need not, and preferably does not, include the ancillary feature of providing an escalated demand signal 240.

The missing-diaper module 490 may optionally communicate with a sound recorder 360 for initiating operation of the sound recorder 360 upon detection of a missing-diaper, and recording any verbal comments or statements made near the infant simulator 05 during a missing-diaper period. Such recording may continue for a defined time period (e.g., 3 to 5 minutes) or for the entire duration of a missing-diaper period.

The missing-diaper sensor 370, as with the central microcontroller unit 20 and battery pack 25, is preferably equipped with a tamper indicating device (not shown) for purposes of signaling and/or recording and reporting efforts to remove or otherwise access the missing-diaper sensor 370.

Demand Events

Diaper-Change Event

The central microcontroller unit 20 can be programmed to effect periodic diaper-change events, wherein the student caring for the infant simulator 05 is signaled by the infant simulator 05, on a schedule unknown to the student, that the diaper 60 on the infant simulator 05 needs to be changed. Preferred diaper-change signals $S_4$ include an audible cry and/or a wetting of the diaper 60.

The time interval between diaper-change periods can be a bounded random variable (e.g., occurring every 30 to 120 minutes) or a predetermined variable (e.g., sequentially occurring at intervals of 30, 90, 30, 30, 120, 60, 20 and 90 minutes). In order to more accurately emulate the care requirements of an actual infant, and prevent students from memorizing the schedule of demand events, it is generally preferred to control the time interval between demand events as a bounded random variable. Alternatively, multiple pre-defined programs, each providing a different fixed schedule of demand events, can also be realistically employed so long as the students do not know which program has been selected (i.e., the schedule of demand events is random from the perspective of the student) and the number of programs is sufficient to prevent the students from memorizing one or two different schedules and thereafter being able to partially defeat the purpose of the program by ignoring the infant simulator 05 between scheduled demand events.

Referring to FIG. 3, the infant simulator 05 can include a pair of oppositely mounted, normally open Hall Effect switches 62a and 62b (hereinafter diaper-change switches), within the torso 12 of the mannequin 10. A wide variety of suitable Hall Effect switches 62 are available from a number of different manufacturers, including Hall Effect switch Model No. DN 6851A manufactured by Panasonic. The diaper-change switches 62 are electrically connected to the central microcontroller unit 20. Because the diaper-change switches 62 are mounted in reverse directions within the mannequin 10, the first diaper-change switch 62a is closed only by a magnet 61 having a "north" facing polarity, while the second diaper-change switch 62b is closed only by a magnet 61 having a "south" facing polarity.

Figure 4A:
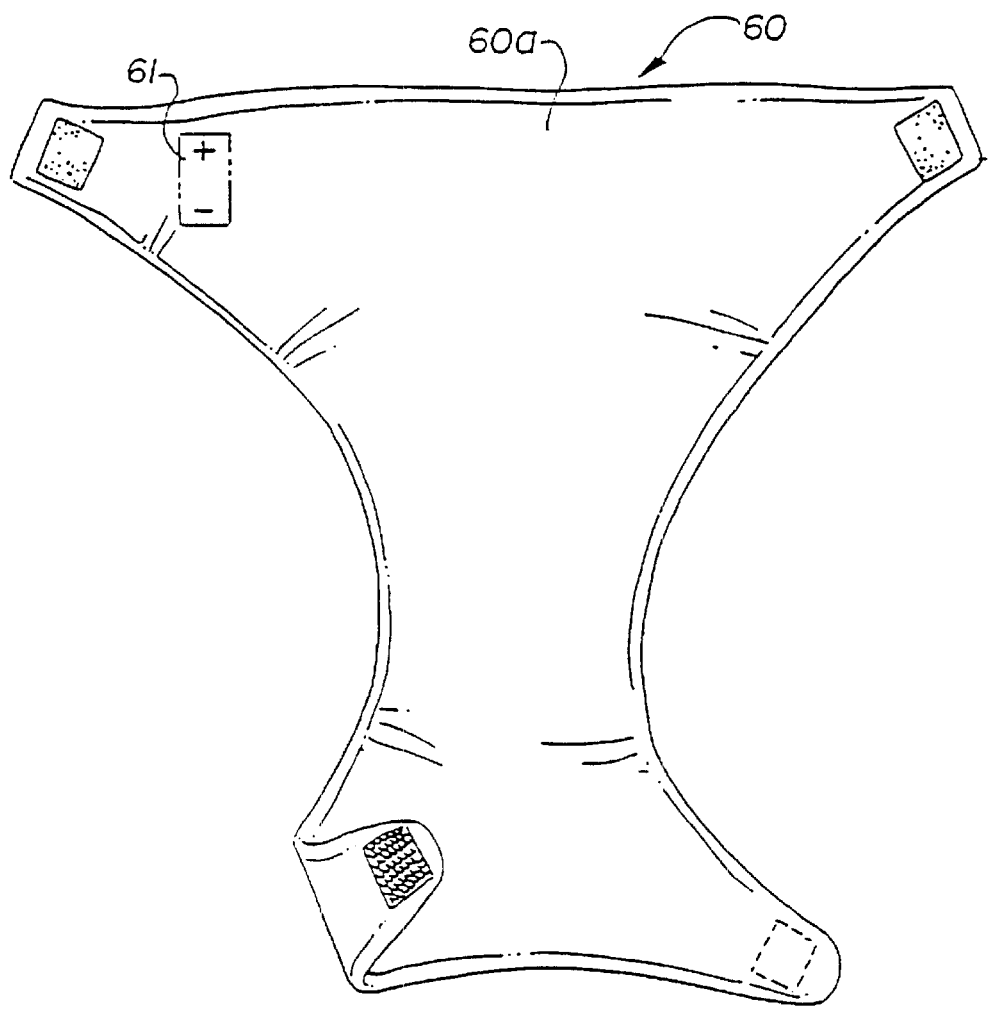
FIG. 4a is a perspective view of one embodiment of a first diaper for use in combination with the infant simulator for initiating transmission of a diaper-change satisfaction signal.
Figure 4B:
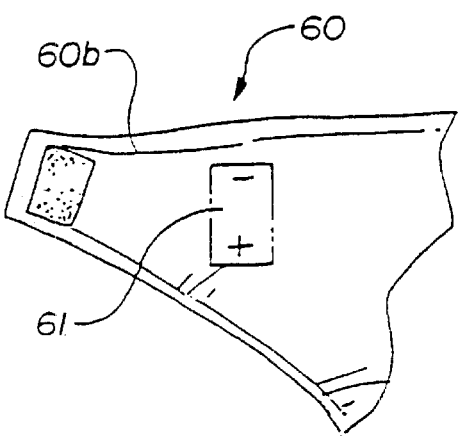
FIG. 4b is a perspective view of one embodiment of a second diaper for use in combination with the infant simulator for initiating transmission of a diaper-change satisfaction signal.

Referring to FIGS. 4a and 4b, the student caring for the infant simulator 05 is provided with two diapers 60 sized to fit the infant simulator 05. A magnet 61 is sewn into each of the diapers 60 at a position effective for placing the magnet 61 in close proximity to the appropriate diaper-change switch 62 when the diaper 60 is fitted onto the mannequin 10. The magnet 61 in the first diaper 60a is rotated so that the magnet 61 has a "north" facing polarity when the first diaper 60a is fitted onto the mannequin 10, while the magnet 61 in the second diaper 60b is rotated so that the magnet 61 has a "south" facing polarity when the second diaper 60b is fitted onto the mannequin 10. When the appropriate diaper-change switch 62 is closed, an electrical diaper-change satisfaction signal $St_4$ is sent to the central microcontroller unit 20 and the diaper-change signal $S_4$ is arrested. Timing of the diaper-change episode is also terminated.

The central microcontroller unit 20 initiates a diaper-change event by alternating the "selected" diaper-change switch 62 as between the first 62a and second 62b diaper-change switches, and initiating generation of a perceptible diaper-change signal $S_4$. In order to arrest the diaper-change signal $S_4$, the student must close the newly selected diaper-change switch 62 by changing the diaper 60.

The central microcontroller unit 20 preferably includes a recording function for recording relevant diaper-change episode data for later review by the program administrator. The specific information recorded and reported by the central microcontroller unit 20 can range from the relatively simple to the complex. For example, the central microcontroller unit 20 can be programmed to simply record and report the total duration of all diaper-change episodes. Alternatively, the central microcontroller unit 20 can record and report the total number of diaper-change events which occurred during an assignment period and the duration of each individual diaper-change episode. A nonexhaustive list of options for recording and reporting relevant diaper-change episode data is set forth in Table Nineteen, provided below.

TABLE NINETEEN (OPTIONS FOR RECORDING AND REPORTING DIAPER-CHANGE EPISODE DATA)

| OPTION | DESCRIPTION | DATA RECORDED | SAMPLE REPORT |
|---|---|---|---|
| 1 | Records and reports total duration of all diaper-change episodes occurring throughout an assignment period. | Minutes | 45 |
| 2 | Records and reports total number of diaper-change episodes and number of diaper-change episodes lasting longer than a given grace period (e.g., two minutes). | #/# | 5:4 |
| 3 | Records and reports number of diaper-change episodes and total duration of all diaper-change episodes occurring throughout an assignment period. | #/Minutes | 4:45 |
| 4 | Records and reports number of diaper-change episodes, total duration of all diaper-change episodes occurring throughout an assignment period, and mean duration of the diaper-change episodes. | #/Minutes Minutes | 5:45 4 |

TABLE NINETEEN-continued (OPTIONS FOR RECORDING AND REPORTING DIAPER-CHANGE EPISODE DATA)

| OPTION | DESCRIPTION | DATA RECORDED | SAMPLE REPORT |
|---|---|---|---|
| 5 | Records and reports duration of each individual diaper-change episode occurring throughout an assignment period. | #/Minutes | 1: 03<br>2: 18<br>3: 20<br>4: 00<br>5: 04 |
| 6 | Records and reports number of diaper-change episodes, total duration of all diaper-change episodes, and individual duration of each diaper-change episode occurring throughout an assignment period. | #/Minutes Minutes | 4: 45<br>03:18:20:00:04 |

The central microcontroller unit 20 can be programmed to generate the perceptible diaper-change signal $S_4$ only at the beginning of a diaper-change period (i.e., generate a ten second signal when a diaper-change period is initiated by the central microcontroller unit 20), periodically throughout a diaper-change period (e.g., generate a two second signal every minute once a diaper-change period is initiated by the central microcontroller unit 20), or continuously throughout a diaper-change period.

The diaper-change signal $S_4$ may be intensified, in accordance with the ancillary feature of providing an escalating demand signal 240, based upon an increase in the duration of the diaper-change episode. An example is set forth in Table Twenty, provided below.

TABLE TWENTY (ESCALATING DIAPER-CHANGE SIGNAL)

| STRENGTH OF PERCEPTIBLE SIGNAL (AUDIBLE) | DIAPER-CHANGE EPISODE DURATION (MINUTES) |
|---|---|
| 1st Intensity (soft cry) | <01 |
| 2nd Intensity (loud cry) | >01 |

The diaper-change module 140 may optionally communicate with a sound recorder 360 for initiating operation of the sound recorder 360 upon commencement of a diaper-change event, thereby recording any verbal comments or statements made near the infant simulator 05 for a defined time period (e.g., 3–5 minutes) after the diaper-change signal $S_4$ has been generated.

Feeding Event

The central microcontroller unit 20 can be programmed to effect periodic feeding-request events, wherein the student caring for the infant simulator 05 is signaled by the infant simulator 05, on a schedule unknown to the student, to feed the infant simulator 05. Preferred types of feeding-request signals $S_6$ include crying, sucking, outstretched arms 13 and combinations thereof.

The time interval between feeding-request periods can be a bounded random variable (e.g., occurring every 30 to 120 minutes) or a predetermined variable (e.g., sequentially occurring at intervals of 30, 90, 30, 30, 120, 60, 20 and 90 minutes). In order to more accurately emulate the care requirements of an actual infant, and prevent students from memorizing the schedule of demand events, it is generally preferred to control the time interval between demand events as a bounded random variable. Alternatively, multiple predefined programs, each providing a different fixed schedule of demand events, can also be realistically employed so long as the students do not know which program has been selected (i.e., the schedule of demand events is random from the perspective of the student) and the number of programs is sufficient to prevent the students from memorizing one or two different schedules and thereafter being able to partially defeat the purpose of the program by ignoring the infant simulator 05 between scheduled demand events.

Referring to FIG. 3, the infant simulator 05 can include a normally open Hall Effect switch 82 (hereinafter feed switch), within the head 11 of the mannequin 10 immediately behind the mouth (unnumbered). The feed switch 82 is electrically connected to the central microcontroller unit 20. The feed switch 82 is normally open, and can be closed only by a magnet 81 having the appropriately directed polarity.

Figure 5:
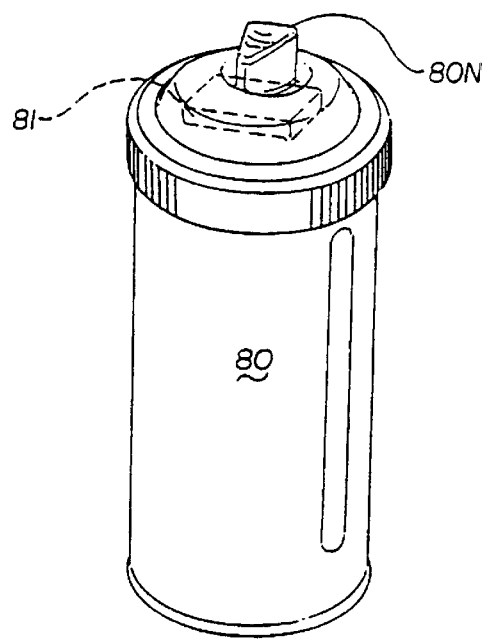
FIG. 5 is a perspective view of one embodiment of a bottle for use in combination with the infant simulator for initiating transmission of a feeding-request satisfaction signal.

Referring to FIG. 5, the student caring for the infant simulator 05 is provided with a bottle 80 scaled to the size of the infant simulator 05. A magnet 81 is molded into the bottle 80 at a position effective for placing the magnet 81 in close proximity to the feed switch 82 when the bottle 80 is placed against the mouth (unnumbered) of the mannequin 10. Alternatively, the magnet 81 can be molded within a key (not shown) bearing indicia representative of a bottle. When a breast feeding option is provided, an object or indicia representative of breast feeding (not shown) (e.g., a silhouette of a mother and child) can be utilized in place of the bottle.

The mouth (unnumbered) of the mannequin 10 can optionally be molded to include a shaped indentation (not shown) into which a correspondingly shaped nipple 80n on the bottle 80 can be inserted. The shape of the indentation (not shown) and the nipple 80n are selected so that the bottle 80 must be rotated into a predetermined relationship relative to the head 11 of the mannequin 10 in order to fit within the indentation (not shown). Such rotation-specific shapes include specifically, but not exclusively, an isosceles triangle, a circular segment, and an "L." When the nipple 80n of the bottle 80 is fitted within the indentation (not shown) in the mouth (unnumbered) the magnet 81 in the bottle 80 is properly oriented relative to the feed switch 82 and the feed switch 82 is closed. When the feed switch 82 is closed, an electrical feeding-request satisfaction signal $St_6$ is sent to the central microcontroller unit 20 and the feeding-request signal $S_6$ arrested. Timing of the feeding-request episode is also terminated.

The central microcontroller unit 20 initiates a feeding-request event by initiating generation of a perceptible feeding-request signal $S_6$. In order to arrest the feeding-request signal $S_6$, the student must "feed" the infant simulator 05 by placing the bottle 80 against the mouth (unnumbered) of the mannequin 10.

The central microcontroller unit 20 can be programmed to either terminate or inhibit generation of the feeding-request signal $S_6$ once the feeding satisfaction signal $St_6$ is sensed. When the termination option is selected, the student need only feed the infant simulator 05 for some minimum time period (e.g., two to ten seconds) sufficient to ensure that feeding has been sensed, after which the student may stop feeding the infant simulator 05 and the feeding-request signal $S_6$ will not begin again. When the inhibition option is selected, the student must continuously feed the infant simulator 05 throughout the feeding-request period (e.g., five to twenty minutes) to prevent the feeding-request signal $S_6$ from being generated, with the end of a feeding-request period optionally indicated by the generation of a feeding period completion signal such as a side-to-side movement of the head 10. The inhibition option is generally preferred as it more closely emulates the care requirements of an actual infant.

The micro controller unit 20 can optionally be programmed to generate a "coo" or similar positive signal at the end of a feeding period, provided the feeding-request satisfaction signal $St_6$ has been provided during the feeding-request period (e.g., the feeding-request satisfaction signal $St_6$ was transmitted to the infant simulator 05 within initial grace period ), for purposes of providing the student with positive feedback.

The central microcontroller unit 20 preferably includes a recording function for recording relevant feeding-request episode data for later review by the program administrator. The specific information recorded and reported by the central microcontroller unit 20 can range from the relatively simple to the complex. For example, the central microcontroller unit 20 can be programmed to simply record and report the total duration of all feeding-request episodes. Alternatively, the central microcontroller unit 20 can record and report the total number of feeding-request events which occurred during an assignment period and the duration of each individual feeding-request episode. A nonexhaustive list of options for recording and reporting relevant feeding-request episode data is set forth in Table Twenty One, provided below.

TABLE TWENTY ONE (OPTIONS FOR RECORDING AND REPORTING FEEDING-REQUEST EPISODE DATA)

| OPTION | DESCRIPTION | DATA RECORDED | SAMPLE REPORT |
|---|---|---|---|
| 1 | Records and reports total duration of all feeding-request episodes occurring throughout an assignment period. | Minutes | 45 |
| 2 | Records and reports total number of feeding-request episodes and number of feeding-request episodes lasting longer than a given grace period (e.g, two minutes). | #/# | 5:5 |
| 3 | Records and reports number of feeding-request episodes and total duration of all feeding-request episodes occurring throughout an assignment period. | #/Minutes | 5:45 |
| 4 | Records and reports number of feeding-request events, total duration of all feeding-request episodes, and mean duration of the feeding-request episodes occurring throughout an assignment period. | #/Minutes Minutes | 5:45 03 |
| 5 | Records and reports duration of each individual feeding-request episode occurring throughout an assignment period. | #/Minutes | 1: 03 2: 18 3: 20 4: 02 5: 02 |
| 6 | Records and reports number of feeding-request episodes, total duration of all feeding-request episodes, and individual duration of each feeding-request episode occurring throughout an assignment period. | #/Minutes Minutes | 5: 45 03:18:20:02:02 |

The central microcontroller unit 20 can be programmed to generate the perceptible feeding-request signal $S_6$ only at the beginning of a feeding-request period (i.e., generate a ten second signal when a feeding-request period is initiated by the central microcontroller unit 20), periodically throughout a feeding-request period (e.g., generate a two second signal every minute once a feeding-request period is initiated by the central microcontroller unit 20), or continuously throughout a feeding-request period.

The feeding-request signal $S_6$ may be intensified, in accordance with the ancillary feature of providing an escalating demand signal 240, based upon an increase in the duration of the feeding-request episode. An example is set forth in Table Twenty Two, provided below.

TABLE TWENTY TWO (ESCALATING FEEDING-REQUEST SIGNAL)

| STRENGTH OF PERCEPTIBLE SIGNAL (AUDIBLE) | FEEDING-REQUEST EPISODE DURATION (MINUTES) |
|---|---|
| 1st Intensity (soft cry) | <01 |
| 2nd Intensity (loud cry) | >01 |

The feeding module 160 may optionally communicate with a sound recorder 360 for initiating operation of the sound recorder 360 upon commencement of a feeding-request event, thereby recording any verbal comments or statements made near the infant simulator 05 for a defined time period (e.g., 3–5 minutes) after the feeding-request signal $S_6$ has been generated.

The feeding module 160 may also include an ancillary comatose feature 280 based upon a repeated failure to feed the infant simulator (e.g., a feeding-request satisfaction signal $St_6$ is not received for three consecutive feeding-request periods).

Burping Event

The central microcontroller unit 20 can be programmed to effect burping-request period, wherein the student caring for the infant simulator 05 is signaled by the infant simulator 05, on a schedule unknown to the student, to burp the infant simulator 05 after the infant simulator 05 has been fed in response to a feeding-request signal $S_6$. Burping-request periods can be initiated after the satisfaction of some or all of the feeding-request periods and is preferably initiated independently of any environmental condition (e.g., initiation of a burping-request period is not contingent upon the student laying the infant simulator 05 face down on the floor after a feeding period). Preferred types of burping-request signals $S_7$ include crying, whimpering, fidgeting and combinations thereof.

Burping-request periods can be initiated immediately after the end of a satisfied feeding-request period or after a defined delay (e.g., two to thirty minutes). The delay between the end of a feeding-request period and initiation of a burping-request period can be a bounded random variable (e.g., 0 to 30 minutes) or a predetermined variable (e.g., sequentially occurring at intervals of 0, 9, 3, 0, 12, 6, 20 and 9 minutes). In order to more accurately emulate the care requirements of an actual infant, and prevent students from memorizing and sharing the schedule of demand events, it is generally preferred to control the length of the delay as a bounded random variable. Alternatively, multiple predefined programs, each providing a different fixed schedule of demand events including scheduling of burping-request periods, can also be realistically employed so long as the students do not know which program has been selected (i.e., the schedule of demand events is random from the perspective of the student) and the variation in the duration of the delay between a feeding-request event and a burping-request event is sufficient to prevent the students from memorizing one or two different durations and thereafter being able to partially defeat the purpose of the program by ignoring the infant simulator 05 between sequential feeding-request and burping-request events.

Referring to FIG. 3, the same motion sensor 70 used for purposes of sensing rocking of the infant simulator 05 can also be effectively used to sense burping of the infant simulator 05 since the type of motion provided by rocking and patting are both detectable by the motion sensor 70. When motion of the appropriate amplitude is sensed, an electrical burping-request satisfaction signal $St_7$ is sent to the central microcontroller unit 20 and the burping-request signal $S_7$ is arrested. Timing of the burping-request episode is also terminated.

The central microcontroller unit 20 initiates a burping-request event by initiating generation of a perceptible burping-request signal $S_7$. In order to arrest the burping-request signal $S_7$, the student must pat the infant simulator 05 with sufficient force to generate an appropriate electrical signal in the motion sensor 70 (i.e., sufficient to signal "patting" but insufficient to signal "abuse").

The central microcontroller unit 20 can be programmed to either terminate or inhibit generation of the burping-request signal $S_7$ once patting is sensed. When the termination option is selected, the student need only burp the infant simulator 05 for some minimum time period (e.g., two to ten seconds) sufficient to ensure that burping has been sensed, after which the student may stop burping the infant simulator 05 and the burping-request signal $S_7$ will not begin again. When the inhibition option is selected, the student must continuously burp the infant simulator 05 throughout the burping-request period (e.g., five to twenty minutes) to prevent the burping-request signal $S_7$ from being generated, with the end of a burping-request period optionally indicated by the generation of a burping-request period completion signal such as a burp. The inhibition option is generally preferred as it more closely emulates the care requirements of an actual infant.

The micro controller unit 20 can optionally be programmed to generate a "burp" sound at the end of a burping period, provided the requested burping action has been provided during the burping period (e.g., burping action commenced within initial grace period and/or threshold duration of patting provided during burping-request period), for purposes of providing the student with positive feedback.

The central microcontroller unit 20 preferably includes a recording function for recording relevant burping-request episode data for later review by the program administrator. The specific information recorded and reported by the central microcontroller unit 20 can range from the relatively simple to the complex. For example, the central microcontroller unit 20 can be programmed to simply record and report the total duration of all burping-request episodes. Alternatively, the central microcontroller unit 20 can record and report the total number of burping-request episodes which occurred during an assignment period and the duration of each individual burping-request episode. A nonexhaustive list of options for recording and reporting relevant burping-request episode data is set forth in Table Twenty Three, provided below.

TABLE TWENTY THREE (OPTIONS FOR RECORDING AND REPORTING BURPING-REQUEST EPISODE DATA)

| OPTION | DESCRIPTION | DATA RECORDED | SAMPLE REPORT |
|---|---|---|---|
| 1 | Records and reports total duration of all burping-request episodes occurring throughout an assignment period. | Minutes | 45 |
| 2 | Records and reports total number of burping-request episodes and number of burping-request episodes lasting longer than a given grace period (e.g., two minutes). | #/# | 5:5 |
| 3 | Records and reports number of burping-request episodes and total duration of all burping-request episodes occurring throughout an assignment period. | #/Minutes | 5:45 |
| 4 | Records and reports number of burping-request episodes, total duration of all burping-request episodes, and mean duration of the burping-request episodes occurring throughout an assignment period. | #/Minutes Minutes | 5:45 03 |
| 5 | Records and reports duration of each individual burping-request episode occurring throughout an assignment period. | #/Minutes | 1: 03 2: 18 3: 20 4: 02 5: 02 |
| 6 | Records and reports number of burping-request episodes, total duration of all burping-request episodes, and individual duration of each burping-request episode occurring throughout an assignment period. | #/Minutes Minutes | 5: 45 03:18:20:02:02 |

The central microcontroller unit 20 can be programmed to generate the perceptible burping-request signal $S_7$ only at the beginning of a burping-request period (i.e., generate a ten second signal when a burping-request period is initiated by the central microcontroller unit 20), periodically throughout a burping-request period (e.g., generate a two second signal every minute once a burping-request period is initiated by the central microcontroller unit 20), or continuously throughout a burping-request period.

The burping-request signal $S_7$ may be intensified, in accordance with the ancillary feature of providing an escalating demand signal 240, based upon an increase in the duration of the burping-request episode. An example is set forth in Table Twenty Four, provided below.

TABLE TWENTY FOUR (ESCALATING BURPING-REQUEST SIGNAL)

| STRENGTH OF PERCEPTIBLE SIGNAL (AUDIBLE) | BURPING-REQUEST EPISODE DURATION (MINUTES) |
|---|---|
| $1^{st}$ Intensity (soft cry) | <01 |
| $2^{nd}$ Intensity (loud cry) | >01 |

The burping module 170 may optionally communicate with a sound recorder 360 for initiating operation of the sound recorder 360 upon commencement of a burping-request event, thereby recording any verbal comments or statements made near the infant simulator 05 for a defined time period (e.g., 3–5 minutes) after the burping-request signal $S_7$ has been generated.

Fussy Event

For purposes of emulating the actions of an actual infant, the central microcontroller unit 20 can be programmed to effect periodic fussy periods, wherein the student caring for the infant simulator 05 is signaled by the infant simulator 05, on a schedule unknown to the student, to care for the infant simulator 05, without an ability to arrest the perceptible fussy signal $S_8$ generated by the infant simulator 05. Of course, the implementation of a fussy event is only meaningful when used in combination with at least one environmental event or demand event for which a perceptible signal can be arrested by taking the appropriate action. Fussy events can be interspersed throughout the assignment period as desired for purposes of emulating those times occasionally encountered in real life, when the infant is fussing and nothing seems to satisfy the infant. The number of fussy events can be recorded and reported.

The central microcontroller unit 20 can be programmed to generate the perceptible fussy signal $S_8$ only at the beginning of a fussy period (i.e., generate a ten second signal when a fussy period is initiated by the central microcontroller unit 20), periodically throughout a fussy period (e.g., generate a two second signal every minute once a fussy period is initiated by the central microcontroller unit 20), or continuously throughout a fussy period. Preferred types of fussy signals $S_8$ include crying, whimpering, whining, coughing, fidgeting and combinations thereof.

The student should be expected to make some effort to satisfy the fussing infant simulator 05. Handling of the infant simulator 05 can be detected by the same motion sensor 70 used for purposes of sensing rocking and burping of the infant simulator 05. In the event that no effort is made to satisfy the fussing infant simulator 05, the fussy signal $S_8$ may be intensified, in accordance with the ancillary feature of providing an escalating demand signal 240, based upon a threshold time duration during which the fussy signal $S_8$ has been generated without any detectable handling. An example is set forth in Table Twenty Five, provided below.

TABLE TWENTY FIVE (ESCALATING FUSSY SIGNAL)

| STRENGTH OF PERCEPTIBLE SIGNAL (AUDIBLE) | FUSSY DURATION WITHOUT HANDLING (MINUTES) |
|---|---|
| $1^{st}$ Intensity (soft cry) | <10 |
| $2^{nd}$ Intensity (loud cry) | >10 |

The perceptible fussy signal $S_8$—normal or intensified—is not arrested once handling is detected. The receipt of an electrical "handling" signal by the central microcontroller unit 20 is effective only for preventing escalation of the perceptible fussy signal $S_8$. Hence, the central microcontroller unit 20 can be programmed to reduce the intensity of the increased perceptible fussy signal $S_8$ once handling is detected, but should not arrest the perceptible fussy signal $S_8$.

The fussy module 180 may optionally communicate with a sound recorder 360 for initiating operation of the sound recorder 360 upon commencement of a fussy period, and thereby recording any verbal comments or statements made near the infant simulator 05 during the fussy period. It is generally preferred to continue operation of the sound recorder 360 for the entire duration of a fussy period as the inability to satisfy the fussy signal $S_8$ is likely to elicit a verbal response from the student caring for the infant simulator 05.

Rest Event

The central microcontroller unit 20 can be programmed to effect periodic rest events, wherein the student caring for the infant simulator 05 is signaled by the infant simulator 05, on a schedule unknown to the student, to provide the infant simulator 05 with an environment conducive to resting and napping. Preferred types of rest-request signals $S_{13}$ include sighing, whimpering, fidgeting, blinking and closing of the eyes and combinations thereof.

The time interval between rest periods can be a bounded random variable (e.g., occurring every 20 to 360 minutes) or a predetermined variable (e.g., sequentially occurring at intervals of 20, 120, 360, 180, 90, 30, 120 and 300 minutes). In order to more accurately emulate the care requirements of an actual infant, and prevent students from memorizing the schedule of demand events, it is generally preferred to control the time interval between demand events as a bounded random variable. Alternatively, multiple predefined programs, each providing a different fixed schedule of demand events, can also be realistically employed so long as the students do not know which program has been selected (i.e., the schedule of demand events is random from the perspective of the student) and the number of programs is sufficient to prevent the students from memorizing one or two different schedules and thereafter being able to partially defeat the purpose of the program by ignoring the infant simulator 05 between scheduled demand events.

Resting can be detected by an absence of motion and/or sound above a defined threshold value. The motion sensor 70 described in connection with the rocking module 150 can be used for sensing motion in connection with the rest module 450. Similarly, the sound sensor 340 described in connection with the overstimulation module 440 can be used for sensing sounds reaching the infant simulator 05 in connection with the rest module 450. The motion sensor 70 and sound sensor 340 are electrically connected to the central microcontroller unit 20 wherein the strength of the electrical signal generated by the motion sensor 70 and sound sensor 340 can be checked against predefined threshold limitations for ignoring those which are insufficient to disturb a resting infant (e.g., rocking of a moving car or the sound of a television playing in the other room). However, when motion and/or sound exceeding the threshold value (hereinafter "rest disturbing event") is experienced by the infant simulator 05 during a rest period, an electrical signal is sent to the central microcontroller unit 20 and the rest-request signal $S_{13}$ is initiated. Timing of the rest-request episode is also commenced.

The central microcontroller unit 20 initiates a rest-request event by initiating generation of a perceptible rest-request signal $S_{13}$. In order to arrest the rest-request signal $S_{13}$, the student must place the infant simulator 05 within an environment where the infant simulator 05 will not be subjected to a rest disturbing event (e.g., a school counselor's office would generally be acceptable, while a school hallway between classes would generally be unacceptable).

The central microcontroller unit 20 can be programmed to either terminate or inhibit generation of the rest-request signal $S_{13}$ once resting (i.e., absence of rest disturbing events) is sensed. When the termination option is selected, the student need only prevent the infant simulator 05 from being exposed to a rest disturbing event for some minimum time period (e.g., two to ten seconds) sufficient to ensure that resting has been sensed, after which the student may ignore the need for rest since the rest-request signal $S_{13}$ will not begin again. When the inhibition option is selected, the student must continuously prevent the infant simulator 05 from being exposed to rest disturbing events for the duration of the rest-request period (e.g., ten to sixty minutes) to prevent the rest-request signal $S_{13}$ from being generated, with the end of a rest-request period optionally indicated by the generation of a rest-request period completion signal such as giggling. The inhibition option is generally preferred as it more closely emulates the care requirements of an actual infant.

The central microcontroller unit 20 preferably includes a recording function for recording relevant rest-request episode data for later review by the program administrator. The specific information recorded and reported by the central microcontroller unit 20 can range from the relatively simple to the complex. For example, the central microcontroller unit 20 can be programmed to simply record and report the total duration of all rest-request episodes. Alternatively, the central microcontroller unit 20 can record and report the total number of rest-request episodes which occurred during an assignment period and the duration of each individual rest-request episode. A nonexhaustive list of options for recording and reporting relevant rest-request episode data is set forth in Table Twenty Six, provided below.

TABLE TWENTY SIX (OPTIONS FOR RECORDING AND REPORTING REST-REQUEST EPISODE DATA)

| OPTION | DESCRIPTION | DATA RECORDED | SAMPLE REPORT |
|---|---|---|---|
| 1 | Records and reports total duration of all rest-request episodes occurring throughout an assignment period. | Minutes | 45 |
| 2 | Records and reports total number of rest-request episodes and number of rest-request episodes lasting longer than a given grace period (e.g., two minutes). | #/# | 5:5 |
| 3 | Records and reports number of rest-request episodes and total duration of all rest-request episodes occurring throughout an assignment period. | #/Minutes | 5:45 |
| 4 | Records and reports number of rest-request episodes, total duration of all rest-request episodes, and mean duration of the rest-request episodes occurring throughout an assignment period. | #/Minutes Minutes | 5:45 03 |
| 5 | Records and reports duration of each individual rest-request episode occurring throughout an assignment period. | #/Minutes | 1: 03<br>2: 18<br>3: 20<br>4: 02<br>5: 02 |
| 6 | Records and reports number of rest-request episodes, total duration of all rest-request episodes, and individual duration of each rest-request episode occurring throughout an assignment period. | #/Minutes Minutes | 5: 45 03:18:20:02:02 |

The central microcontroller unit 20 can be programmed to generate the perceptible rest-request signal $S_{13}$ only at the beginning of a rest-request period (i.e., generate a ten second signal when a rest-request period is initiated by the central microcontroller unit 20), periodically throughout a rest-request period (e.g., generate a two second signal every minute once a rest-request period is initiated by the central microcontroller unit 20), or continuously throughout a rest-request period.

The rest-request signal $S_{13}$ may be intensified, in accordance with the ancillary feature of providing an escalating demand signal 240, based upon an increase in the duration of the rest-request episode. An example is set forth in Table Twenty Seven, provided below.

TABLE TWENTY SEVEN (ESCALATING REST-REQUEST SIGNAL)

| STRENGTH OF PERCEPTIBLE SIGNAL (AUDIBLE) | REST-REQUEST EPISODE DURATION (MINUTES) |
|---|---|
| 1st Intensity (soft cry) | <01 |
| 2nd Intensity (loud cry) | >01 |

The rest module 450 may optionally communicate with a sound recorder 360 for initiating operation of the sound recorder 360 upon commencement of a rest-request period, and thereby recording any verbal comments or statements made near the infant simulator 05 for a defined time period (e.g., 3–5 minutes) after the rest-request signal $S_{13}$ has been generated.

Rocking Event

The central microcontroller unit 20 can be programmed to effect periodic rocking-request events, wherein the student caring for the infant simulator 05 is signaled by the infant simulator 05, on a schedule unknown to the student, to provide the infant simulator 05 with attentive care in the form of rocking. Preferred types of rocking-request signals $S_5$ include crying, whimpering, fidgeting and combinations thereof.

The time interval between rocking-request periods can be a bounded random variable (e.g., occurring every 30 to 120 minutes) or a predetermined variable (e.g., sequentially occurring at intervals of 30, 90, 30, 30, 120, 60, 20 and 90 minutes). In order to more accurately emulate the care requirements of an actual infant, and prevent students from memorizing the schedule of demand events, it is generally preferred to control the time interval between demand events as a bounded random variable. Alternatively, multiple pre-defined programs, each providing a different fixed schedule of demand events, can also be realistically employed so long as the students do not know which program has been selected (i.e., the schedule of demand events is random from the perspective of the student) and the number of programs is sufficient to prevent the students from memorizing one or two different schedules and thereafter being able to partially defeat the purpose of the program by ignoring the infant simulator 05 between scheduled demand events.

Referring to FIG. 3, the infant simulator 05 can include a motion sensor 70 within the torso 12 of the mannequin 10 effective for sensing rocking of the infant simulator 05. A number of different types and styles of motion sensors 70 may be effectively used. Suitable motion sensors include motion sensors 70 and 70' described in connection with the impact physical abuse sensing system.

The motion sensor 70 is electrically connected to the central microcontroller unit 20 wherein the strength of the electrical signal generated by the motion sensor 70 can be checked against predefined threshold limitations for producing different signals. This permits the single motion sensor 70 to differentiate between a modest force, such as produced by normal handling, rocking and burping of the infant simulator 05, and excessive force, such as experienced when the infant simulator 05 is thrown, shaken or otherwise abused. When motion of the appropriate amplitude is sensed, an electrical satisfaction signal is sent to the central microcontroller unit 20 and the rocking-request signal $S_5$ is arrested. Timing of the rocking-request episode is also terminated.

The central microcontroller unit 20 initiates a rocking-request event by initiating generation of a perceptible rocking-request signal $S_5$. In order to arrest the rocking-request signal $S_5$, the student must rock the infant simulator 05 with sufficient force to generate an appropriate electrical signal in the motion sensor 70 (i.e., sufficient to signal "rocking" but insufficient to signal "abuse").

The central microcontroller unit 20 can be programmed to either terminate or inhibit generation of the rocking-request signal $S_5$ once rocking is sensed. When the termination option is selected, the student need only rock the infant simulator 05 for some minimum time period (e.g., two to ten seconds) sufficient to ensure that rocking has been sensed, after which the student may stop rocking the infant simulator 05 and the rocking-request signal $S_5$ will not begin again. When the inhibition option is selected, the student must continuously rock the infant simulator 05 throughout the rocking-request period (e.g., five to twenty minutes) to prevent the rocking-request signal $S_5$ from being generated, with the end of a rocking-request period optionally indicated by the generation of a rocking-request period completion signal such as the playing of a lullaby tune. The inhibition option is generally preferred as it more closely emulates the care requirements of an actual infant.

The central microcontroller unit 20 preferably includes a recording function for recording relevant rocking-request episode data for later review by the program administrator. The specific information recorded and reported by the central microcontroller unit 20 can range from the relatively simple to the complex. For example, the central microcontroller unit 20 can be programmed to simply record and report the total duration of all rocking-request episodes. Alternatively, the central microcontroller unit 20 can record and report the total number of rocking-request episodes which occurred during an assignment period and the duration of each individual rocking-request episode. A nonexhaustive list of options for recording and reporting relevant rocking-request episode data is set forth in Table Twenty Eight, provided below.

TABLE TWENTY EIGHT (OPTIONS FOR RECORDING AND REPORTING ROCKING-REQUEST EPISODE DATA)

| OPTION | DESCRIPTION | DATA RECORDED | SAMPLE REPORT |
|---|---|---|---|
| 1 | Records and reports total duration of all rocking-request episodes occurring throughout an assignment period. | Minutes | 45 |
| 2 | Records and reports total number of rocking-request episodes and number of rocking-request episodes lasting longer than a given grace period (e.g., two minutes). | #/# | 5:5 |
| 3 | Records and reports number of rocking-request episodes and total duration of all | #/Minutes | 5:45 |

TABLE TWENTY EIGHT-continued (OPTIONS FOR RECORDING AND REPORTING ROCKING-REQUEST EPISODE DATA)

| OPTION | DESCRIPTION | DATA RECORDED | SAMPLE REPORT |
|---|---|---|---|
| | rocking-request episodes occurring throughout an assignment period. | | |
| 4 | Records and reports number of rocking-request episodes, total duration of all rocking-request episodes, and mean duration of the rocking-request episodes occurring throughout an assignment period. | #/Minutes Minutes | 5:45 03 |
| 5 | Records and reports duration of each individual rocking-requested episode occurring throughout an assignment period. | #/Minutes | 1: 03 2: 18 3: 20 4: 02 5: 02 |
| 6 | Records and reports number of rocking-request episodes, total duration of all rocking-request episodes, and individual duration of each rocking-request episode occurring throughout an assignment period. | #/Minutes Minutes | 5: 45 03:18:20:02:02 |

The central microcontroller unit 20 can be programmed to generate the perceptible rocking-request signal $S_5$ only at the beginning of a rocking-request period (i.e., generate a ten second signal when a rocking-request period is initiated by the central microcontroller unit 20), periodically throughout a rocking-request period (e.g., generate a two second signal every minute once a rocking-request period is initiated by the central microcontroller unit 20), or continuously throughout a rocking-request period.

The rocking-request signal $S_5$ may be intensified, in accordance with the ancillary feature of providing an escalating demand signal 240, based upon an increase in the duration of the rocking-request episode. An example is set forth in Table Twenty Nine, provided below.

TABLE TWENTY NINE (ESCALATING ROCKING-REQUEST SIGNAL)

| STRENGTH OF PERCEPTIBLE SIGNAL (AUDIBLE) | ROCKING-REQUEST EPISODE DURATION (MINUTES) |
|---|---|
| 1st Intensity (soft cry) | <02 |
| 2nd Intensity (loud cry) | >02 |

The rocking module 150 may optionally communicate with a sound recorder 360 for initiating operation of the sound recorder 360 upon commencement of a rocking-request event, thereby recording any verbal comments or statements made near the infant simulator 05 for a defined time period (e.g., 3–5 minutes) after the rocking-request signal $S_5$ has been generated.

Ancillary Features
Multiple Behavior Modes
  Selectable Changes
  Age Appropriate Behavior Modes The central microcontroller unit 20 may be programmed to allow a program administrator to select between several programs which emulate the different care requirements of differently aged infants.

These different levels of care can be produced by altering or adjusting one or more of the various modules, features and/or functions of the program. The levels of care can be increased and/or decreased through any number of continuous or stepped age levels as desired. A convenient program allows the care requirements to be set at one of three levels, representative of a newborn infant, a three month old infant and a six month old infant. A representative example of the types of adjustments to the various modules, features and functions effective for emulating differently aged infants is set forth in Table Thirty below.

TABLE THIRTY (AGE APPROPRIATE SETTINGS)

| FEATURE | NEWBORN | 3 MONTHS | 6 MONTHS |
|---|---|---|---|
| ENVIRONMENTAL EVENTS | | | |
| Sensitivity to Sounds | High Sensitivity | Moderate Sensitivity | Low Sensitivity |
| Tendency to Become Over Stimulated | High (>20 min activity) | Moderate (>30 min activity) | Low (>50 min activity) |
| Sensitivity to Smoke | High Sensitivity | Moderate Sensitivity | Low Sensitivity |
| Sensitivity to Light | High Sensitivity | Moderate Sensitivity | Low Sensitivity |
| Rest Period Requirements | Many (5–8/day) | Moderate (3–5/day) | Few (1–2/day) |
| Acceptable Temperature Range | Small (20–30° C.) | Moderate (18–32° C.) | Large (15–35° C.) |
| DEMAND EVENTS | | | |
| Demand Event Intervals | Short (20–90 min) | Moderate (30–120 min) | Long (30–180 min) |
| Demand Period Duration | Short (05–30 min) | Moderate (10–40 min) | Long (10–60 min) |
| Occurrence of Fussy Periods | Limited (0–2/day) | Moderate (2–3/day) | Frequent (3–4/day) |
| ANCILLARY FEATURES | | | |
| Type and Occurrence of Content Signal | Limited Coos (3–5/day) | Moderate Coos and Gurgles (5–8/day) | Frequent Coos, Gurgles, Smiles, etc. (8–10/day) |
| Delay to Reach Escalated Demand Signal | Extended Period (10–15 min) | Moderate Period (5–10 min) | Short Period (2–5 min) |
| Type and Intensity of Demand/Distress Signal | Soft Cry | Cry | Scream |
| Occurrence of Self-Directed Expressions | None | Few (2–3) | Many (5–10) |

The age selected by the program administrator can be recorded and reported.

Feeding Method Behavior Modes

The central microcontroller unit 20 can be programmed to allow a program administrator to select between a breast feeding option and a bottle feeding option for purposes of emulating the different care requirements of such differently fed infants. The different care requirements can be generally be emulated by providing a greater frequency of feeding and diaper change periods for the breast fed option, while providing for longer feeding and diaper change periods for the bottle fed option.

In addition, the breast fed program could require that feeding occur in a private location (e.g., the feeding-request satisfaction signal $St_6$ will not arrest the feeding-request signal $S_6$ when excessive noise levels are detected by the sound sensor 340), while the bottle fed program could require morning and/or evening attendance periods (i.e., generation of a bottle-preparation demand signal $S_{BOTTLE}$ requiring the student to provide a bottle-preparation satisfaction signal $S_{BOTTLE}$), and a requirement that the student carry a facsimile of a bottle(s) with them as the only means for providing the feeding-request satisfaction signal $St_6$ to the infant simulator 05.

The selected feeding option can be recorded and reported.

Disposition of Infant

The central microcontroller unit 20 may be programmed to allow the program administrator to change the level of care required by the infant simulator 05 to reflect infants having different dispositions Alternatively, selection of the level can be randomly selected by the central microcontroller unit 20 for each assignment period. These different levels of care can be produced by altering (i) the time interval between demand events (i.e., increase or decrease the number of demand events occurring within an assignment period), (ii) altering the duration of each demand period (i.e., increase or decrease the length of each period), and/or (iii) the threshold values beyond which an environmental event is commenced (e.g., decreasing the acceptable temperature range). The levels of care can be increased and/or decreased through any number of continuous or stepped levels as desired. A convenient program permits the care level to be selected from amongst an easy level (i.e., long intervals, short demand periods and high threshold values), an average level (i.e., modestly long intervals, alternating long and short demand periods and modest threshold values), and a difficult level (e.g., short intervals, long demand periods and low threshold values).

The disposition of the infant simulator 05 set by the program administrator can be recorded and reported.

Automatic Changes

Daytime/Night Time Feature

Infants tend to have different care requirements during the daytime (e.g., between the hours of about 8:00 a.m. and 8:00 p.m., more preferably between the hours of about 9:00 a.m. and 6:00 p.m.). and the night time (e.g., between the hours of about 8:00 p.m. and 8:00 a.m., more preferably between the hours of about 10:00 p.m. and 6:00 a.m.). As a general matter, night time care requirements are less than daytime requirements, with longer intervals between demand events and shorter demand periods during the night time hours, but an increased sensitivity to environmental conditions such as sound and light.

In order to emulate the different care requirements of an infant during daytime and night time hours, the infant simulator 05 can be equipped with an internal clock (not shown) set to the actual time of day, and programmed to decrease the care requirements of the infant simulator 05 during the night time hours (stated alternatively, programmed to increase the care requirements of the infant simulator 05 during the daytime hours) by decreasing the duration of demand periods, increasing the time intervals between demand events and/or lowering the threshold value for commencement of a loud sound exposure event, during the night time hours.(alternatively, increasing the duration of demand periods, decreasing the time intervals between demand events and/or expanding the threshold value for commencement of a loud sound exposure event, during the daytime hours).

A perceptible daytime and/or night time period signal $S_{DAY}$ is optionally generated at the appropriate time so as to notify the student that the infant simulator 05 is on a daytime or night time schedule. The central microcontroller unit 20 can be programmed to generate the perceptible daytime and/or night time period signal $S_{DAY}$ only at the beginning of the appropriate period (i.e., generate a ten second sucking sound when the infant simulator is beginning a daytime schedule and/or generate a ten second yawning sound when the infant simulator is beginning a night time schedule), or continuously throughout the corresponding daytime and/or night time period (e.g., an image of a crib is illuminated for the duration of the night time period).

The extent to which the duration of the demand periods are decreased, the time interval between demand events is increased and/or the sensitivity to sounds is increased during the night time hours can individually be a bounded random variable (e.g., 50% to 200%) or a predetermined variable (e.g., 100%).

Daytime hours should include at least the core hours of 10:00 a.m. to 4:00 p.m. Night time hours should include at least the core hours of 12:00 p.m. to 4:00 a.m. The specific time at which the infant simulator transitions from one schedule to the other is not critical, so long as the core hours fall within the appropriate period. The transition from a daytime to a night time schedule preferably occurs between hours of 8:00 p.m. and 10:00 p.m., while the transition from a night time to a daytime schedule preferably occurs between the hours of 6:00 a.m. and 8:00 a.m.

Activation of this feature can be recorded and reported.

Disposition Based Upon Level of Care Provided by Student

The central microcontroller unit 20 may be programmed to increase the level of care required by the infant simulator 05 (i.e., change the disposition of the infant) for a defined time period (e.g., about 1 to 12 hours) based upon the level of care provided by the student during an assignment period. For example, failure to provide a satisfaction signal within two minutes for three consecutive demand events, failure to respond to a single demand signal within a demand period, or subjecting the simulator to physical abuse, causes the infant simulator to increase the level of care required from easy to average for four hours.

Any increases in the level of care initiated by this feature can be recorded and reported.

Sick Period

The central microcontroller unit 20 can be programmed to effect a sick period, wherein the care requirements of the infant simulator 05 are increased by (i) increasing the duration of the demand periods occurring within the sick period, (ii) decreasing the time interval between demand events occurring within the sick period, and/or (iii) adjusting the threshold values beyond which an environmental event is commenced (e.g., decreasing the acceptable temperature range).

The commencement of a sick period can be signaled by the infant simulator 05 by generation of a perceptible sick signal $S_{14}$, such as the lighting of an image representative of illness (e.g., an Rx symbol), whimpering, fidgeting, etc.

The time interval between sick periods can be a bounded random variable (e.g., occurring every 8 to 72 hours) or a predetermined variable (e.g., sequentially occurring at intervals of 10, 36, 24, 48 and 72 hours). In order to more accurately emulate the care requirements of an actual infant, and prevent students from memorizing the schedule of demand events, it is generally preferred to control the time interval between sick periods as a bounded random variable. Alternatively, multiple predefined programs, each providing a different fixed schedule of sick periods, can also be realistically employed so long as the students do not know which program has been selected (i.e., the schedule of sick periods is random from the perspective of the student) and the number of programs is sufficient to prevent the students from memorizing one or two different schedules and thereafter being able to partially defeat the purpose of the program.

A perceptible sick period signal $S_{14}$ is optionally generated upon commencement of a sick period so as to notify the student that the infant simulator 05 is ill and will require increased care. The central microcontroller unit 20 can be programmed to generate the perceptible sick period signal $S_{14}$ only at the beginning of a sick period (i.e., generate a ten second coughing fit when a sick period is initiated by the central microcontroller unit 20), periodically throughout a sick period (e.g., generate a two second cough every ten minutes once a sick period is initiated by the central microcontroller unit 20), or continuously throughout a sick period (e.g., an Rx image is illuminated for the duration of the sick period). The end of a sick period can optionally be indicated by the generation of a wellness signal such as prolonged giggling.

The central microcontroller unit 20 can include a recording function for recording the occurrence of a sick period for informing the program administrator that the student was required to care for a sick infant during the assignment period. The specific information recorded and reported by the central microcontroller unit 20 can range from simply recording and reporting that at least one sick period occurred during the assignment period, to recording and reporting the total duration of all sick periods occurring during the assignment period. A nonexhaustive list of options for recording and reporting relevant sick period data is set forth in Table Thirty One, provided below.

TABLE THIRTY ONE (OPTIONS FOR RECORDING AND REPORTING SICK PERIOD DATA)

| OPTION | DESCRIPTION | DATA RECORDED | SAMPLE REPORT |
|---|---|---|---|
| 1 | Records and reports that at least one sick period occurred within an assignment period. | Yes/No | Yes |
| 2 | Records and reports total duration of all sick periods occurring throughout an assignment period. | Minutes | 45 |
| 3 | Records and reports number of sick periods and total duration of all sick periods occurring throughout an assignment period. | #/Minutes | 2:45 |
| 4 | Records and reports number of sick periods and total duration of all sick periods occurring throughout an assignment period, and mean duration of the sick periods occurring throughout an assignment period. | #/Minutes Minutes | 2:45 22 1/2 |
| 5 | Records and reports duration of each individual sick period occurring throughout an assignment period. | #/Minutes | 1:35 2:10 |
| 6 | Records and reports number of sick periods, total duration of all sick periods occurring throughout an assignment period, and individual duration of each sick period occurring throughout an assignment period. | #/Minutes Minutes | 2:45 35, 10 |

The extent to which the duration of the demand period is increased, the time interval between demand events is decreased and/or the sensitivity to environmental conditions is increased within a sick period can individually be a bounded random variable (e.g., 50% to 200%) or a predetermined variable (e.g., 100%), with each sick period having the same or different percentage changes.

The number and/or duration of any sick periods occurring during an assignment period can be recorded and reported.

Comatose State 280

The microcontroller unit 20 may be programmed to cause the infant simulator 05 to enter into a comatose state in the event that a threshold limit of abuse or neglect is reached (e.g., the infant simulator 05 is subjected to physical abuse lasting longer than 10 seconds, the temperature of the infant simulator 05 is more than 20° C. greater than the maximum allowable temperature for more than 20 minutes, the infant simulator 05 experiences a compression of greater than 250 N, multiple demand events are never satisfied during the demand period. etc.). A comatose state can be simulated in a variety of ways. A preferred method of simulating entry into a comatose state is for the central microcontroller unit 20 to cease all other interactive functions (e.g., thermal exposure events are no longer recorded, diaper-change signals $S_4$ are no longer generated, etc.), and generate a comatose signal $S_{11}$ capable of being satisfied by entry of a password or insertion of a medical care key possessed only by a designated medical representative such as the program administrator), with a failure to obtain the necessary medical care within a defined time (e.g., a medical attention-request period of 30 minutes) resulting in death of the infant simulator 05 (i.e., recording and reporting death of the infant simulator 05 and ending the program).

Entry into a comatose state can be recorded and reported.

Contented Signal

The microcontroller unit 20 may be programmed to provide a positive response + when the student has appropriately responded to a demand signal, (e.g., timely changing a diaper 60 in response to a diaper-change signal $S_4$). The positive response + can be substantially any perceptible signal recognizable as signaling a happy or contented infant, including specifically, but not exclusively audible signals (e.g., cooing or giggling), olfactory signals (e.g., emission of pleasant scent), visual signals (e.g., smiling, or wiggling of the feet), and multimedia signals (e.g., cooing and smiling).

The positive response + can be scheduled to occur immediately upon providing the requested care (e.g., after changing a diaper 60 in response to a diaper-change signal $S_4$ or at the end of a satisfied burping period) or after a defined time delay (e.g., two minutes after changing a diaper 60 in response to a diaper-change signal $S_4$ or between 20 seconds and 2 minutes after a satisfied burping period has ended).

The microcontroller unit 20 may be programmed to provide the positive response + upon the satisfaction of each and every demand event, only upon the satisfaction of selected demand events, or on some other schedule (e.g., only after every other satisfied demand event, only after satisfied burping and diaper-change events, or a 20% chance of occurring after each satisfied demand event). The microcontroller unit 20 may also be programmed to provide the positive response + only upon the prompt satisfaction of a demand event (e.g., satisfaction signal provided within two minutes of initiation of demand signal).

A positive response + should not be provided in connection with an environmental event (i.e., thermal exposure signal $S_2$ or distress signal $S_3$) since satisfaction of such signals is based upon removal of an unpleasant stimuli rather than the comforting satisfaction of a need.

The number of contented signals generated by the infant simulator 05 can be recorded and reported.

Perceptibly Different Signals

The infant simulator 05 can provide a perceptible signal for each of a number of different things, selected from (i) an unacceptable environmental condition of abusive compression, impact, improper position, loud sounds, overstimulation, smoke, direct sunlight and temperature extremes, and (ii) the demand events of diaper-change, feeding, burping, fussing, resting and rocking. The perceptible signal generated for each of these things can be the same or different. For example, the perceptible signal generated when the infant simulator 05 is unacceptably positioned can be a loud cry, while the perceptible signal generated for requesting to be fed can be a whimper. The differences can be significant (e.g., whimpering versus screaming), or subtle (e.g., loud whimpering versus soft crying).

The use of different perceptible signals for different environmental and demand events serves the desired effect of awarding attentive students by informing such students of the specific satisfaction signal required (e.g., a soft cry signals a need to be rocked while whimpering signals a need to change the diaper 60). In order to prevent the students from memorizing and sharing such information, the infant simulator 05 can optionally be equipped with an ability for the program administrator to change the specific perceptible signal to be generated for each event at the beginning of each assignment period.

Grace Period

The infant simulator 05 can be programmed to provide a grace period (e.g., about 1 to 3 minutes, preferably 2 minutes) after the initiation of a demand signal, within which the student can provide the appropriate satisfaction signal and the duration of the demand episode is recorded as zero. The recorded and reported duration of those demand episodes having a duration longer than the grace period can include or exclude the grace period as desired, with the program administrator advised as to the option selected so that they may accurately interpret the recorded and reported data and provide appropriate feedback to the student.

In a preferred embodiment, the infant simulator 05 provides the student with a positive signal + whenever the student has responded to the demand signal within the grace period, thereby immediately advising the student that they have provided prompt care and the report provided to the program administrator at the end of the assignment period will reflect that the duration of the demand episode was zero.

Identification System

In order to ensure that the student assigned to care for the infant simulator 05 is at least present when the demands of the infant simulator 05 are being satisfied (i.e., either providing the necessary care themselves or securing the necessary care from someone else at the time the demand event is commenced), the infant simulator 05 can be equipped with an identification system (not shown). The identification system (not shown) would prevent a satisfaction signal (e.g., rocking of the infant simulator 05) from arresting the demand signal (e.g., rocking-request signal $S_5$) until an identification signal $S^{ID}$ is received by the identification system (not shown).

An exemplary identification system (not shown) includes at least, (i) a means for receiving an identification signal $S^{ID}$ personal to the assigned student, and (ii) a means in communication with the identification-signal receiving means (not shown) and the central microcontroller unit 20 effective for preventing arresting of a demand signal until the identification signal $S^{ID}$ is received by the identification-signal receiving means (not shown).

The means for receiving an identification signal $S^{ID}$ personal to the assigned student can be any of a number of systems or devices capable of identifying and responding only to a unique item or characteristic possessed by the assigned student. A nonexhaustive list of such devices includes (i) a fingerprint recognition device (not shown), (ii) a voice recognition device (not shown), and (iii) a keyhole (not shown) accepting a uniquely shaped identification key 90 attachable to the wrist of the assigned student by a tamper indicating wristband 91.

Escalating Demand Signal 240

The microcontroller unit 20 may be programmed to escalate the strength, intensity and/or severity of the perceptible demand signal and distress signals generated by the infant simulator 05 as the severity of an unacceptable environmental condition increases (e.g., the temperature of the infant simulator 05 is more than 5° C. greater than a maximum allowable temperature) and/or the duration of a demand episode increases (e.g., the demand episode lasts longer than 10 minutes). The escalation can be effected in a variety of ways dependent upon the specific type of signal. For example, an audible cry can be escalated from a soft cry to a loud cry, or from a cry to a scream. Similarly, a light can be changed from a white to red.

The perceptible demand signal can be escalated through any number of continuous or stepped levels as desired. A simple single stepped escalation—normal to increased—is relatively simple to implement and generally effective for providing the student with appropriate notice that an unacceptable environmental condition or demand event is not being timely satisfied.

In a similar fashion, the microcontroller unit 20 may be programmed to de-escalate the strength, intensity and/or severity of an escalated perceptible demand signal or distress signal generated by the infant simulator 05 once the appropriate satisfaction signal has been transmitted to the infant simulator 05 for purposes of increasing the reality of the simulation (e.g., the infant simulator 05 immediately decreases an escalated perceptible demand signal from a shriek to a cry upon receipt of the appropriate satisfaction signal, and five minutes later terminates generation of the cry).

Self-Directed Expression Module 410

For purposes of emulating the actions of an actual infant and enhancing the reality of the simulation, the central microcontroller unit 20 can be programmed to effect periodic self-directed expressions $E_1$, wherein the infant simulator 05 provides the student caring for the infant simulator 05 with interesting and often delightful expressions on a schedule unknown to the student. Self-directed expressions $E_1$ can be interspersed throughout the assignment period as desired for purposes of emulating such occurrences in real life.

Preferred types of self-directed expressions $E_1$ are those of the type which are of limited duration (e.g., several seconds) and would typically be perceived by a student as not requiring any satisfaction. Such preferred expressions including specifically, but not exclusively, babbling, blinking of the eyes, giggling, gurgling, hiccuping, laughing, screaming with joy, smiling, squinting, sighing, wrinkling-up of the nose, etc.

The number of self-generated expressions generated during an assignment period can be recorded and reported.

Sound Recording

The environmental event and demand event modules can include a sound recorder 360 for recording verbal comments and statements made by a student within the proximity of the infant simulator 05.

In order to provide a recording of useful duration, the sound recorder 360 should record only when (i) a verbal reaction can be expected from the student (e.g., a three minute period after commencing generation of a demand signal, during a fussy period, or during a pernicious event), and/or (ii) loud sounds are detected (e.g., yelling, screaming or shouting).

EXAMPLE

Figure 2O:
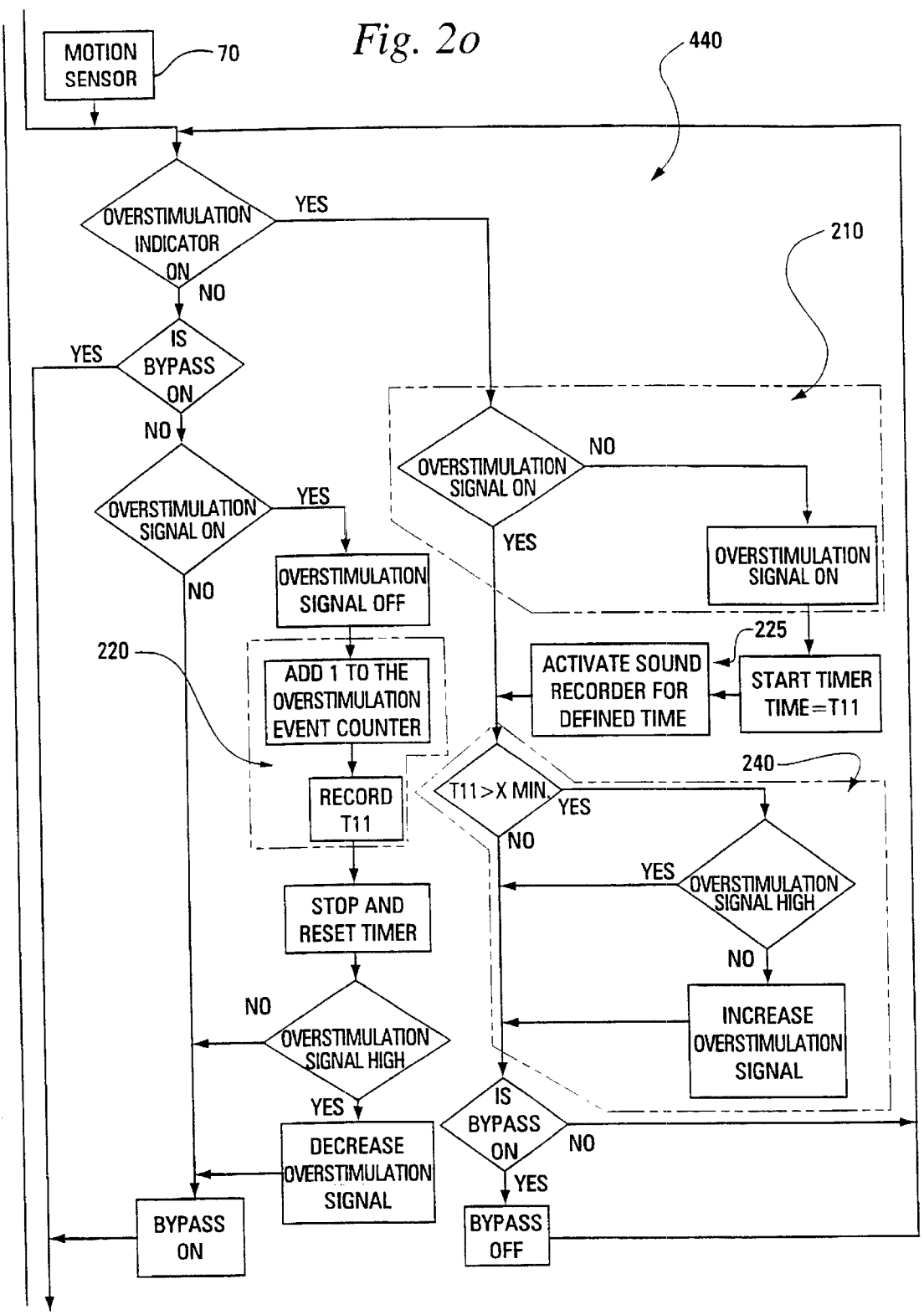
Figure 2O:
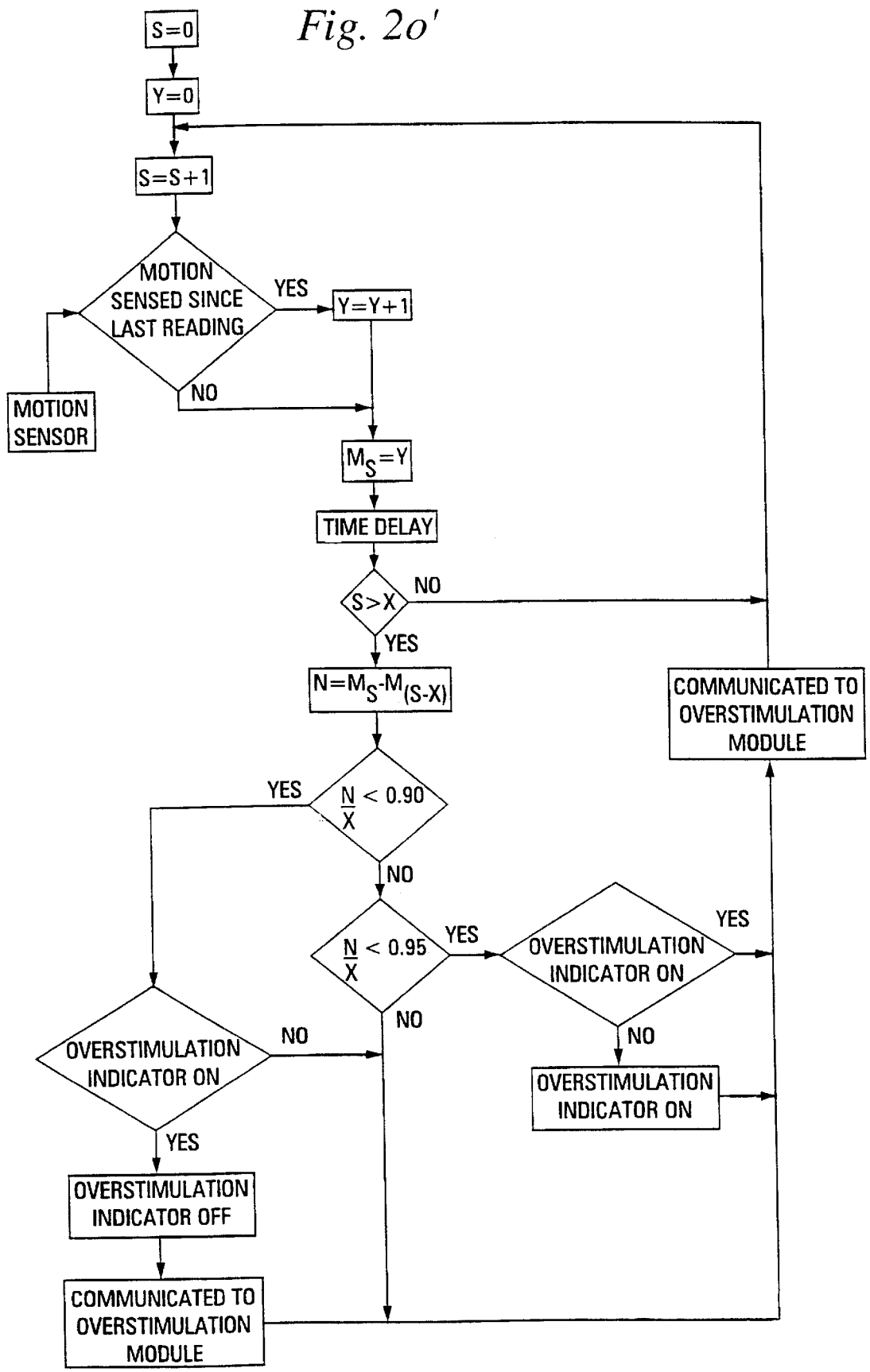
Figure 2P:
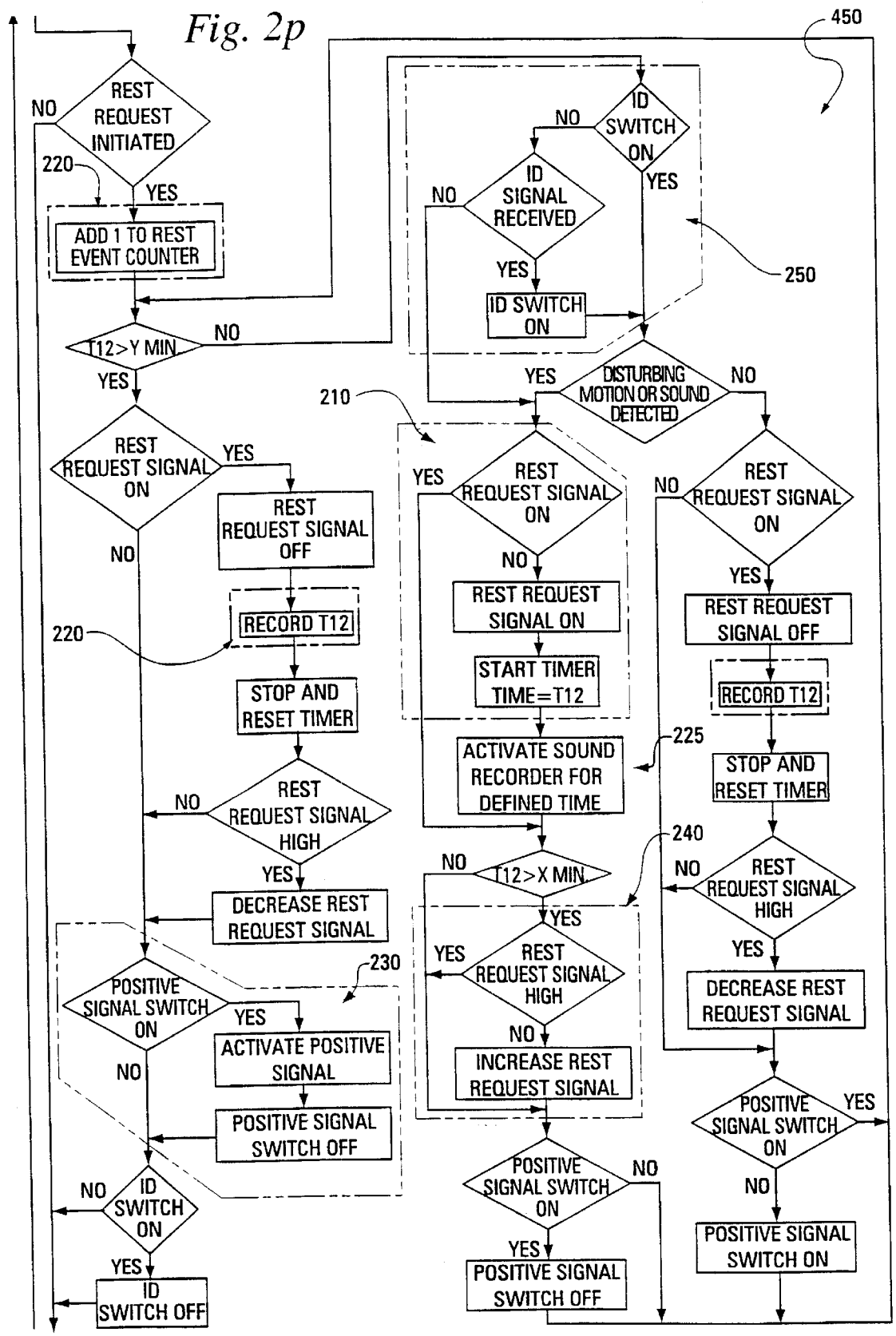
Figure 2Q:
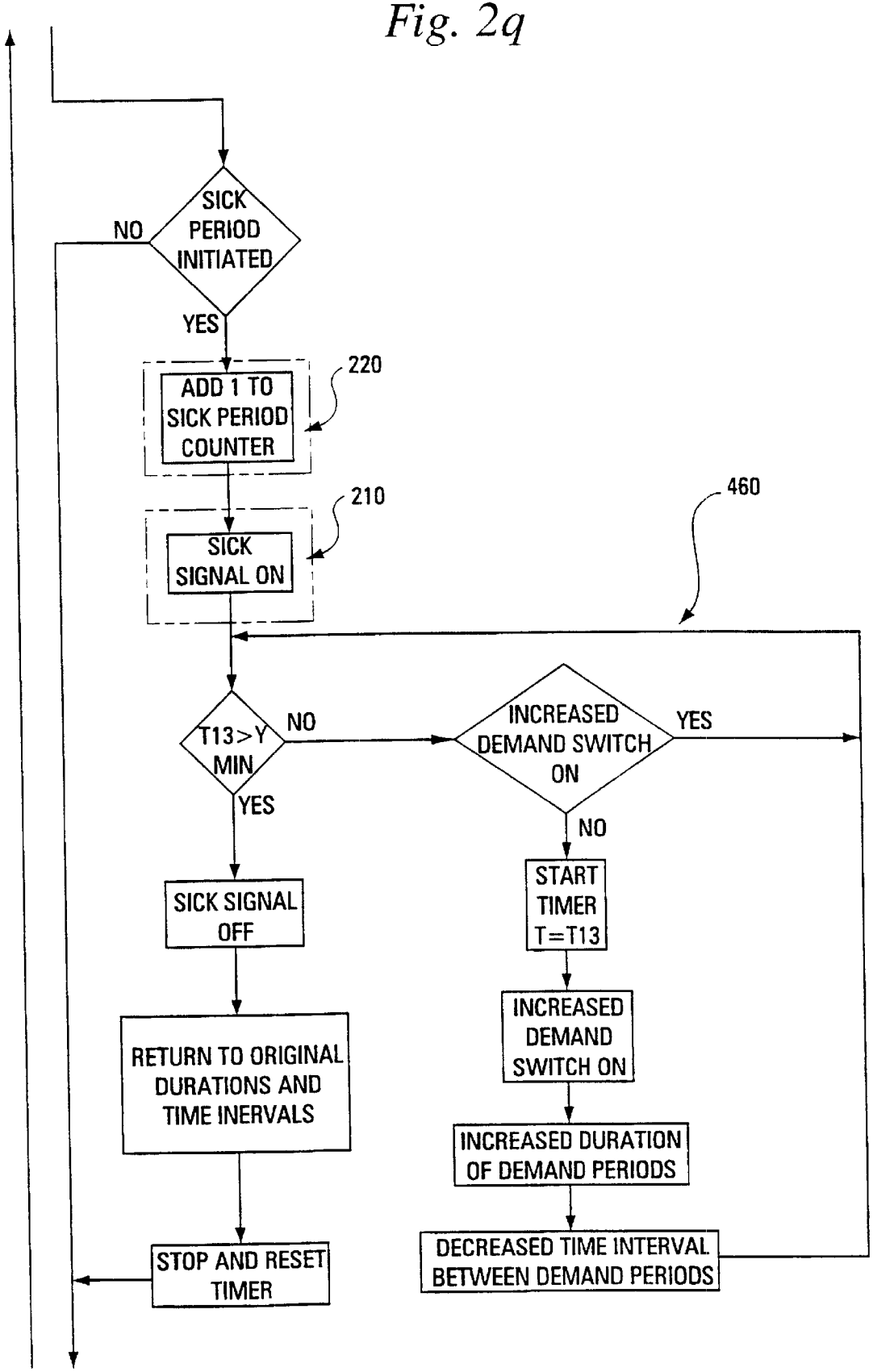
Figure 2R:
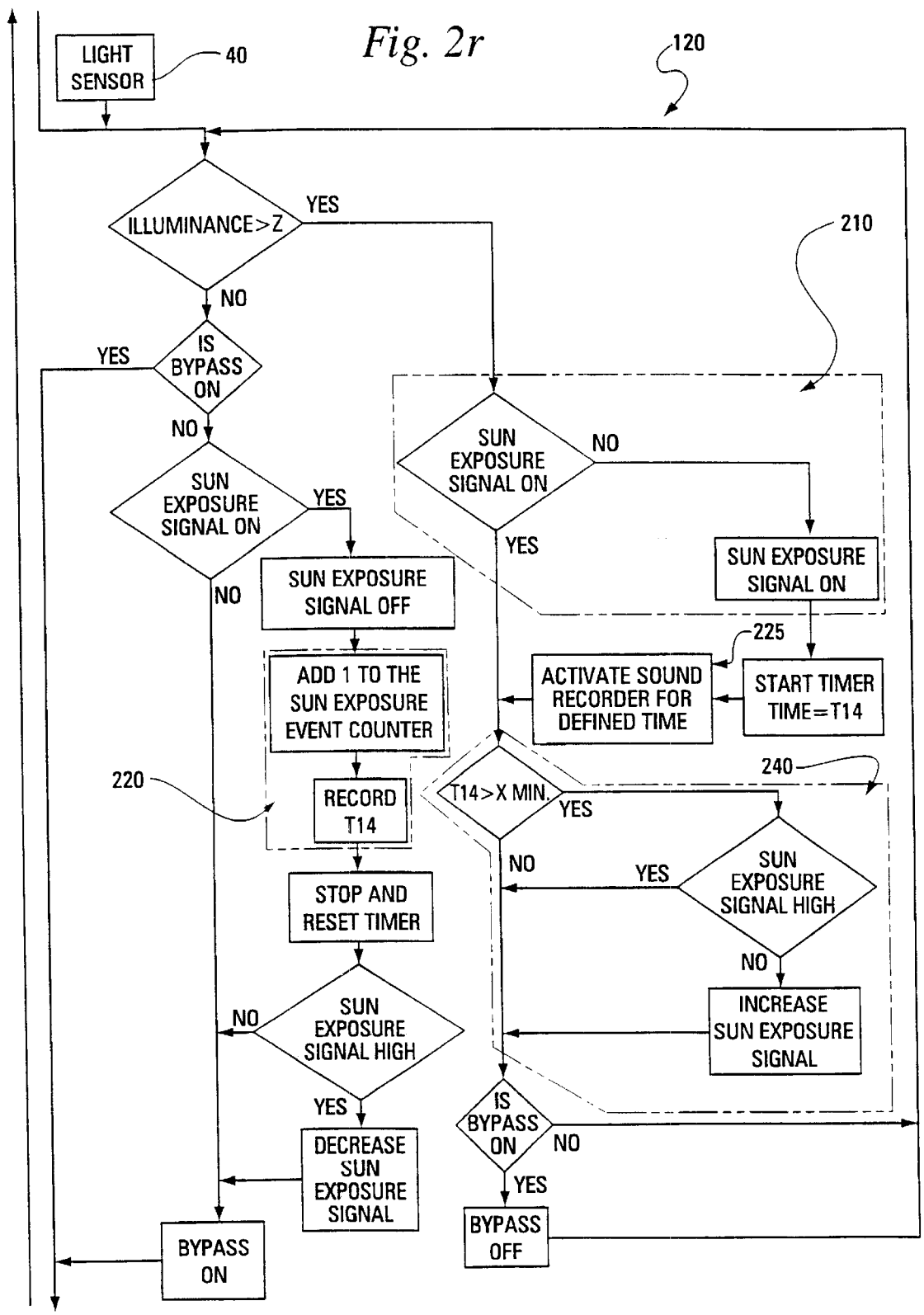
Figure 2S:
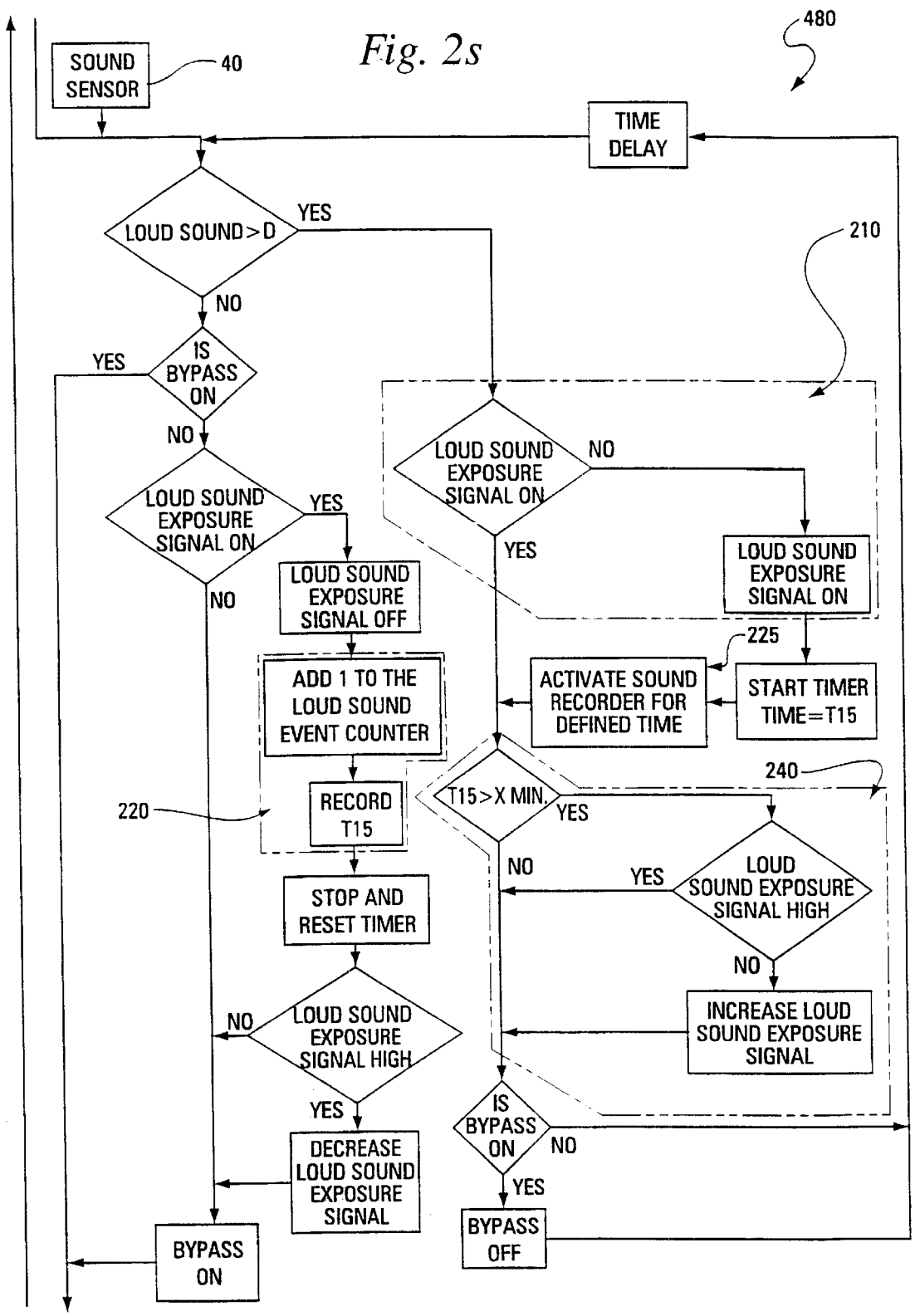
Figure 2T:
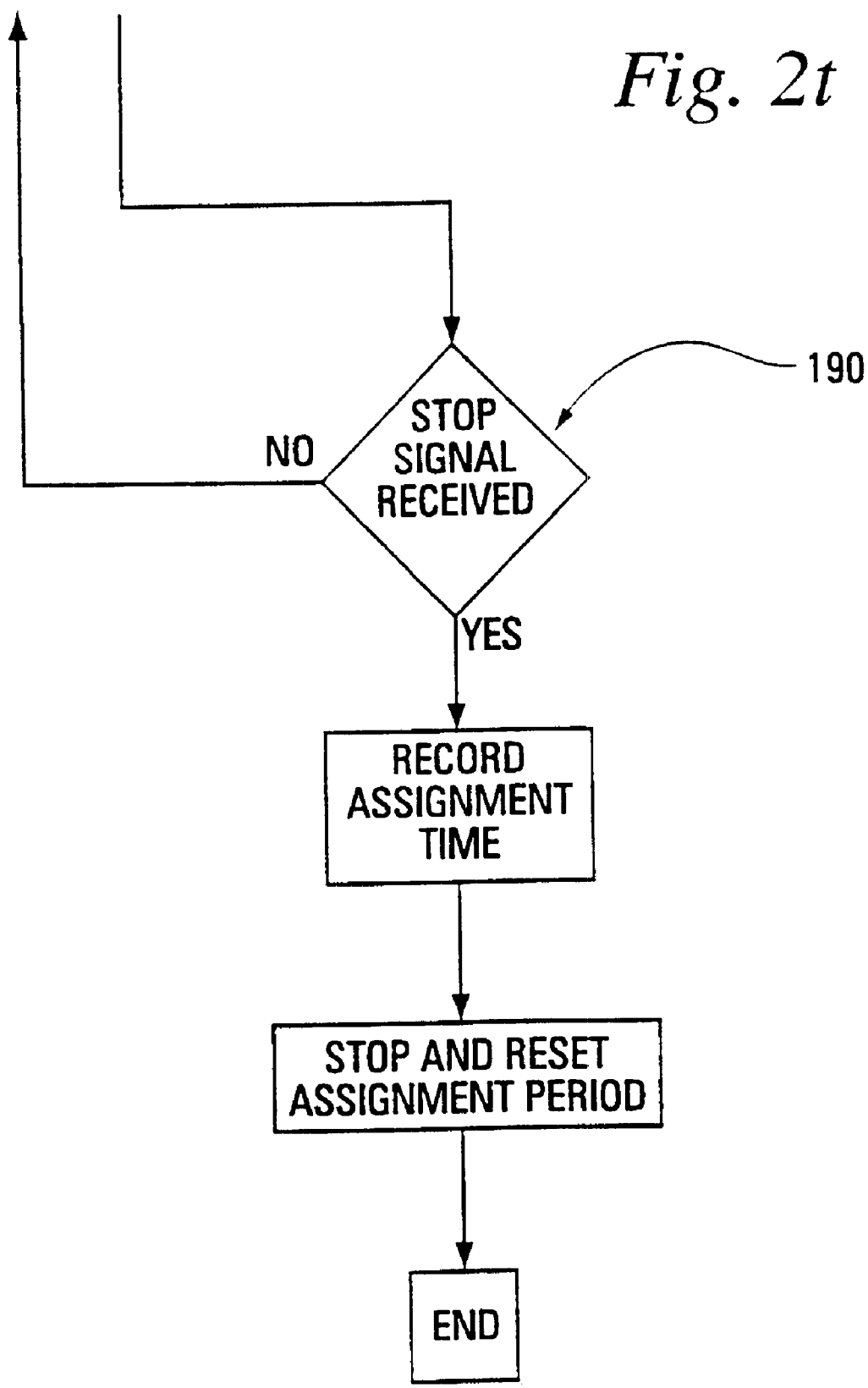

FIGS. 2a–2t (excluding a FIG. 2l and including a FIG. 2n' and 2o') provide a flowchart for one embodiment of each of the modules listed below in Table Thirty Two. Each of the modules includes both the demand signal generating feature 210 and the recording feature 220, except for the fussy module 180 and sick period module 460 which include only a demand signal generating feature 210, and the initiation 100, assignment period 190, and self-directed expression 410 modules which do not include either of these features.

The modules also include each of the ancillary features of comatose state 280, contented signal 230, identification system 250, escalating demand signal 240, and sound recording 225 as listed next to each module. The ancillary features of multiple time interval durations 260 and multiple period durations 270, used to create multiple behavior modes, and the ancillary feature of age dependent programming, feeding method dependent programming, disposition dependent programming, and daytime/night time dependent programming are not shown or depicted in the flowchart as such features are controlled by the central microcontroller unit 20 rather than the individual modules.

TABLE THIRTY TWO (LISTING OF MODULES AND ANCILLARY FEATURES)

| MODULE | REFERENCE NO. | ANCILLARY FEATURES |
|---|---|---|
| INITIATION | 100 | None |
| POSITION | 110 | 1. Escalating Demand Signal |
| TEMPERATURE | 120 | 1. Escalating Demand Signal<br>2. Sound Recording<br>3. Comatose State |
| ABUSE (COMPRESSION) | 130 | 1. Escalating Demand Signal<br>2. Sound Recording<br>3. Comatose State |
| DIAPER CHANGE | 140 | 1. Contented Signal<br>2. Identification System<br>3. Escalating Demand Signal<br>4. Sound Recording |
| ROCKING | 150 | 1. Contented Signal<br>2. Identification System<br>3. Escalating Demand Signal<br>4. Sound Recording |
| FEEDING | 160 | 1. Contented Signal<br>2. Identification System<br>3. Escalating Demand Signal<br>4. Sound Recording |
| BURP | 170 | 1. Contented Signal<br>2. Identification System<br>3. Escalating Demand Signal<br>4. Sound Recording |
| FUSSY | 180 | None |
| SELF-DIRECTED EXPRESSION | 410 | None |
| SMOKE | 420 | 1. Escalating Demand Signal<br>2. Sound Recording |
| ABUSE (IMPACT) | 430 | 1. Escalating Demand Signal<br>2. Comatose State |
| OVERSTIMULATION | 440 | 1. Escalating Demand Signal<br>2. Sound Recording |
| RESTING | 450 | 1. Contented Signal<br>2. Identification System<br>3. Escalating Demand Signal<br>4. Sound Recording |
| SICK | 460 | None |
| SUN EXPOSURE | 470 | 1. Escalating Demand Signal<br>2. Sound Recording |
| LOUD SOUND | 480 | 1. Escalating Demand Signal<br>2. Sound Recording |
| MISSING-DIAPER | 490 | 1. Sound Recording |
| ASSIGNMENT PERIOD | 190 | None |

The individual modules can occur in any sequence, with the exception of the initiation module 100 which must occur first, the assignment period module 190 which must occur last, and the burping module 170 which can occur only after satisfaction of the feeding module 160.

Initiation Module 100

Upon activating the infant simulator 05, the central microcontroller unit 20 turns the bypass signal ↪ON, begins timing the assignment period. and begins timing the intervals between successive demand events (i.e., diaper-change, rocking, feeding, fussing, and resting events) based upon the program selected and/or preprogrammed into the central microcontroller unit 20 and the selected behavior modes (i.e., age, feeding method, and disposition). Based upon the program selected, the central microcontroller unit 20 signals each of the diaper-change 140, rocking 150, feeding 160 and fussing 180 and resting 450 modules at the appropriate times to start and stop a corresponding demand event. The central microcontroller unit 20 also signals the sick infant module 460 to start and stop a sick period at the appropriate time. The central microcontroller unit 20 also commences cycling through each of the modules.

Position Module 110

The position sensor 30 detects the position of the infant simulator 05 as between an acceptable position (e.g., laying on its back or side) and an unacceptable position (e.g., laying face down or upside down) and signals the position module 110 when the infant simulator 05 is detected in an unacceptable position.

Referring to FIG. 2b, the position module 110 is bypassed so long as the infant simulator 05 is in an acceptable position. However, when the position module 110 receives a signal from the position sensor 30 that the infant simulator 05 is in an unacceptable position, the position module 110 initiates generation of the repositioning-request signal $S_1$ by means of the demand signal generating feature 210 embedded within the module 110, starts sound recorder 360 for a defined period of time (e.g., 3 to 5 minutes) in order to record any verbal reaction by the student, starts timing the length of time the repositioning-request signal $S_1$ is generated, and turns OFF the bypass signal ↪.

If the repositioning-request signal $S_1$ is generated for longer than a predetermined time x (e.g., 10 minutes), the position module 110 increases the intensity of the repositioning-request signal $S_1$ by means of the escalating demand feature 240 embedded within the module 110. The repositioning-request signal $S_1$ is generated at the increased intensity thereafter until the infant simulator 05 is returned to an acceptable position.

Once the infant simulator 05 is returned to an acceptable position, generation of the repositioning-request signal $S_1$ is turned OFF, the occurrence of a repositioning-request event is counted, the duration of time during which the infant simulator 05 was in an unacceptable position (i.e., the length of time the repositioning-request signal $S_1$ was generated) recorded by the recording feature 220, the repositioning-request period timer is stopped and reset, the intensity of the repositioning-request signal $S_1$ is checked and returned to normal if intensified, the bypass signal ↪ is turned back ON, and the position module 110 is exited.

In order to allow the microcontroller unit 20 to cycle through the other modules even though the infant simulator 05 is improperly positioned for a prolonged period of time, the central microcontroller unit 20 can be programmed to terminate generation of the repositioning-request signal $S_1$ and exit the position module 110 after a defined time period (e.g, 10–60 minutes) even though the infant simulator 05 remains improperly positioned (not shown in FIG. 2b). Timing of the duration of the improper positioning occurrence can also be terminated, or continued until the infant simulator 05 is returned to an acceptable positioning.

Temperature Module 120

The temperature sensor 40 measures the temperature of the infant simulator 05 and signals the temperature module 120 when the temperature falls outside an acceptable temperature range (i.e., less than 15° C. or greater than 35° C.).

Referring to FIG. 2c, the temperature module 120 is bypassed so long as the infant simulator 05 is kept at a temperature within the acceptable temperature range. However, when the temperature module 120 receives a signal that the infant simulator 05 is being exposed to an unacceptable temperature, the temperature module 120 initiates generation of the thermal exposure signal $S_2$ by means of the demand signal generating feature 210 embedded within the temperature module 120, starts timing the length of time the thermal exposure signal $S_2$ is generated, starts sound recorder 360 for a defined period of time (e.g., 3 to 5 minutes) in order to record any verbal reaction by the student, and turns OFF the bypass signal ↪.

If the thermal exposure signal $S_2$ is generated for longer than a predetermined time x (e.g., 10 minutes), the temperature module 120 increases the intensity of the thermal exposure signal $S_2$ by means of the escalating demand feature 240 embedded within the temperature module 120. The thermal exposure signal $S_2$ is generated at the increased intensity thereafter until the infant simulator 05 is returned to an acceptable temperature.

Once the infant simulator 05 is returned to an acceptable temperature, generation of the thermal exposure signal $S_2$ is turned OFF, the occurrence of a thermal exposure event is counted, the duration of time during which the infant simulator 05 was exposed to unacceptable temperatures (i.e., the length of time the thermal exposure signal $S_2$ was generated) is recorded by the recording feature 220, the thermal exposure period timer is stopped and reset, the intensity of the thermal exposure signal $S_2$ is checked and returned to normal if intensified, the bypass signal ↪ is turned back ON, and the temperature module 120 is exited.

In order to allow the microcontroller unit 20 to cycle through the other modules even though the infant simulator 05 is exposed to unacceptable temperatures for a prolonged period of time, the central microcontroller unit 20 can be programmed to terminate generation of the thermal exposure signal $S_2$ and exit the temperature module 120 after a defined time period (e.g., 10–60 minutes) even though the infant simulator 05 remains exposed to unacceptable temperatures (not shown in FIG. 2c). Timing of the duration of the thermal exposure can also be terminated, or continued until the infant simulator 05 is returned to an acceptable temperature.

Compression Module 130

As shown in FIG. 3, the compression sensing system 50 detects a compression of the mannequin's head 11. When compression is detected by the compression sensing system 50, the compression sensing system 50 signals the compression module 130.

Referring to FIG. 2d, the compression module 130 is bypassed so long as the head 11 of the infant simulator 05 is not being squeezed or compressed. However, when the compression module 130 receives a signal that the head 11 of the infant simulator 05 is being compressed, the compression module 130 initiates generation of the compression distress signal $S_3$ by means of the demand signal generating feature 210 embedded within the compression module 130, starts timing the length of time the distress signal $S_3$ is generated, starts sound recorder 360 in order to record any verbal reaction by the student, and turns OFF the bypass signal ↪.

If the duration of the compression, as measured by the length of time the compression distress signal $S_3$ has been generated, exceeds a predetermined time value x (e.g., 10 seconds), the compression module 130 increases the intensity of the compression distress signal $S_3$ by means of the escalating demand feature 240 embedded within the compression module 130. The compression distress signal $S_3$ is generated at the increased intensity thereafter until some period of time after compression of the head 11 has ceased.

Once compression of the infant simulator 05 is ceased, the distress signal $S_3$ continues for some period of time (e.g., 15 minutes) to simulate injury to the infant simulator 05. Thereafter, generation of the compression distress signal $S_3$ is turned OFF, the occurrence of a compression event is counted by the recording feature 220, the compression timer is stopped and reset, the sound recorder 360 is stopped, the intensity of the compression distress signal $S_3$ is checked and returned to normal if intensified, the bypass signal ↪ is turned back ON, and the compression module 130 is exited.

Smoke Detector Module 420

The smoke detector 320 detects the presence of smoke and signals the smoke detector module 420.

Referring to FIG. 2m, the smoke detector module 320 is bypassed so long as the infant simulator 05 is not subjected to smoke. However, when the smoke detector 320 receives a signal that the infant simulator 05 is being exposed to smoke, the smoke detector module 320 initiates generation of a smoke exposure signal $S_9$ by means of the demand signal generating feature 210 embedded within the smoke detector module 420, starts timing the length of time the smoke exposure signal $S_9$ is generated, starts sound recorder 360 for a defined period of time (e.g., 3 to 5 minutes) in order to record any verbal reaction by the student, and turns OFF the bypass signal ↪.

If the smoke exposure signal $S_9$ is generated for longer than a predetermined time x (e.g., 10 minutes), the smoke detector module 420 increases the intensity of the smoke exposure signal $S_9$ by means of the escalating demand feature 240 embedded within the smoke detector module 420. The smoke exposure signal $S_9$ is generated at the increased intensity thereafter.

Once the infant simulator 05 is removed from the smoky environment, generation of the smoke exposure signal $S_9$ is turned OFF, the occurrence of a smoke exposure event is counted, the duration of time during which the infant simulator 05 was exposed to smoke (i.e., the length of time the smoke exposure signal $S_9$ was generated) is recorded by the recording feature 220, the smoke exposure period timer is stopped and reset, the intensity of the smoke exposure signal $S_9$ is checked and returned to normal if intensified, the bypass signal ↪ is turned back ON, and the smoke detector module 420 is exited.

In order to allow the microcontroller unit 20 to cycle through the other modules even though the infant simulator 05 is exposed to smoke for a prolonged period of time, the central microcontroller unit 20 can be programmed to terminate generation of the smoke exposure signal $S_9$ and exit the smoke detector module 420 after a defined time period (e.g., 10–60 minutes) even though the infant simulator 05 remains exposed to smoke (not shown in FIG. 2m). Timing of the duration of the smoke exposure can also be terminated, or continued until the infant simulator 05 is no longer exposed to smoke.

Impact Abuse Module 430

As shown in FIG. 3, the impact sensor 70 detects an impact to the mannequin 10. When an initial impact of sufficient force is detected by the impact sensor 70, the impact sensor 70 signals the impact abuse module 430.

Referring to FIG. 2n, the impact abuse module 430 is bypassed so long as the infant simulator 05 is not being subjected to an abusive impact. However, when the impact abuse module 430 receives a signal that the infant simulator 05 has received an abusive impact, the impact abuse module 430 starts sound recorder 360 in order to record any verbal statements made by the student, terminates and resets any active modules (e.g., diaper change module 140) and then checks for any subsequent abusive impacts after a short delay of between about ½ to 2 seconds. When only a single abusive impact is detected by the impact sensor 70 (i.e., the abuse is a single brief impact) the impact sensor module 430 enters the dropped infant submodule 431. In the event that subsequent abusive impacts are detected (i.e., the abuse is prolonged) the impact abuse module 430 enters the shaken infant submodule 432.

Dropped Infant Submodule

Upon entering the dropped infant submodule 431 an impact distress signal $S_{10}$ is generated by means of the demand signal generating feature 210 embedded within the dropped infant submodule 431 for some period of time (e.g., 15 minutes) in order to simulate injury to the infant simulator 05, the occurrence of a "dropped" abuse event is counted by the recording feature 220, the sound recorder 360 is stopped, and the impact abuse module 430 is exited.

Shaken Infant Submodule

Upon entering the shaken infant submodule 432 the submodule initiates generation of the impact distress signal $S_{10}$ by means of the demand signal generating feature 210 embedded within the dropped infant submodule 431, starts timing the duration of the abuse, counts the occurrence of a "shaken" abuse event by means of the recording feature 220, and continues to monitor the infant simulator 05 for continued impacts.

If further impacts are not sensed then the impact distress signal $S_{10}$ is generated for some period of time (e.g., 30 minutes) in order to simulate injury to the infant simulator 05, the abuse event timer is stopped and reset, the sound recorder 360 is stopped, and the impact abuse module 430 is exited.

If further impacts are sensed and the duration of the abusive impacts exceeds a predetermined time value x (e.g., 5 seconds), the impact abuse module 430 increases the intensity of the impact distress signal $S_{10}$ by means of the escalating demand feature 240 embedded within the impact abuse module 430. The impact distress signal $S_{10}$ is generated at the increased intensity thereafter until generation of the impact distress signal $S_{10}$ is turned OFF.

If the abusive impacts are thereafter discontinued before a second predetermined time value y (e.g., 10 seconds) is reached, the impact distress signal $S_{10}$ is turned OFF after some period of time (e.g., 15 minutes) to simulate injury to the infant simulator 05, the abuse event timer is stopped and reset, the sound recorder 360 is stopped, and the impact abuse module 430 is exited.

If the duration of the abusive impacts continue and exceed the second predetermined time value y, the impact abuse module 430 enters the comatose feature 280 embedded within the shaken infant submodule 432. Upon entering the comatose feature 280 a comatose signal $S_{11}$ is generated, the impact distress signal $S_{10}$ is turned OFF, the occurrence of entry into a comatose state is counted by the recording feature 220, and timing of the abuse event continues.

If a medical attention satisfaction signal $St_{11}$ is communicated to the impact abuse module 430 after entry into the comatose feature 280 and before a third predetermined time value z (e.g., about 20 to 60 minutes measured from detection of the initial impact) the comatose signal $S_{11}$ is turned off, the intensity of the impact distress signal $S_{10}$ is returned to normal, the abuse event timer is stopped and reset, the sound recorder 360 is stopped, and the impact abuse module 430 is exited. If, on the other hand, the medical attention satisfaction signal $St_{11}$ is not communicated to the impact abuse module 430 within the third predetermined time value z (i.e., the end of the medical attention-request period), then death of the infant simulator 05 is recorded, the abuse event timer is stopped and reset, the sound recorder 360 is stopped, and the program is ended.

Overstimulation Module 440

The motion sensor 70 detects movement of the infant simulator 05 and communicates with the central microcontroller unit 20 for evaluating the extent to which the infant simulator 05 is being moved. Overstimulation is sensed and the overstimulation module 440 entered when excessive movement of the infant simulator 05 is detected over an extended period of time.

Referring to FIG. 2o', central microcontroller unit 20 communicates with motion sensor 70 on a periodic basis (e.g., a sample period of every two minutes) to determine whether movement of the infant simulator 05 has been detected by the motion sensor 70 within that sample period s. The microcontroller unit 20 then calculates the percentage (n/x) of sample periods s in which motion has been detected (n) for the most recent subset x (e.g., 60) of sample periods s. When this percentage (n/x) exceeds a predetermined activation threshold value (e.g., 95%) an overstimulation indicator is turned ON and communicated to the overstimulation module 440. Thereafter the overstimulation indicator remains ON and the central microcontroller unit 20 continues to communicate with motion sensor 70 and calculate the percentage (n/x) of sample periods s in which motion has been detected (n) for the most recent group of x sample periods s, until the percentage (n/x) falls below a predetermined deactivation threshold value (e.g., 90%). Upon reaching the deactivation threshold value, the microcontroller unit 20 turns the overstimulation indicator OFF and communicates this to the overstimulation module 440.

Referring to FIG. 2o, the overstimulation module 440 is bypassed so long as the overstimulation indicator is turned OFF. However, when the overstimulation module 440 receives a signal from the microcontroller unit 20 that the overstimulation indicator is ON, the overstimulation module 440 initiates generation of the overstimulation signal $S_{12}$ by means of the demand signal generating feature 210 embedded within the overstimulation module 440, starts timing the length of time the overstimulation signal $S_{12}$ is generated, starts sound recorder 360 for a defined period of time (e.g., 3 to 5 minutes) in order to record any verbal reaction by the student, and turns OFF the bypass signal ↪.

If the overstimulation signal $S_{12}$ is generated for a predetermined time x (e.g., 10 minutes), the overstimulation module 440 increases the intensity of the overstimulation signal $S_{12}$ by means of the escalating demand feature 240 embedded within the overstimulation module 440. The overstimulation signal $S_{12}$ is generated at the increased intensity thereafter.

Once the overstimulation module 440 receives a signal from the microcontroller unit 20 that the overstimulation indicator is turned OFF, generation of the overstimulation signal $S_{12}$ is turned OFF, the occurrence of an overstimulation event is counted and the duration of time during which the infant simulator 05 was overstimulated (i.e., the length of time the overstimulation signal $S_{12}$ was generated) recorded by the recording feature 220, the overstimulation event timer is stopped and reset, the intensity of the overstimulation signal $S_{12}$ is checked and returned to normal if intensified, the bypass signal ↪ turned back ON, and the overstimulation module 440 is exited.

In order to allow the microcontroller unit 20 to cycle through the other modules even though the infant simulator 05 is overstimulated for a prolonged period of time, the central microcontroller unit 20 can be programmed to terminate generation of the overstimulation signal $S_{12}$ and exit the overstimulation module 440 after a defined time period (e.g., 10–60 minutes) even though the infant simulator 05 remains overstimulated (not shown in FIG. 2o). Timing of the duration of overstimulation can also be terminated, or continued until the infant simulator 05 is no longer overstimulated.

Sun Exposure Module 470

The light sensor 350 measures the quantity of light striking the infant simulator 05 and signals the sun exposure module 470 when the illuminance exceeds a defined threshold value (i.e., greater than 2,000 foot-candles). The threshold value is established so as to prevent exposure to standard synthetic lighting and indirect sunlight from registering as a sun exposure event, while minimizing instances where an actual exposure to direct sunlight is not recognized as a sun exposure event.

Referring to FIG. 2r, the sun exposure module 470 is bypassed so long as the infant simulator 05 is not exposed to direct sunlight (i.e., illuminance is less than z). However, when the sun exposure module 470 receives a signal that the infant simulator 05 is being exposed to direct sunlight (i.e., illuminance is greater than z), the sun exposure module 470 initiates generation of the sun exposure signal $S_{15}$ by means of the demand signal generating feature 210 embedded within the sun exposure module 470, starts timing the length of time the sun exposure signal $S_{15}$ is generated, starts sound recorder 360 for a defined period of time (e.g., 3 to 5 minutes) in order to record any verbal reaction by the student, and turns OFF the bypass signal If the sun exposure signal $S_{15}$ is generated for longer than a predetermined time x (e.g., 10 minutes), the sun exposure module 470 increases the intensity of the sun exposure signal $S_{15}$ by means of the escalating demand feature 240 embedded within the sun exposure module 470. The sun exposure signal $S_{15}$ is generated at the increased intensity thereafter until the infant simulator 05 is removed from direct sunlight.

Once the infant simulator 05 is removed from direct sunlight, generation of the sun exposure signal $S_{15}$ is turned OFF, the occurrence of a sun exposure event is counted and the duration of time during which the infant simulator 05 was exposed to direct sunlight (i.e., the length of time the sun exposure signal $S_{15}$ was generated) is recorded by the recording feature 220, the sun exposure period timer is stopped and reset, the intensity of the sun exposure signal $S_{15}$ is checked and returned to normal if intensified, the bypass signal ↪ is turned back ON, and the sun exposure module 470 is exited.

In order to allow the microcontroller unit 20 to cycle through the other modules even though the infant simulator 05 is exposed to overly intense sunlight for a prolonged period of time, the central microcontroller unit 20 can be programmed to terminate generation of the sun exposure signal $S_{15}$ and exit the sun exposure module 470 after a defined time period (e.g., 10–60 minutes) even though the infant simulator 05 remains exposed to overly intense sunlight (not shown in FIG. 2r). Timing of the duration of exposure to sunlight can also be terminated, or continued until the infant simulator 05 is no longer overly exposed.

Loud Sound Exposure Module 480

The sound sensor 40 measures the decibel level of sounds to which the infant simulator 05 is exposed and signals the loud sound exposure module 480 when the decibel level exceeds a defined threshold value (i.e., greater than 80 dB). The threshold value is established so as to prevent exposure to typical environmental sounds from registering as a loud sound exposure event, while minimizing instances where an actual exposure to a loud sound is not recognized as a loud sound exposure event.

Referring to FIG. 2s, the loud sound exposure module 480 is bypassed so long as the infant simulator 05 is not exposed to loud sounds (i.e., decibel level of sounds is less than d). However, when the loud sound exposure module 480 receives a signal that the infant simulator 05 is being exposed to loud sounds (i.e., a decibel level of greater than d), the loud sound exposure module 480 initiates generation of the loud sound exposure signal $S_{16}$ by means of the demand signal generating feature 210 embedded within the loud sound exposure module 480, starts timing the length of time the loud sound exposure signal $S_{16}$ is generated, starts sound recorder 360 for a defined period of time (e.g., 3 to 5 minutes) in order to record any verbal reaction by the student, and turns OFF the bypass signal ↪.

If the loud sound exposure signal $S_{16}$ is generated for longer than a predetermined time x (e.g., 10 minutes), the loud sound exposure module 480 increases the intensity of the loud sound exposure signal $S_{16}$ by means of the escalating demand feature 240 embedded within the loud sound exposure module 480. The loud sound exposure signal $S_{16}$ is generated at the increased intensity thereafter until the infant simulator 05 is no longer subjected to loud sounds.

Once the infant simulator 05 no longer detects the loud sounds, generation of the loud sound exposure signal $S_{16}$ is turned OFF, the occurrence of a loud sound exposure event is counted and the duration of time during which the infant simulator 05 was exposed to loud sounds (i.e., the length of time the loud sound exposure signal $S_{16}$ was generated) is recorded by the recording feature 220, the loud sound exposure period timer is stopped and reset, the intensity of the loud sound exposure signal $S_{16}$ is checked and returned to normal if intensified, the bypass signals ↪ is turned back ON, and the loud sound exposure module 480 is exited.

In order to allow the microcontroller unit 20 to cycle through the other modules even though the infant simulator 05 is exposed to loud sounds for a prolonged period of time, the central microcontroller unit 20 can be programmed to terminate generation of the loud sound exposure signal $S_{16}$ and exit the loud sound exposure module 480 after a defined time period (e.g., 10–60 minutes) even though the infant simulator 05 remains exposed to loud sounds (not shown in FIG. 2s). Timing of the duration of the exposure to loud sounds can also be terminated, or continued until the infant simulator 05 is no longer exposed to loud sounds.

Missing Diaper Module 490

The diaper sensor 370 checks for the presence or absence of a diaper 60 on the infant simulator 05 and signals the missing-diaper module 490 when the infant simulator 05 is detected without a diaper 60.

Referring to FIG. 2e. the missing-diaper module 490 is bypassed so long as the infant simulator 05 is wearing a diaper 60. However, when the missing-diaper module 490 receives a signal from the diaper sensor 370 that the infant simulator 05 is not fitted with a diaper 60 (i.e., a diaper 60 is not detected by the diaper sensor 370), the missing-diaper module 490 initiates generation of the missing-diaper signal $S_{17}$ by means of the demand signal generating feature 210 embedded within the module 490, starts sound recorder 360 for a defined period of time (e.g. 3 to 5 minutes) in order to record any verbal reaction by the student, starts timing the length of time the missing-diaper signal $S_{17}$ is generated, and turns OFF the bypass signal ↪.

Upon fitting the infant simulator 05 with a diaper 60, generation of the missing-diaper signal $S_{17}$ is turned OFF, the occurrence of a missing-diaper event is counted, the duration of time during which the infant simulator 05 was without a diaper 60 (i.e., the length of time the missing-diaper signal $S_{17}$ was generated) recorded by the recording feature 220, the missing-diaper period timer is stopped and reset, the bypass signal ↪ is turned back ON, and the missing-diaper module 490 is exited.

In order to allow the microcontroller unit 20 to cycle through the other modules even though the infant simulator 05 is not wearing a diaper 60 for a prolonged period of time, the central microcontroller unit 20 can be programmed to terminate generation of the missing-diaper signal $S_{17}$ and exit the missing-diaper module 490 after a defined time period (e.g., 10–60 minutes) even though the infant simulator 05 remains undiapered (not shown in FIG. 2e). Timing of the duration of the missing-diaper period can also be terminated, or continued until the infant simulator 05 is diapered.

Diaper-Change Module 140

The central microcontroller unit 20 periodically changes the satisfaction signal $St_4$ requested by the diaper-change module 140, such as by alternating between a first satisfaction signal $St_4^+$ transmitted by a first diaper 60a, and a second satisfaction signal $St_4^-$ transmitted by a second diaper 60b.

The time intervals between sequential diaper-change events is preferably selected so as to emulate the frequency of diaper changes required by an actual infant. By way of example, when the intervals are a predetermined value, the intervals are preferably between about 20 minutes and 6 hours, and when the intervals are bounded random variables, the intervals are preferably between a minimum of 1 to 2 hours and a maximum of 4 to 6 hours, with a statistical preference for a time interval between approximately 1 and approximately 3 hours.

Referring to FIG. 2f, the diaper-change module 140 checks for the currently requested diaper-change satisfaction signal (e.g., $St_4^+$). The diaper-change module 140 is bypassed so long as the currently requested diaper-change satisfaction signal $St_4$ is communicated to the diaper-change module 140.

In the event that either the currently requested diaper-change satisfaction signal $St_4$ is no longer received by the diaper-change module 140 (e.g., the first diaper 60a transmitting the diaper-change satisfaction signal $St_4^+$ has been removed from the infant simulator 05), or the central microcontroller unit 20 has changed the requested diaper-change satisfaction signal $St_4$ (e.g., the requested diaper-change satisfaction signal has been changed from $St_4^+$ to $St_4^-$), the diaper-change module 140 initiates generation of a diaper-change signal $S_4$ by means of the demand signal generating feature 210 embedded within the diaper-change module 140, starts timing the duration of the diaper-change episode by timing the length of time the diaper-change signal $S_4$ is generated, and starts sound recorder 360 for a defined period of time (e.g., 3 to 5 minutes) in order to record any verbal reaction by the student.

In order to end a diaper-change episode before the time limitation y has been reached, the diaper-change module 140 must receive both an identification signal $S^{ID}$ (e.g., insertion of an identification key 90 attached to the wrist of the assigned student by means of a tamper indicating wristband 91) and the currently requested satisfaction signal (e.g., transmission of the diaper-change satisfaction signal $St_4^-$ by diapering the infant simulator 05 with the second diaper 60b). For the embodiment depicted in FIG. 2f, the identification $S^{ID}$ and diaper-change satisfaction signals $St_4$ may be received in any sequence and do not need to be transmitted simultaneously.

As shown in FIG. 2f, the identification requirement is controlled by the identification system feature 250 embedded within the diaper-change module 140. The identification system feature 250 prevents exiting of the diaper-change module 140 by bypassing the satisfaction option until the identification signal $S^{ID}$ has been received and the identification switch $Sw^{ID}$ has been turned ON.

If the identification signal $S^{ID}$ and the current diaper-change satisfaction signal $St_4$ are not received within a given time limit x, as measured by the length of time the diaper-change signal $S_4$ has been generated, the diaper-change module 140 increases the intensity of the diaper-change signal $S_4$ by means of the escalating demand feature 240 embedded within the diaper-change module 140. The diaper-change signal $S_4$ is generated at the increased intensity for the remainder of the diaper-change episode (i.e., until the identification signal $S^{ID}$ and the current diaper-change satisfaction signal $St_4$ are received or the time limitation y is reached).

Upon receiving the identification signal $S^{ID}$ and the current diaper-change satisfaction signal $St_4$, the diaper-change signal $S_4$ is turned OFF, the occurrence of a diaper-change event is counted and the length of the diaper-change episode recorded by the recording feature 220, the timer for timing the duration of the diaper-change episode is stopped and reset, the intensity of the diaper-change signal $S_4$ is checked and returned to normal if intensified, a contented signal + is generated (e.g., a soft "cooing" sound), the identification switch $Sw^{ID}$ is turned back OFF, and the diaper-change module 140 is exited.

In the event that the identification signal $S^{ID}$ and the current diaper-change satisfaction signal $St_4$ are never received during a diaper-change event (i.e., the diaper-change signal $S_4$ is generated until time limitation y is reached), the diaper-change signal $S_4$ is turned OFF, the occurrence of a diaper-change event is counted and the length of the diaper-change episode recorded by the recording feature 220, the timer for timing the duration of the diaper-change episode is stopped and reset, the intensity of the diaper-change signal $S_4$ is checked and returned to normal if intensified, the identification switch $Sw^{ID}$ is turned back OFF, and the diaper-change module 140 is exited. The contented signal + is not generated when the diaper-change module 140 is exited in this manner.

The time limitation y is employed for purposes of preventing the diaper-change signal $S_4$ from being generated for the remainder of an assignment period in the event that the identification signal $S_{ID}$ and the current diaper-change satisfaction signal $St_4$ are never received by the diaper-change module 140. This allows the program to continue cycling through the other modules and interact with a student for the balance of the assignment period when an otherwise willing student is unable to provider the diaper-change satisfaction signal $St_4$, such as could result from a situation in which one of the diapers 60 is misplaced during an assignment period or left at home when traveling.

Rocking Module 150

The central microcontroller unit 20 periodically commences a rocking-request period and communicates the commencement of a rocking-request period to the rocking module 150. The central microcontroller unit 20 also controls the duration of each rocking-request period by transmitting a termination signal to the rocking module 150 after the desired time period y has lapsed.

The time intervals between sequential rocking-request periods is preferably selected so as to emulate the frequency of requests for such attention requested by an actual infant. By way of example, when the intervals are a predetermined value, the intervals are preferably between about 1 to 6 hours, and when the intervals are bounded random variables, the intervals are preferably between a minimum of 1 to 2 hours and a maximum of 4 to 6 hours, with a statistical preference for a time interval between approximately 3 and approximately 5 hours.

Similarly, the duration of each rocking-request period is preferably selected so as to emulate the length of time an actual infant would request such attention. By way of example, when the duration of a rocking-request period is a predetermined value, the duration of each rocking-request period is preferably between about 10 minutes to 1 hour, and when the duration of a rocking-request period is a bounded random variable, the duration of each rocking-request period is preferably between a minimum of about 2 minutes and a maximum of about 60, with a statistical preference for a duration between approximately 5 and 20 minutes.

Referring to FIG. 2g, the rocking module 150 is simply bypassed until the central microcontroller unit 20 starts a rocking-request period. When the central microcontroller unit 20 starts a rocking-request period, the central microcontroller unit 20 transmits a rocking-request start signal to the rocking module 150. a rocking-request episode is counted by the recording feature 220, and the rocking-request event commenced. The rocking module 150 then initiates generation of the rocking-request signal $S_5$ by means of the demand signal generating feature 210, starts timing the duration of the rocking-request episode by timing the length of time the rocking-request signal $S_5$ is generated, and starts sound recorder 360 for a defined period of time (e.g., 3 to 5 minutes) in order to record any verbal reaction by the student.

In order to end a rocking-request episode before the entire rocking-request period has elapsed, the rocking module 150 must receive both an identification signal $S^{ID}$ (e.g., insertion of an identification key 90 attached to the wrist of the assigned student by a tamper indicating wristband 91) and a rocking-request satisfaction signal $St_5$ (e.g., rocking of the infant simulator 05). For the embodiment depicted in FIG. 2g, the identification $S^{ID}$ and rocking-request satisfaction $St_5$ signals may be received in any sequence and do not need to be transmitted simultaneously. However, the rocking-request satisfaction signal $St_5$ must be continuously received throughout the rocking-request period to prevent initiation of a secondary rocking-request episode in which the rocking-request signal $S_5$ is turned back ON and the duration of the supplemental rocking-request episode timed. Upon initiation of a secondary rocking-request episode, the duration of the rocking-request period may optionally be restarted (i.e., T5 reset to 0 minutes).

As shown in FIG. 2g, the identification requirement is controlled by the identification system feature 250 embedded within the rocking module 150. The identification system feature 250 prevents access to the episode termination operations (i.e., turning OFF the rocking-request signal $S_5$ and terminating timing of the rocking-request episode) by bypassing the satisfaction option until the identification signal $S^{ID}$ has been received and the identification switch $Sw^{ID}$ has been turned ON.

If the identification signal $S^{ID}$ and the rocking-request satisfaction signal $St_5$ are not received within a given time limit x, as measured by the length of time the rocking-request signal $S_5$ has been generated, the rocking module 150 increases the intensity of the rocking-request signal $S_5$ by means of the escalating demand feature 240 embedded within the rocking module 150. The rocking-request signal $S_5$ is generated at the increased intensity for the remainder of the rocking-request episode (i.e., until the identification signal $S^{ID}$ and the rocking-request satisfaction signal $St_5$ are received or the end of the rocking-request period is reached).

Upon receiving the identification $S^{ID}$ and the rocking-request satisfaction $St_5$ signals, the rocking-request signal $S_5$ is turned OFF, the length of the rocking-request episode recorded by the recording feature 220, the timer for timing the duration of the rocking-request episode stopped and reset, the intensity of the rocking-request signal $S_5$ checked and returned to normal if intensified, and the positive signal switch $Sw^+$ is turned ON.

In contrast to the diaper-change module 140, the rocking module 150 requires that the rocking-request satisfaction signal $St_5$ continue to be transmitted to the rocking module 150 for the entire duration of the rocking-request period. Failure to continuously provide the rocking-request satisfaction signal $St_5$ throughout the entire rocking-request period causes the rocking module 150 to reinitiate generation of the rocking-request signal $S_5$, start timing the duration of the secondary rocking-request episode, and turn the positive signal switch $Sw^+$ back OFF.

The duration of a secondary rocking-request episode can be recorded and reported in a number of different ways, including, by way of example (i) recording and reporting a secondary rocking-request episode as just another rocking-request episode, (ii) separately recording and reporting primary and secondary rocking-request episodes according to type of episode, (iii) adding the duration of a secondary rocking-request episode to the recorded duration of the corresponding primary rocking request episode, etc.

In order to end a secondary rocking-request episode before the end of the rocking-request period, the rocking-request satisfaction signal $St_5$ must once again be received by the rocking module 150. It is not necessary to retransmit the identification signal $S^{ID}$ as the identification switch $Sw^{ID}$ remains ON until the rocking period has ended, regardless of the status of the rocking-request satisfaction signal $St_5$.

When the end of the rocking period y is reached, the rocking module 150 performs one of two different sets of operations depending upon the final status of the rocking-request satisfaction signal $St_5$. In those cases where the rocking-request satisfaction signal $St_5$ was being received by the rocking module 150 at the end of the rocking period, a contented signal + is generated (e.g., a soft "cooing" sound), the positive signal switch $Sw^+$ is turned back OFF, the identification switch $Sw^{ID}$ is turned back OFF, and the rocking module 150 is exited. In those cases where the rocking-request satisfaction signal $St_5$ was not being received by the rocking module 150 at the end of the rocking period, including those cases where the rocking-request satisfaction signal $St_5$ was never received by the rocking module 150, the rocking-request signal $S_5$ is turned OFF, the length of the rocking-request or supplemental rocking-request episode is recorded by the recording feature 220, the timer for timing the duration of the rocking-request episode is stopped and reset, the intensity of the rocking-request signal $S_5$ is checked and returned to normal if intensified, the identification switch $Sw^{ID}$ is turned back OFF, and the rocking module 150 is exited. The contented signal + is not generated when the rocking module 150 is exited in the latter manner.

Feeding Module 160

The central microcontroller unit 20 periodically commences a feeding-request period and communicates the commencement of a feeding-request period to the feeding module 160. The central microcontroller unit 20 also controls the duration of each feeding-request period by transmitting a termination signal to the feeding module 160 after the desired time period y has lapsed.

The time intervals between sequential feeding-request events is preferably selected so as to emulate the frequency of feedings required by an actual infant. By way of example, when the intervals are a predetermined value, the intervals are preferably between about 1 to 6 hours, and when the intervals are bounded random variables, the intervals are preferably between a minimum of 1 to 2 hours and a maximum of 4 to 6 hours, with a statistical preference for a time interval between approximately 3 and approximately 5 hours.

Similarly, the duration of each feeding-request period is preferably selected so as to emulate the length of time an actual infant would need to be fed. By way of example, when the duration of a feeding-request period is a predetermined value, the duration of each feeding-request period is preferably between about 5 to 20 minutes, and when the duration of a feeding-request period is a bounded random variable, the duration of each feeding-request period is preferably between a minimum of about 5 minutes and a maximum of about 30 minutes, with a statistical preference for a duration between approximately 10 and 20 minutes.

Referring to FIG. 2h, the feeding module 160 is simply bypassed until the central microcontroller unit 20 starts a feeding-request period. When the central microcontroller unit 20 starts a feeding-request period, the central microcontroller unit 20 transmits a feeding-request start signal to the feeding module 160, a feeding-request episode is counted by the recording feature 220, and the feeding-request period commenced. The feeding module 160 then initiates generation of the feeding-request signal $S_6$ by means of the demand signal generating feature 210, starts timing the duration of the feeding-request episode by timing the length of time the feeding-request signal $S_6$ is generated, starts sound recorder 360 for a defined period of time (e.g., 3 to 5 minutes) in order to record any verbal reaction by the student, and turns the positive signal $Sw^+$ and the burp $Sw^{BURP}$ switches OFF unless the switches are already OFF.

In order to end a feeding-request episode before the entire feeding-request period has elapsed, the feeding module 160 must receive both an identification signal $S^{ID}$ (e.g., insertion of an identification key 90 attached to the wrist of the assigned student by a tamper indicating wristband 91) and a feeding-request satisfaction signal $St_6$ (e.g., insertion of a bottle into the mouth or insertion of a key marked "Feeding" in to a keyhole). For the embodiment depicted in FIG. 2h, the identification $S^{ID}$ and feeding-request satisfaction $St_6$ signals may be received in any sequence and do not need to be transmitted simultaneously. However, the feeding-request satisfaction signal $St_6$ must be continuously received throughout the feeding-request period to prevent initiation of a secondary feeding-request episode in which the feeding-request signal $S_6$ is turned back ON, the duration of the supplemental feeding-request episode timed, the sound recorder 360 is activated for a second defined period of time, and the burp switch $Sw^{BURP}$ switched back to OFF. Upon initiation of a secondary feeding-request episode, the duration of the feeding-request period may optionally be restarted (i.e., T6 reset to 0 minutes).

As shown in FIG. 2h, the identification requirement is controlled by the identification system feature 250 embedded within the feeding module 160. The identification system feature 250 prevents access to the episode termination operations (i.e., turning OFF the feeding-request signal $S_6$ and terminating timing of the feeding-request episode) by bypassing the satisfaction option until the identification signal $S^{ID}$ has been received and the identification switch $Sw^{ID}$ has been turned ON.

If the identification signal $S^{ID}$ and the feeding-request satisfaction signal $St_6$ are not received within a given time limit x, as measured by the length of time the feeding-request signal $S_6$ has been generated, the feeding module 160 increases the intensity of the feeding-request signal $S_6$ by means of the escalating demand feature 240 embedded within the feeding module 160. The feeding-request signal $S_6$ is generated at the increased intensity for the remainder of the feeding-request episode (i.e., until the identification signal $S^{ID}$ and the feeding-request satisfaction signal $St_6$ are received or the end of the feeding-request period y is reached).

Upon receiving the identification $S^{ID}$ and the feeding-request satisfaction $St_6$ signals, the feeding-request signal $S_6$ is turned OFF, the length of the feeding-request episode recorded by the recording feature 220, the timer for timing the duration of the feeding-request episode stopped and reset, the intensity of the feeding-request signal $S_6$ checked and returned to normal if intensified, the positive signal switch $Sw^+$ is turned ON, and the burp switch $Sw^{BURP}$ turned ON.

As with the rocking module 150, the feeding module 160 requires that the feeding-request satisfaction signal $St_6$ continue to be transmitted to the feeding module 160 for the entire duration of the feeding-request period. Failure to continuously provide the feeding-request satisfaction signal $St_6$ throughout the entire feeding-request period causes the feeding module 160 to reinitiate generation of the feeding-request signal $S_6$, start timing the duration of the secondary feeding-request episode, turn the sound recorder 360 back on for a second defined period of time, and turn both the positive signal switch $Sw^+$ and the burp switch $Sw^{BURP}$ OFF.

The duration of a secondary feeding-request episode can be recorded and reported in a number of different ways, including, by way of example (i) recording and reporting a secondary feeding-request episode as just another feeding-request episode, (ii) separately recording and reporting primary and secondary feeding-request episodes according to type of episode, (iii) adding the duration of a secondary feeding-request episode to the recorded duration of the corresponding primary feeding-request episode, etc.

In order to end a secondary feeding-request episode before the end of the feeding-request period, the feeding-request satisfaction signal $St_6$ must once again be received by the feeding module 160. It is not necessary to retransmit the identification signal $S^{ID}$ as the identification switch $Sw^{ID}$ remains ON until the feeding period has ended, regardless of the status of the feeding-request satisfaction signal $St_6$.

When the end of the feeding period is reached, the feeding module 160 performs one of two different sets of operations depending upon the final status of the feeding-request satisfaction signal $St_6$. In those cases where the feeding-request satisfaction signal $St_6$ was being received by the feeding module 160 at the end of the feeding period. a contented signal + is generated (e.g., a soft "cooing" sound), the identification switch $Sw^{ID}$ is turned back OFF, and the feeding module 160 is exited. In those cases where the feeding-request satisfaction signal $St_6$ was not being received by the feeding module 160 at the end of the feeding period, including those cases where the feeding-request satisfaction signal $St_6$ was never received by the feeding module 160, the feeding-request signal $S_6$ is turned OFF, the length of the feeding-request or supplemental feeding-request episode is recorded by the recording feature 220, the timer for timing the duration of the feeding-request episode is stopped and reset, the intensity of the feeding-request signal $S_6$ is checked and returned to normal if intensified, the identification switch $Sw^{ID}$ is turned back OFF, and the feeding module 160 is exited. The contented signal + is not generated when the feeding module 160 is exited in the latter manner.

Burping Module 170

During each feeding-request period, a burp switch $Sw^{BURP}$ is turned ON when the identification signal $S^{ID}$ and feeding-request satisfaction $St_6$ signals are received. The burp switch $Sw^{BURP}$ remains ON so long as the feeding-request satisfaction signal $St_6$ is continuously received by the feeding module 160 during the feeding-request period. In the event that the identification signal $S^{ID}$ and feeding-request satisfaction $St_6$ signals are never received by the feeding module 160, or the feeding-request satisfaction signal $St_6$ is interrupted and is not being received by the feeding module 160 when the feeding-request period ends, the burp switch $Sw^{BURP}$ is turned OFF.

Burping-request periods can be initiated immediately after the end of a satisfied feeding-request period or after a defined delay timed from the end of a satisfied feeding-request period. When a delay is provided between the end of a satisfied feeding-request period and the initiation of a burping-request period, the length of the delay is preferably selected so as to emulate the burping needs of an actual infant. By way of example, when the delays are a predetermined value, the delays are preferably between about 0 to 30 minutes, and when the delays are bounded random variables, the delays are preferably between about 0 to 30 minutes, with a statistical preference for delays of between approximately 2 and 10 minutes.

Similarly, the duration of each burping-request period is preferably selected so as to emulate the length of time an actual infant would need to be burped. By way of example, when the duration of a burping-request period is a predetermined value, the duration of each burping-request period is preferably between about 2 to 60 minutes, and when the duration of a burping-request period is a bounded random variable, the duration of each burping-request period is preferably between about 2 to 60 minutes with a statistical preference for a duration of between approximately 5 and 20 minutes.

Referring to FIG. 2i, the burping module 170 is bypassed when the burping switch $Sw^{BURP}$ is OFF (i.e., the infant simulator 05 does not want to be burped when the infant simulator 05 was not properly fed). However, when the burping switch $Sw^{BURP}$ is ON, a burping-request event is commenced, a burping-request episode is counted by the recording feature 220, and the burping switch $Sw^{BURP}$ switched OFF. The burping module 170 then initiates generation of the burping-request signal $S_7$ by means of the demand signal generating feature 210 embedded within the burping module 170, starts timing the duration of the burping-request episode by timing the length of time the burping-request signal $S_7$ is generated, starts sound recorder 360 for a defined period of time (e.g., 3 to 5 minutes) in order to record any verbal reaction by the student, and turns the positive signal switch $Sw^+$ OFF unless the switch is already OFF.

As with the rocking-request period and the feeding-request period, the central microcontroller unit 20 controls the duration of each burping-request period by transmitting a termination signal to the burping module 170 after the desired time period y has lapsed.

In order to end a burping-request episode before the entire burping-request period has elapsed, the burping module 170 must receive both an identification signal $S^{ID}$ (e.g., insertion of an identification key 90 attached to the wrist of the assigned student by a tamper indicating wristband 91) and a burping-request satisfaction signal $St_7$ (e.g., patting of the infant simulator 05). For the embodiment depicted in FIG. 2i, the identification $S^{ID}$ and burping-request satisfaction $St_7$ signals may be received in any sequence and do not need to be transmitted simultaneously. However, the burping-request satisfaction signal $St_7$ must be continuously received throughout the burping-request period to prevent initiation of a secondary burping-request episode in which the burping-request signal $S_7$ is turned back ON, the duration of the supplemental burping-request episode timed, and the positive signal switch $Sw^+$ turned back OFF. Upon initiation of a secondary burping-request episode, the duration of the burping-request period may optionally be restarted (i.e., T7 reset to 0 minutes).

As shown in FIG. 2i, the identification requirement is controlled by the identification system feature 250 embedded within the burping module 170. The identification system feature 250 prevents access to the episode termination operations (i.e., turning OFF the burping-request signal $S_7$ and terminating timing of the burping-request episode) by bypassing the satisfaction option until the identification signal $S^{ID}$ has been received and the identification switch $Sw^{ID}$ has been turned ON.

If the identification signal $S_D$ and the burping-request satisfaction signal $St_7$ are not received within a given time limit x, as measured by the length of time the burping-request signal $S_7$ has been generated, the burping module 170 increases the intensity of the burping-request signal $S_7$ by means of the escalating demand feature 240 embedded within the burping module 170. The burping-request signal $S_7$ is generated at the increased intensity for the remainder of the burping-request episode (i.e., until the identification signal $S^{ID}$ and the burping-request satisfaction signal $St_7$ are received or the end of the burping-request period is reached).

Upon receiving the identification $S^{ID}$ and the burping-request satisfaction $St_7$ signals, the burping-request signal $S_7$ is turned OFF, the length of the burping-request episode recorded by the recording feature 220, the timer for timing the duration of the burping-request episode stopped and reset, the intensity of the burping-request signal $S_7$ checked and returned to normal if intensified, and the positive signal switch $Sw^+$ turned ON unless already turned on.

As with the rocking module 150 and the feeding module 160, the burping module 170 requires that the burping-request satisfaction signal $St_7$ continue to be transmitted to the burping module 170 for the entire duration of the burping-request period. Failure to continuously provide the burping-request satisfaction signal $St_7$ throughout the entire burping-request period causes the burping module 170 to reinitiate generation of the burping-request signal $S_7$, start timing the duration of the secondary burping-request episode, turn the sound recorder 360 back on for a second defined period of time, and turn the positive signal switch $Sw^+$ OFF.

The duration of a secondary burping-request episode can be recorded and reported in a number of different ways, including, by way of example (i) recording and reporting a secondary burping-request episode as just another burping-request episode, (ii) separately recording and reporting primary and secondary burping-request episodes according to type of episode, (iii) adding the duration of a secondary burping-request episode to the recorded duration of the corresponding primary burping-request episode, etc.

In order to end a secondary burping-request episode before the end of the burping-request period, the burping-request satisfaction signal $St_7$ must once again be received by the burping module 170. It is not necessary to retransmit the identification signal $S^{ID}$ as the identification switch $Sw^{ID}$ remains ON until the burping period has ended, regardless of the status of the burping-request satisfaction signal $St_7$.

When the end of the burping-request period is reached, the burping module 170 performs one of two different sets of operations depending upon the final status of the burping-request satisfaction signal $St_7$. In those cases where the burping-request satisfaction signal $St_7$ was being received by the burping module 170 at the end of the burping-request period, a contented signal + is generated (e.g., a soft "cooing" sound), the identification switch $Sw^{ID}$ is turned back OFF, and the burping module 170 is exited. In those cases where the burping-request satisfaction signal $St_7$ was not being received by the burping module 170 at the end of the burping period, including those cases where the burping-request satisfaction signal $St_7$ was never received by the burping module 170, the burping-request signal $S_7$ is turned OFF, the length of the burping-request or supplemental burping-request episode is recorded by the recording feature 220, the timer for timing the duration of the burping-request episode is stopped and reset, the intensity of the burping-request signal $S_7$ is checked and returned to normal if intensified, the identification switch $Sw^{ID}$ is turned back OFF, and the burping module 170 is exited. The contented signal + is not generated when the burping module 170 is exited in the latter manner.

Fussy Module 180

The central microcontroller unit 20 periodically commences a fussy period and communicates the commencement of a fussy period to the fussy module 180. The program also controls the duration of each fussy period by transmitting a termination signal to the fussy module 180 after the desired time period y has lapsed.

The duration of each fussy period is preferably selected so as to emulate the length of time an actual infant would tend to fuss. By way of example, when the duration of a fussy period is a predetermined value, the duration of fussy period is preferably between about 5 to 20 minutes, and when the duration of a fussy period is a bounded random variable, the duration of each fussy period is preferably between about 2 to 60 minutes with a statistical preference for a duration of about 5 to 20 minutes.

Referring to FIG. 2j, the fussy module 180 is simply bypassed until the central microcontroller unit 20 commences a fussy period. When the central microcontroller unit 20 commences a fussy period, the central microcontroller unit 20 transmits a fussy start signal to the fussy module 180, and a fussy event is commenced. The fussy module 180 then initiates generation of the fussy signal $S_8$ by means of the demand signal generating feature 210 embedded within the fussy module 180.

In contrast to the other demand event modules (i.e., the diaper-change module 140, the rocking module 150, the feeding module 160, the burping module 170, and the rest module 450) a fussy event cannot be ended until the entire fussy period has run. Hence, the fussy signal $S_8$ will be generated throughout a fussy period regardless of the actions taken by the student. The fussy module 180 emulates those times when, despite every effort by a care provider, an infant cannot be satisfied and continues to fuss. Since the fussy event cannot be satisfied, the fussy module 180 does not include the recording 220, contented signal 230, escalating demand 240 or identification 250 features embedded within the other modules. The fussy module 180 does however include the sound recording feature in which the sound recorder 360 is activated for the duration of the fussy period in order to record any verbal reaction by the student.

When the end of the fussy period is reached, the fussy signal $S_8$ is turned OFF, the sound recorder 360 is shut off, and the fussy module 180 is exited. A contented signal + is not generated.

Self-Directed Expression Module 410

The central microcontroller unit 20 periodically commences a self-directed expression and communicates the commencement of a self-directed expression to the self-directed expression module 410. The self-directed expression can last for a few seconds (e.g. a giggle) or several minutes (e.g., hiccuping).

Referring to FIG. 2k, the self-directed expression module 410 is simply bypassed until the central microcontroller unit 20 commences a self-directed expression. When the central microcontroller unit 20 commences a self-directed expression, the central microcontroller unit 20 transmits a self-directed expression signal to the self-directed expression module, and a self-directed expression is commenced.

In contrast to the other demand event modules (i.e., the diaper-change module 140, the rocking module 150, the feeding module 160, the burping module 170, the fussy module 180, and the resting module 450) a self-directed expression is preferably of the type which occurs quickly and spontaneously and a care-provider does not typically perceive as requiring satisfaction. Hence, the self-directed expression $E_1$ will generally be communicated without any action taken by the student other than observing the expression. Since the self-directed expression need not be satisfied, the self-directed expression module 410 does not include the recording 220, contented signal 230, escalating demand 240 or identification 250 features embedded within other modules.

When the end of the self-directed expression is reached, the self-directed expression module 180 is exited.

Rest Module 450

The central microcontroller unit 20 periodically commences a rest-request period and communicates the commencement of a rest-request period to the rest module 450. The central microcontroller unit 20 also controls the duration of each rest-request period by transmitting a termination signal to the rest module 450 after the desired time period y has lapsed.

The time intervals between sequential rest-request events is preferably selected so as to emulate the frequency of requests for sleep by an actual infant. By way of example, when the intervals are a predetermined value, the intervals are preferably between about 1 to 6 hours. and when the intervals are bounded random variables, the intervals are preferably between a minimum of 1 to 2 hours and a maximum of 4 to 6 hours, with a statistical preference for a time interval between approximately 3 and approximately 5 hours.

Similarly, the duration of each rest-request period is preferably selected so as to emulate the length of time an actual infant would require rest (i.e., the length of a typical daytime nap or night time sleeping period). By way of example, when the duration of a rest-request period is a predetermined value, the duration of each rest-request period is preferably between about 10 minutes to 6 hours, and when the duration of a rest-request period is a bounded random variable, the duration of each rest-request period is preferably between a minimum of about 10 minutes and a maximum of about 6 hours, with a statistical preference for a duration between approximately 5 and 40 minutes for a daytime nap and 2 to 5 hours for a night time sleeping period.

Referring to FIG. 2p, the rest module 450 is simply bypassed until the central microcontroller unit 20 starts a rest-request period. When the central microcontroller unit 20 starts a rest-request period, the central microcontroller unit 20 transmits a rest-request start signal to the rest module 450, a rest-request event is counted by the recording feature 220, and the rest-request event commenced. In the event that the infant simulator 05 is already resting (i.e., is not being subjected to sound or movement exceeding defined "disturbing" threshold values) the rest module 450 simply turns the positive signal switch Sw$^+$ ON without generating the rest-request signal S$_{13}$ and continues to monitor for any "disturbing" sounds or movement of the infant simulator 05.

Should the infant simulator 05 is being subjected to movement and/or sound of sufficient intensity to be detected as a "disturbing" action during the rest-request period, the rest module 450 initiates generation of the rest-request signal S$_{13}$ by means of the demand signal generating feature 210, starts timing the duration of the rest-request episode by timing the length of time the rest-request signal S$_{13}$ is generated, starts sound recorder 360 for a defined period of time (e.g., 3 to 5 minutes) in order to record any verbal reaction by the student, and turns the positive signal switch Sw$^+$ OFF unless the switch is already OFF.

In order to end a rest-request episode before the entire rest-request period has elapsed, the rest module 450 must receive an identification signal S$^{ID}$ (e.g., insertion of an identification key 90 attached to the wrist of the assigned student by a tamper indicating wristband 91) and must NOT receive a "disturbing" signal from the motion sensor 70 or the sound sensor 340 (i.e., lack of both sound and movement exceeding "disturbing" threshold values hereinafter referenced as a "resting"). The motion sensor 70 and sound sensor 340 must not detect a sound or movement exceeding threshold value throughout the entire rest-request period to prevent initiation of a secondary rest-request episode in which the rest-request signal S$_{13}$ is turned back ON, the duration of the supplemental rest-request episode timed, the sound recorder 360 started for a second defined period of time, and the positive signal switch Sw$^+$ turned OFF again. Upon initiation of a secondary rest-request episode, the duration of the rest-request period may optionally be restarted (i.e., T12 reset to 0 minutes).

As shown in FIG. 2p, the identification requirement is controlled by the identification system feature 250 embedded within the rest module 450. The identification system feature 250 prevents access to the episode termination operations (i.e., turning OFF the rest-request signal S$_{13}$ and terminating timing of the rest-request episode) by bypassing the "satisfaction" option until the identification signal S$^{ID}$ has been received and the identification switch Sw$^{ID}$ has been turned ON.

If the identification signal S$^{ID}$ is not received and/or the infant simulator 05 continues to be subjected to movement and/or sound within a given time limit x, as measured by the length of time the rest-request signal S$_{13}$ has been generated, the rest module 450 increases the intensity of the rest-request signal S$_{13}$ by means of the escalating demand feature 240 embedded within the rest module 450. The rest-request signal S$_{13}$ is generated at the increased intensity for the remainder of the rest-request episode (i.e., until the identification signal S$^{ID}$ is received and the infant simulator 05 is resting, or the end of the rest-request period is reached).

Upon receiving the identification S$^{ID}$ and detection of resting, the rest-request signal S$_{13}$ is turned OFF, the length of the rest-request episode recorded by the recording feature 220, the timer for timing the duration of the rest-request episode stopped and reset, the intensity of the rest-request signal S$_{13}$ checked and returned to normal if intensified, and the positive signal switch Sw$^+$ turned ON.

The infant simulator 05 must continue to rest (i.e., detect no sounds or be subjected to any movement exceeding the threshold values) for the entire duration of the rest-request period. Failure to continuously rest the infant simulator 05 throughout the entire rest-request period causes the rest module 450 to reinitiate generation of the rest-request signal S$_{13}$, start timing the duration of the secondary rest-request episode, turn the sound recorder 360 back on for a second defined period of time, and turn the positive signal switch Sw$^+$ OFF.

The duration of a secondary rest-request episode can be recorded and reported in a number of different ways, including, by way of example (i) recording and reporting a secondary rest-request episode as just another rest-request episode, (ii) separately recording and reporting primary and secondary rest-request episodes according to type of episode, (iii) adding the duration of a secondary rest-request episode to the recorded duration of the corresponding primary rest-request episode, etc.

In order to end a secondary rest-request episode before the end of the rest-request period, the infant simulator 05 must once again be rested. It is not necessary to retransmit the identification signal S$^{ID}$ as the identification switch Sw$^{ID}$ remains ON until the rest period has ended, regardless of the resting status of the infant simulator 05.

When the end of the rest period is reached, the rest module 450 performs one of two different sets of operations depending upon the final resting status of the infant simulator 05. In those cases where the infant simulator 05 was resting at the end of the rest period, a contented signal + is generated (e.g., a soft "cooing" sound), the identification switch $Sw^{ID}$ is turned back OFF, and the rest module 450 is exited. In those cases where the infant simulator 05 was not resting at the end of the rest period, including those cases where the infant simulator 05 was never rested, the rest-request signal $S_{13}$ is turned OFF, the length of the rest-request or supplemental rest-request episode is recorded by the recording feature 220, the timer for timing the duration of the rest-request episode is stopped and reset, the intensity of the rest-request signal $S_{13}$ is checked and returned to normal if intensified, the identification switch $Sw^{ID}$ is turned back OFF, and the rest module 450 is exited. The contented signal + is not generated when the rest module 450 is exited in the latter manner.

Sick Module 460

The central microcontroller unit 20 periodically commences a sick period and communicates the commencement of a sick period to the sick module 460. The central microcontroller unit 20 also controls the duration of each sick period by transmitting a termination signal to the sick module 460 once the desired time period y has lapsed.

The time interval between sequential sick periods is preferably selected so as to emulate the frequency of illness of an actual infant. Generally, a single sick period of between 30 minutes and 24 hours per assignment period is appropriate. Multiple sick periods can be commenced within a single assignment period, but such multiple illnesses within the span of a typical assignment period of 8 to 72 hours is relatively uncommon.

Referring to FIG. 2q, the sick module 460 is simply bypassed until the central microcontroller unit 20 starts a sick period. When the central microcontroller unit 20 starts a sick period, the central microcontroller unit 20 transmits a sick period initiation signal to the sick module 460, a sick period is counted by the recording feature 220, and the sick period commenced. The sick module 460 then initiates generation of the perceptible sick signal $S_{14}$ by means of the demand signal generating feature 210, starts timing the duration of the sick period, increases the duration of demand periods occurring during the sick period, and decreases the time interval between sequential demand events during the sick period (i.e., demand periods last longer and demand events occur more frequently during a sick period).

Upon reaching the end of the sick period y, the sick signal $S_{14}$ is turned OFF, the duration of demand periods and the time intervals between sequential demand events are returned to normal, the timer for timing the duration of the sick period is stopped and reset, and the sick module 460 exited.

Assignment Period Module 190

The infant simulator 05 initiates timing of the assignment period upon activation. The duration of the assignment period can either be continuous (i.e., continuing until a teacher or other program administrator takes custody of the infant simulator 05 and stops the assignment period), or predetermined (i.e., a preset duration of 6, 8, 24, 36, 48 or 72 hours selected by the teacher or other program administrator at the beginning of the assignment period.

When the assignment period is a predetermined time period, the central microcontroller unit 20 is preprogrammed with a defined assignment period. The assignment period module 190 compares the length of time the infant simulator 05 has been activated against the duration of the defined assignment period, and causes the program to continue cycling through the various modules until the length of time the infant simulator 05 has been activated equals or exceeds the duration of the defined assignment period. Once the activation period equals or exceeds the assignment period, the program is ended.

We claim:

1. An infant simulator, comprising:
   (a) a mannequin;
   (b) a system within the mannequin for effecting a demand event having a demand episode, including at least:
      (1) a means for generating a perceptible demand signal; and
      (2) a means in communication with the demand signal generating means for arresting the demand signal in response to receipt of a satisfaction signal;
   (c) a means effective for transmitting the satisfaction signal to the demand signal arresting means and arresting the demand signal by interacting with the mannequin in a specified manner; and
   (d) a system within the mannequin for effecting self-directed expressions, including at least:
      (1) a means for generating a perceptible self-directed expression; and
      (2) a self-directed expression interval timer in communication with the self-directed expression generating means for initiating generation of the self-directed expression at intervals measured independently from the initiation or arresting of a demand event.

2. The infant simulator of claim 1 further comprising a demand interval timer in communication with the demand signal generating means for initiating generation of the demand signal at intervals.

3. The infant simulator of claim 1 further comprising a student identification system within the mannequin including at least (i) a means for receiving an identification signal, and (ii) a means in communication with the identification-signal receiving means and the demand system effective for preventing arresting of the demand signal until the identification signal is received by the identification-signal receiving means.

4. The infant simulator of claim 3 wherein (i) the identification-signal receiving means comprises a keyhole effective for transmitting the identification signal upon insertion of an identification key, and (ii) the infant simulator further comprises (A) an identification key effective for transmitting the identification signal when inserted into the keyhole, and (B) a means for attaching the identification key to a selected student capable of indicating detachment of the identification key from the selected student.

5. The infant simulator of claim 1 or 2 further comprising a means effective for measuring and recording the duration of each demand episode.

6. The infant simulator of claim 1 further comprising a means in communication with the demand signal generating means for escalating the intensity of the demand signal as the duration of the demand episode increases.

7. The infant simulator of claim 1 wherein the mannequin has an approximate shape and weight of an infant.

8. The infant simulator of claim 1 further comprising an energy source retained within the mannequin for supplying the energy requirements of the demand and self-directed expression systems, and a means for indicating that the energy source has been accessed.

9. The infant simulator of claim 1 wherein the perceptible demand signal is expressed as an audible signal.

10. The infant simulator of claim 1 wherein the demand signal arresting means is only effective for inhibiting the demand signal in response to receipt of the satisfaction signal, and the infant simulator further comprises a demand duration timer in communication with the demand signal generating means for terminating generation of the demand signal at the end of a demand period.

11. The infant simulator of claim 10 further comprising a means for adjusting the potential duration of a demand period at the beginning of an assignment period.

12. The infant simulator of claim 10 further comprising a means for adjusting the duration of the demand period at the beginning of an assignment period.

13. The infant simulator of 11 further comprising a means for adjusting the potential duration of the demand time interval at the beginning of an assignment period, whereby the potential number of demand signals generated by the demand system during an assignment period is correspondingly increased or decreased.

14. The infant simulator of claim 12 further comprising a means for adjusting the duration of the demand time interval at the beginning of an assignment period, whereby the number of demand signals generated by the demand system during an assignment period is correspondingly increased or decreased.

15. The infant simulator of claim 10 wherein the satisfaction signal transmitting means is repositionable relative to the mannequin, and the demand signal arresting means is effective for inhibiting the demand signal during the demand period only so long as the satisfaction signal transmitting means is continuously held in a communicative position relative to the mannequin by a student.

16. The infant simulator of claim 1 wherein the time interval between the generation of sequential self-directed expressions is between 1 and 48 hours.

17. The infant simulator of claim 1 wherein the time interval between the generation of sequential self-directed expressions is a minimum of 1 to 4 hours and a maximum of 8 to 48 hours, with a statistical preference for a time interval between approximately 8 and approximately 24 hours.

18. An infant simulator, comprising:
(a) a mannequin; and
(b) a system within the mannequin for effecting a demand event having a demand episode, the demand system including at least:
 (1) a means for generating a perceptible demand signal;
 (2) a demand interval timer in communication with the demand signal generating means for initiating generation of the demand signal at intervals;
 (3) a means in communication with the demand signal generating means for arresting the demand signal in response to receipt of a satisfaction signal; and
 (4) a means in communication with the demand interval timer for adjusting the actual duration or statistically probable duration of the time intervals between the generation of sequential demand signals, based upon the duration of at least one demand episode measured from initial generation of the perceptible demand signal to receipt of the satisfaction signal by the satisfaction signal receiving means.

19. An infant simulator, comprising:
(a) a mannequin; and
(b) a system within the mannequin for effecting a demand event having a demand episode, the demand system including at least:
 (1) a means for generating a perceptible demand signal;
 (2) a demand interval timer in communication with the demand signal generating means for initiating generation of the demand signal at intervals;
 (3) a means for receiving a satisfaction signal;
 (4) a means for measuring and recording the duration of each demand episode measured from initial generation of the perceptible demand signal to receipt of the satisfaction signal by the satisfaction signal receiving means; and
 (5) a means in communication with the demand interval timer for adjusting the actual duration or statistically probable duration of the time intervals between the generation of sequential demand signals based upon the duration of at least one demand episode.

20. The infant simulator of claim 18 or 19 wherein the demand interval duration-adjustment means is effective for adjusting the demand time interval duration to one of at least three time interval options of short duration, average duration and long duration, wherein the demand time interval duration can be increased based upon the duration of at least one demand episode exceeding a threshold maximum value, or decreased based upon at least one demand episode of shorter duration than a threshold minimum.

21. The infant simulator of claim 18 or 19 wherein the demand interval timer randomly generates sequential demand signals within a predetermined interval time range.

22. The infant simulator of claim 18 or 19 wherein the demand interval timer generates sequential demand signals on an fixed schedule selected from a plurality of fixed schedules.

23. The infant simulator of claim 18 or 19 wherein the time intervals between the generation of sequential demand signals remains adjusted for about 1 to 12 hours.

24. An infant simulator, comprising:
(a) a mannequin;
(b) a system within the mannequin for effecting a demand event having a demand episode, the demand system including at least:
 (1) a means for generating a perceptible demand signal;
 (2) a means in communication with the demand signal generating means for inhibiting the demand signal in response to receipt of a satisfaction signal;
 (3) a demand duration timer in communication with the demand signal generating means for terminating generation of the demand signal at the end of a demand period; and
 (4) a means in communication with the demand duration timer for adjusting the actual duration or statistically probable duration of the demand period, based upon the duration of at least one demand episode measured from initial generation of the perceptible demand signal to receipt of the satisfaction signal by the satisfaction signal receiving means.

25. An infant simulator, comprising:
(a) a mannequin;
(b) a system within the mannequin for effecting a demand event having a demand episode, the demand system including at least:
 (1) a means for generating a perceptible demand signal;
 (2) a means in communication with the demand signal generating means for inhibiting the demand signal in response to receipt of a satisfaction signal;
 (3) a means for measuring and recording the duration of a demand episode measured from initial generation of the perceptible demand signal to receipt of the satisfaction signal by the satisfaction signal receiving means;
 (4) a demand event duration timer in communication with the demand signal generating means for terminating generation of the demand signal at the end of a demand period; and
 (5) a means in communication with the demand event duration timer for adjusting the actual duration or statistically probable duration of the demand period, based upon the duration of at least one demand episode.

26. The infant simulator of claim 24 or 25 wherein the demand period duration-adjustment means is effective for adjusting the demand period duration to one of at least three time interval options of short duration, average duration and long duration, wherein the demand period duration can be increased based upon the duration of at least one demand episode exceeding a threshold maximum value, or decreased based upon at least one demand episode of shorter duration than a threshold minimum.

27. The infant simulator of claim 24 or 25 wherein the demand interval timer randomly generates sequential demand signals within a predetermined interval time range.

28. The infant simulator of claim 24 or 25 wherein the demand interval timer generates sequential demand signals on an fixed schedule selected from a plurality of fixed schedules.

29. The infant simulator of claim 24 or 25 wherein the duration of the demand period remains adjusted for about 1 to 12 hours.

30. An infant simulator, comprising:
(a) a mannequin;
(b) a system within the mannequin for periodically effecting demand events of timed duration having a demand episode, the demand system including at least:
  (1) a means for generating a perceptible demand signal; and
  (2) a means in communication with the demand signal generating means for arresting the demand signal in response to receipt of a demand satisfaction signal;
(c) a means effective for transmitting the demand satisfaction signal to the demand signal arresting means when placed in communicative proximity to the mannequin;
(d) a system within the mannequin for effecting a medical attention event of timed duration in response to at least one unsatisfied demand event, including at least:
  (1) a means for arresting any further demand events,
  (2) a means for generating a medical attention signal, and
  (3) a means in communication with the medical attention signal generating means for arresting the medical attention signal and continuing the generation of further periodic demand events in response to receipt of a medical attention satisfaction signal;
(e) a means effective for transmitting the medical attention satisfaction signal to the medical attention signal arresting means; and
(f) a system within the mannequin for effecting death of the infant simulator in response to an unsatisfied medical attention event, including at least a means for terminating the generation of any further demand events.

31. An infant simulator, comprising:
(a) a mannequin;
(b) a system within the mannequin for effecting a demand event having a demand episode, the demand system including at least:
  (1) a means for generating a perceptible demand signal; and
  (2) a means in communication with the demand signal generating means for arresting the demand signal in response to receipt of a satisfaction signal;
(c) a means effective for transmitting the satisfaction signal to the demand signal arresting means and arresting the demand signal by interacting with the mannequin in a specified manner; and
(d) a sound recorder in communication with the demand signal generating means for commencing the recording of sounds for a limited time period upon commencement of generation of the perceptible demand signal.

32. An infant simulator, comprising:
(a) a mannequin; and
(b) a system within the mannequin for effecting a demand event having a demand episode, the demand system including at least:
  (1) a means for generating a perceptible demand signal;
  (2) a demand interval timer in communication with the demand signal generating means for initiating generation of the demand signal at intervals; and
  (3) a means in communication with the demand signal generating means for arresting the demand signal in response to receipt of a satisfaction signal; and
(c) a system within the mannequin in communication with the demand interval timer for commencing a sick period during which the actual duration or statistically probable duration of time intervals between the generation of sequential demand signals is decreased.

33. An infant simulator, comprising:
(a) a mannequin; and
(b) a system within the mannequin for effecting a demand event having a demand episode, the demand system including at least:
  (1) a means for generating a perceptible demand signal;
  (2) a demand interval timer in communication with the demand signal generating means for initiating generation of the demand signal at intervals;
  (3) a means for receiving a satisfaction signal;
  (4) a means for measuring and recording the duration of each demand episode measured from initial generation of the perceptible demand signal to receipt of the satisfaction signal by the satisfaction signal receiving means; and
(c) a system within the mannequin in communication with the demand interval timer for commencing a sick period during which the actual duration or statistically probable duration of time intervals between the generation of sequential demand signals is decreased.

34. An infant simulator, comprising:
(a) a mannequin;
(b) a system within the mannequin for effecting a demand event having a demand episode, the demand system including at least:
  (1) a means for generating a perceptible demand signal;
  (2) a means in communication with the demand signal generating means for inhibiting the demand signal in response to receipt of a satisfaction signal;
  (3) a demand duration timer in communication with the demand signal generating means for terminating generation of the demand signal at the end of a demand period; and
  (4) a means in communication with the demand duration timer for adjusting the actual duration or statistically probable duration of the demand period, and
(c) a system within the mannequin in communication with the demand duration timer for commencing a sick period during which the actual duration or statistically probable duration of demand periods is increased.

35. An infant simulator, comprising:
(a) a mannequin; and
(b) a system within the mannequin for effecting a demand event having a demand episode, the demand system including at least:
  (1) a means for generating a perceptible demand signal;
  (2) a demand interval timer in communication with the demand signal generating means for initiating generation of the demand signal at intervals; and
  (3) a means in communication with the demand signal generating means for arresting the demand signal in response to receipt of a satisfaction signal;
(c) a clock within the mannequin for keeping the time of day; and
(d) a system within the mannequin in communication with the clock and the demand interval timer for increasing the actual duration or statistically probable duration of time intervals between the generation of sequential demand signals during night time hours.

36. An infant simulator, comprising:
(a) a mannequin; and
(b) a system within the mannequin for effecting a demand event having a demand episode, the demand system including at least:
  (1) a means for generating a perceptible demand signal;
  (2) a demand interval timer in communication with the demand signal generating means for initiating generation of the demand signal at intervals;
  (3) a means for receiving a satisfaction signal;
  (4) a means for measuring and recording the duration of each demand episode measured from initial generation of the perceptible demand signal to receipt of the satisfaction signal by the satisfaction signal receiving means;
(c) a clock within the mannequin for keeping the time of day; and
(d) a system within the mannequin in communication with the clock and the demand interval timer for (i) commencing a night time period during which the actual duration or statistically probable duration of time intervals between the generation of sequential demand signals is increased, wherein the night time period is commenced between the hours of 4:00 p.m. and 12:00 p.m., and (ii) commencing a daytime period during which the actual duration or statistically probable duration of time intervals between the generation of sequential demand signals is decreased, wherein the daytime period is commenced between the hours of 4:00 a.m. and 10:00 a.m.

37. The infant simulator of claim 36 wherein the night time period is commenced between the hours of 8:00 p.m. and 10:00 p.m. and the daytime period is commenced between the hours of 6:00 a.m. and 8:00 a.m.

38. The infant simulator of claim 35 or 36 wherein the demand interval timer randomly generates sequential demand signals within a predetermined interval time range.

39. The infant simulator of claim 35 or 36 wherein the demand interval timer generates sequential demand signals on an fixed schedule selected from a plurality of fixed schedules.

40. The infant simulator of claim 35 or 36 wherein the simulator further comprises a means for generating a perceptible day signal during the daytime period or a perceptible night signal during the night time period.

41. The infant simulator of claim 40 wherein the perceptible day signal and night signal are visual signals generated continuously throughout the corresponding period.

42. An infant simulator, comprising:
(a) a mannequin; and
(b) a system within the mannequin for effecting a demand event having a demand episode, the demand system including at least:
  (1) a means for generating a perceptible demand signal;
  (2) a means in communication with the demand signal generating means for inhibiting the demand signal in response to receipt of a satisfaction signal;
  (3) a demand duration timer in communication with the demand signal generating means for terminating generation of the demand signal at the end of a demand period; and
  (4) a means in communication with the demand duration timer for adjusting the actual duration or statistically probable duration of the demand period,
(c) a clock within the mannequin for keeping the time of day; and
(d) a system within the mannequin in communication with the clock and the demand duration timer for decreasing the actual duration or statistically probable duration of demand periods during night time hours.

43. An infant simulator, comprising:
(a) a mannequin; and
(b) a system within the mannequin for effecting a demand event having a demand episode, the demand system including at least:
  (1) a means for Generating a perceptible demand signal;
  (2) a means for receiving a satisfaction signal;
  (3) a means for measuring and recording the duration of each demand episode measured from initial generation of the perceptible demand signal to receipt of the satisfaction signal by the satisfaction signal receiving means;
  (4) a demand duration timer in communication with the demand signal generating means for terminating generation of the demand signal at the end of a demand period; and
  (5) a means in communication with the demand duration timer for adjusting the actual duration or statistically probable duration of the demand period,
(c) a clock within the mannequin for keeping the time of day; and
(d) a system within the mannequin in communication with the clock and the demand interval timer for (i) commencing a night time period during which the actual duration or statistically probable duration of demand periods is decreased, wherein the night time period is commenced between the hours of 4:00 p.m. and 12:00 p.m., and (ii) commencing a daytime period during which the actual duration or statistically probable duration of demand periods is increased, wherein the daytime period is commenced between the hours of 4:00 a.m. and 10:00 a.m.

44. The infant simulator of claim 43 wherein the night time period is commenced between the hours of 8:00 p.m. and 10:00 p.m., and the daytime period is commenced between the hours of 6:00 a.m. and 8:00 a.m.

45. The infant simulator of claim 42 or 43 wherein the demand duration timer establishes the duration of a demand period as a random variable within a predetermined duration time range.

46. The infant simulator of claim 42 or 43 wherein the demand duration timer establishes the duration of a demand period as a predetermined value.

47. The infant simulator of claim 42 or 43 wherein the simulator further comprises a means for generating a perceptible day signal during the daytime period or a perceptible night signal during the night time period.

48. The infant simulator of claim 47 wherein the perceptible day signal and night signal are visual signals generated continuously throughout the corresponding period.

* * * * *

UNITED STATES PATENT AND TRADEMARK OFFICE
CERTIFICATE OF CORRECTION

PATENT NO.         : 6,604,980 B1
APPLICATION NO. : 09/555840
DATED              : August 12, 2003
INVENTOR(S)        : Jurmain et al.

Page 1 of 1

It is certified that error appears in the above-identified patent and that said Letters Patent is hereby corrected as shown below:

Col. 88, line 38, "signal;" should read -- signal; and --
Col. 89, line 24, "mannequin; and" should read -- mannequin; --; line 32, "signal;" should read -- signal; and --; line 67, "per" should read -- per- --
Col. 90, line 7, "mannequin; and" should read -- mannequin; --; line 21, "period," should read -- period; --; line 30, "mannequin; and" should read -- mannequin; --; line 35, "Generating" should read -- generating --; line 49, "period," should read -- period; --

Signed and Sealed this

Twenty-second Day of August, 2006

JON W. DUDAS
*Director of the United States Patent and Trademark Office*